US011169379B2

(12) United States Patent
Chi et al.

(10) Patent No.: US 11,169,379 B2
(45) Date of Patent: Nov. 9, 2021

(54) SPATIALLY MULTIPLEXED VOLUME BRAGG GRATINGS WITH VARIED REFRACTIVE INDEX MODULATIONS FOR WAVEGUIDE DISPLAY

(71) Applicant: Facebook Technologies, LLC, Menlo Park, CA (US)

(72) Inventors: Wanli Chi, Sammamish, WA (US); Dominic Meiser, Issaquah, WA (US); Yang Yang, Redmond, WA (US); Wai Sze Tiffany Lam, Redmond, WA (US); Pasi Saarikko, Kirkland, WA (US); Ningfeng Huang, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/840,118

(22) Filed: Apr. 3, 2020

(65) Prior Publication Data

US 2021/0055554 A1 Feb. 25, 2021

Related U.S. Application Data

(60) Provisional application No. 62/891,167, filed on Aug. 23, 2019.

(51) Int. Cl.
*G02B 27/01* (2006.01)
*F21V 8/00* (2006.01)
(Continued)

(52) U.S. Cl.
CPC ............ *G02B 27/0172* (2013.01); *G02B 1/11* (2013.01); *G02B 6/005* (2013.01); *G02B 6/0016* (2013.01);
(Continued)

(58) Field of Classification Search
None
See application file for complete search history.

(56) References Cited

U.S. PATENT DOCUMENTS

| 4,687,720 A | 8/1987 | Wreede et al. |
| 8,508,848 B2 | 8/2013 | Saarikko |
| (Continued) | | |

FOREIGN PATENT DOCUMENTS

| CN | 104035157 A | 9/2014 |
| JP | 2007011057 A | 1/2007 |
| (Continued) | | |

OTHER PUBLICATIONS

U.S. Non-Final Office Action dated Dec. 2, 2020 in U.S. Appl. No. 16/726,667.
(Continued)

*Primary Examiner* — Chris H Chu
(74) *Attorney, Agent, or Firm* — Weaver Austin Villeneuve & Sampson LLP

(57) ABSTRACT

A waveguide display includes a waveguide transparent to visible light, a first volume Bragg grating (VBG) on the waveguide and characterized by a first refractive index modulation, and a second reflection VBG on the waveguide and including a plurality of regions characterized by different respective refractive index modulations. The first reflection VBG is configured to diffract display light in a first wavelength range and a first field of view (FOV) range such that the display light in the first wavelength range and the first FOV range propagates in the waveguide through total internal reflection to the plurality of regions of the second reflection VBG. The plurality of regions of the second reflection VBG are configured to diffract the display light in different respective wavelength ranges within the first wavelength range and the first FOV range.

14 Claims, 39 Drawing Sheets

(51) Int. Cl.
  *G02B 27/00* (2006.01)
  *G02B 27/44* (2006.01)
  *H04N 9/31* (2006.01)
  *G02B 1/11* (2015.01)
  *G02B 27/42* (2006.01)

(52) U.S. Cl.
  CPC ......... *G02B 6/0026* (2013.01); *G02B 6/0038* (2013.01); *G02B 27/0081* (2013.01); *G02B 27/4205* (2013.01); *G02B 27/44* (2013.01); *H04N 9/3152* (2013.01); *G02B 2027/012* (2013.01); *G02B 2027/0112* (2013.01); *G02B 2027/0118* (2013.01); *G02B 2027/0123* (2013.01); *G02B 2027/0138* (2013.01); *G02B 2027/0174* (2013.01); *G02B 2027/0178* (2013.01); *G02B 2027/0187* (2013.01)

(56) References Cited

U.S. PATENT DOCUMENTS

| | | | |
|---|---|---|---|
| 8,649,099 | B2 | 2/2014 | Schultz et al. |
| 9,939,647 | B2 | 4/2018 | Vallius et al. |
| 10,859,768 | B2 | 12/2020 | Popovich et al. |
| 2003/0165017 | A1 | 9/2003 | Amitai |
| 2006/0228073 | A1 | 10/2006 | Mukawa et al. |
| 2010/0321409 | A1 | 12/2010 | Komori et al. |
| 2011/0211239 | A1 | 9/2011 | Mukawa et al. |
| 2015/0098243 | A1* | 4/2015 | Li ............. G02B 6/005 362/606 |
| 2015/0277375 | A1* | 10/2015 | Large ......... G02B 27/0081 250/214 AL |
| 2015/0289762 | A1* | 10/2015 | Popovich ....... A61B 3/113 351/209 |
| 2015/0346490 | A1 | 12/2015 | Tekolste et al. |
| 2016/0077338 | A1 | 3/2016 | Robbins et al. |
| 2017/0235142 | A1 | 8/2017 | Wall et al. |
| 2017/0363871 | A1 | 12/2017 | Vallius et al. |
| 2018/0188542 | A1 | 7/2018 | Waldern et al. |
| 2018/0322845 | A1 | 11/2018 | Machida |
| 2018/0373115 | A1 | 12/2018 | Brown et al. |
| 2019/0004321 | A1 | 1/2019 | Grey et al. |
| 2019/0101866 | A1 | 4/2019 | Georgiou et al. |
| 2019/0187474 | A1 | 6/2019 | Bhargava et al. |
| 2020/0225479 | A1 | 7/2020 | Chi et al. |
| 2020/0348518 | A1 | 11/2020 | Georgiou et al. |
| 2021/0055551 | A1 | 2/2021 | Chi et al. |
| 2021/0055552 | A1 | 2/2021 | Chi et al. |
| 2021/0055553 | A1 | 2/2021 | Chi et al. |
| 2021/0055555 | A1 | 2/2021 | Chi et al. |

FOREIGN PATENT DOCUMENTS

| | | |
|---|---|---|
| WO | 2018224802 A1 | 12/2018 |
| WO | 2020146451 A1 | 7/2020 |
| WO | 2021040979 A1 | 3/2021 |
| WO | 2021040980 A1 | 3/2021 |
| WO | 2021040990 A1 | 3/2021 |
| WO | 2021041314 A1 | 3/2021 |
| WO | 2021041333 A1 | 3/2021 |

OTHER PUBLICATIONS

U.S. Non-Final Office Action dated Jan. 22, 2021 in U.S. Appl. No. 16/840,116.
International Application No. PCT/US2020/045077, International Search Report and Written Opinion dated Apr. 11, 2020, 11 pages.
International Application No. PCT/US2020/045081, International Search Report and Written Opinion dated Apr. 11, 2020, 9 pages.
International Application No. PCT/US2020/045144, International Search Report and Written Opinion dated Apr. 11, 2020, 12 pages.
International Application No. PCT/US2020/047671, International Search Report and Written Opinion dated Apr. 11, 2020, 9 pages.
International Application No. PCT/US2020/047636, International Search Report and Written Opinion dated Apr. 11, 2020, 12 pages.
PCT/US2020/012666, "International Search Report and Written Opinion", dated Apr. 2, 2020, 14 pages.
U.S. Notice of Allowance dated May 26, 2021 in U.S. Appl. No. 16/726,667.
U.S. Final Office Action dated May 5, 2021 in U.S. Appl. No. 16/840,116.
U.S. Non-Final Office Action dated Apr. 1, 2021 in U.S. Appl. No. 16/812,084.

* cited by examiner

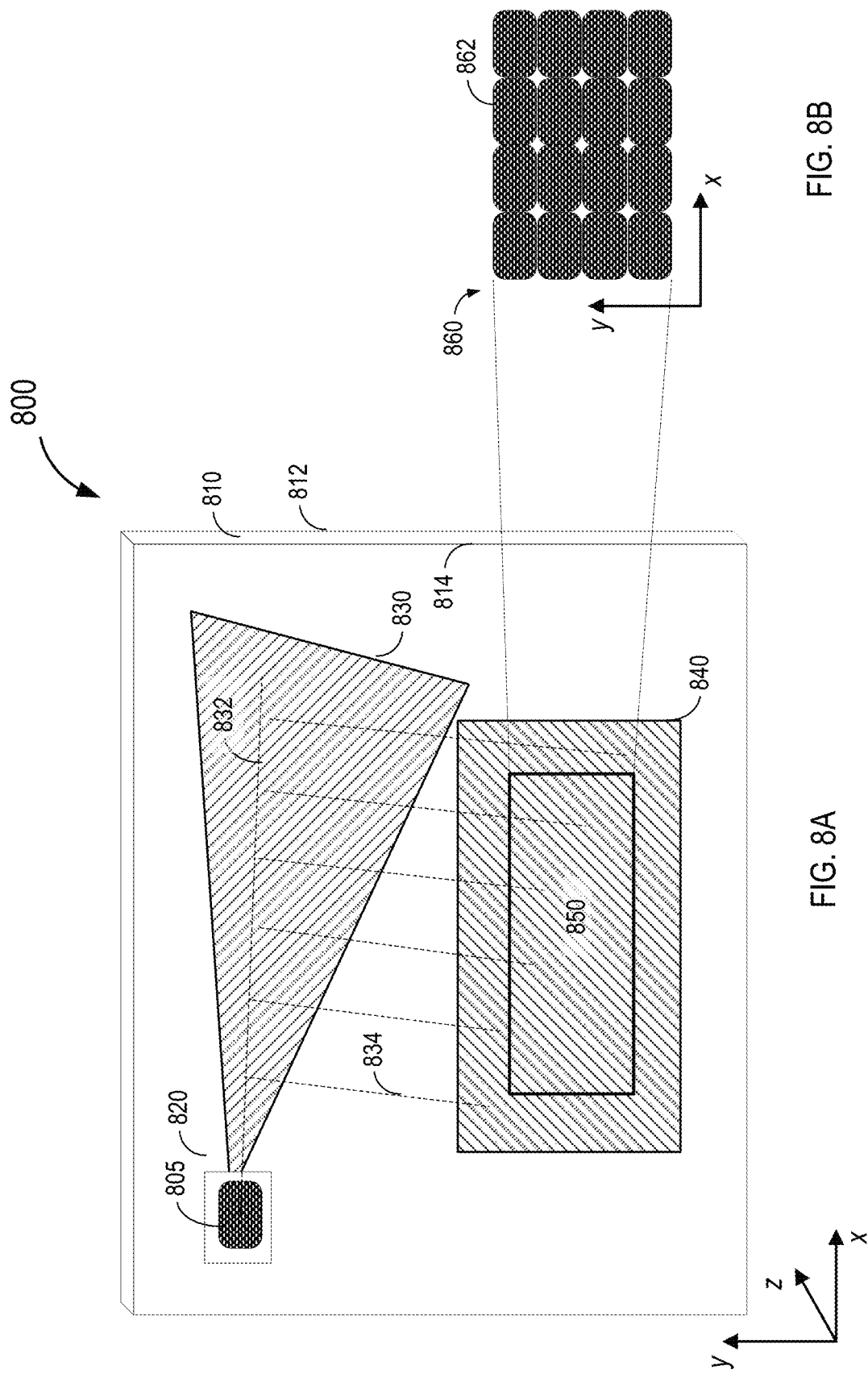

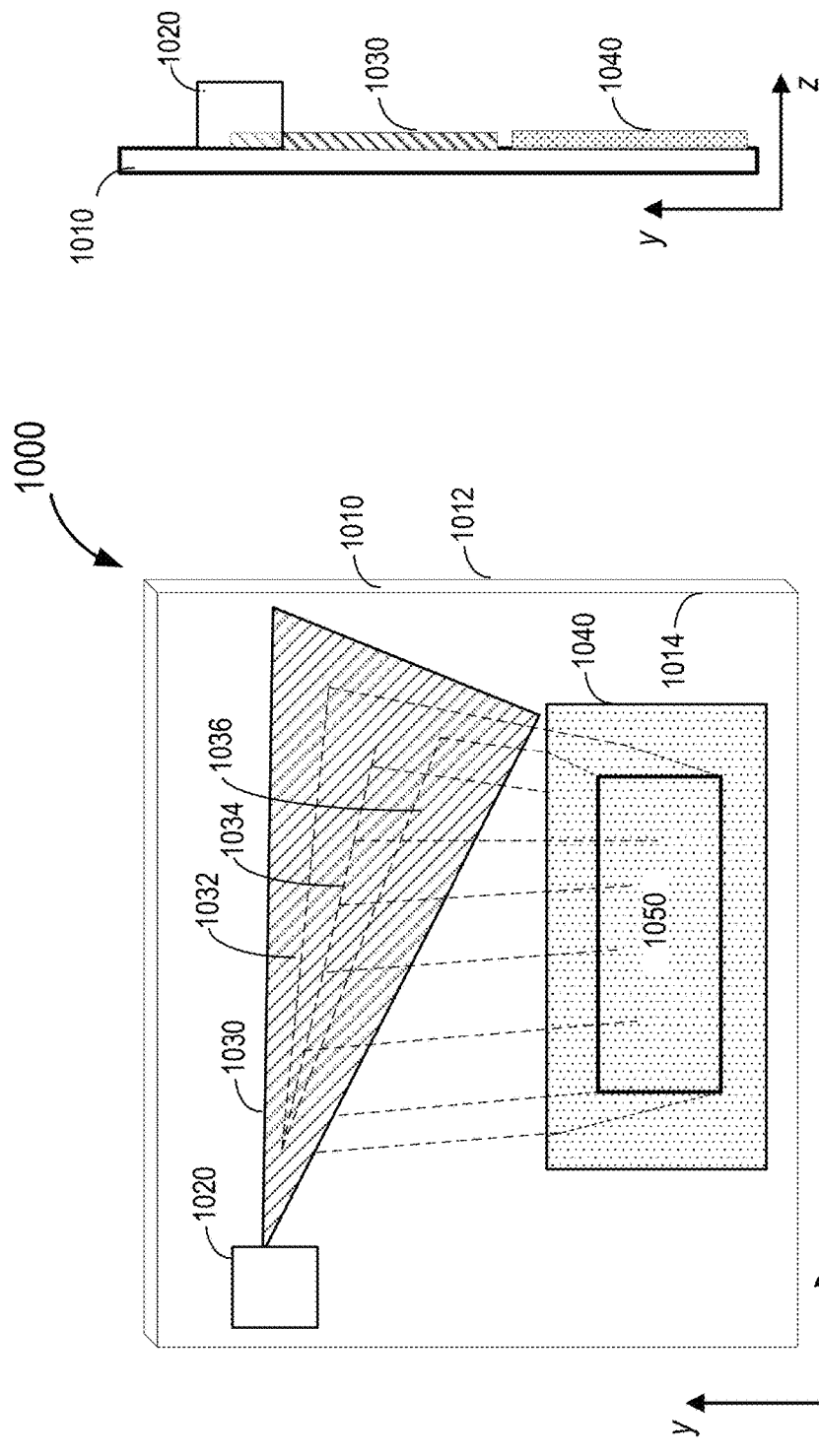

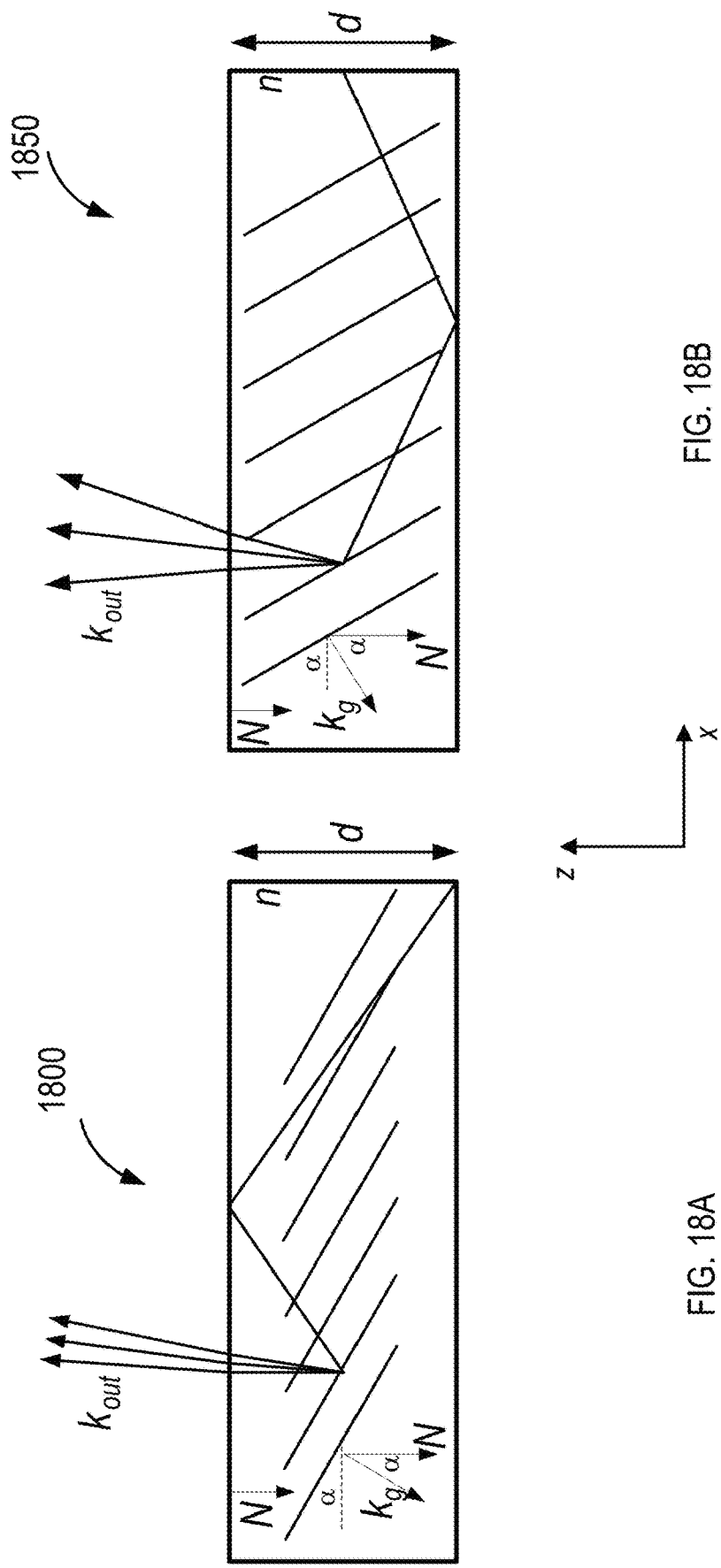

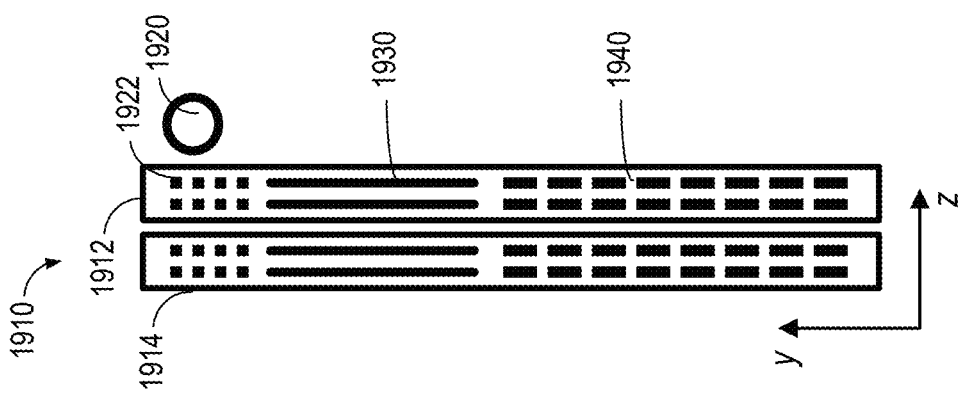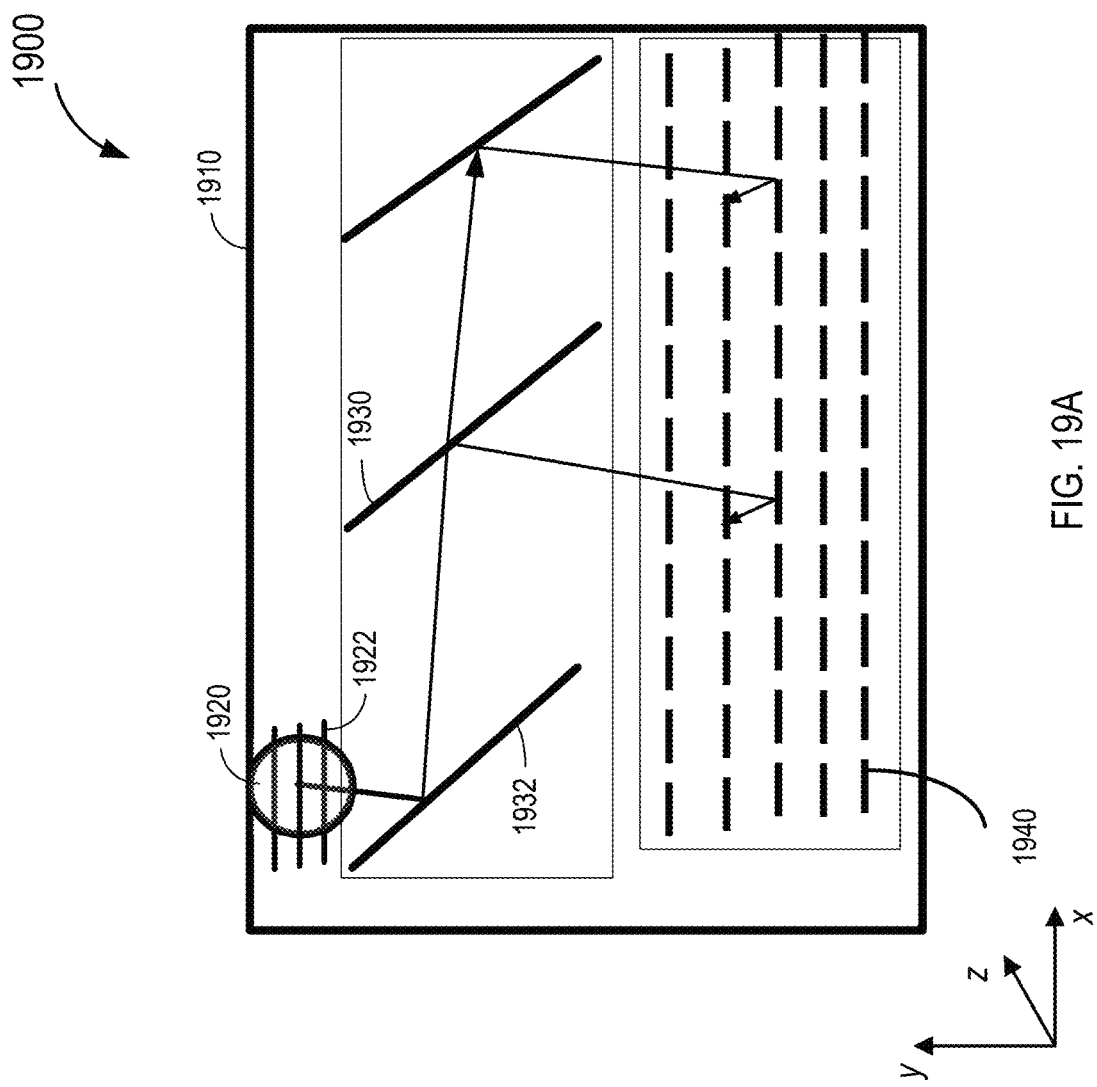

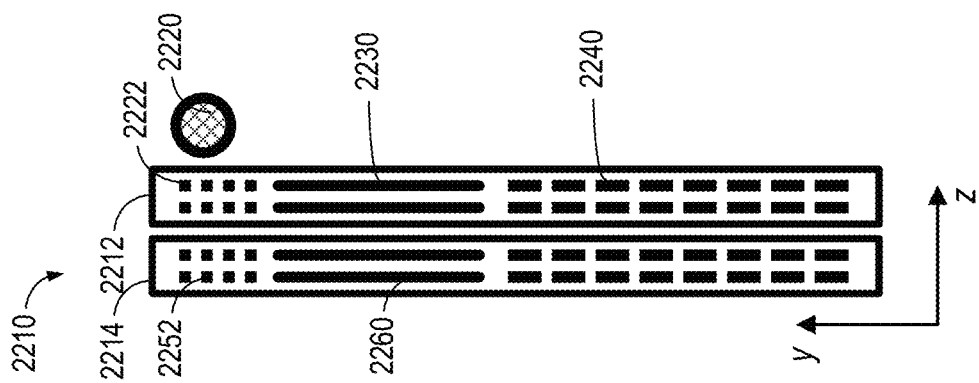
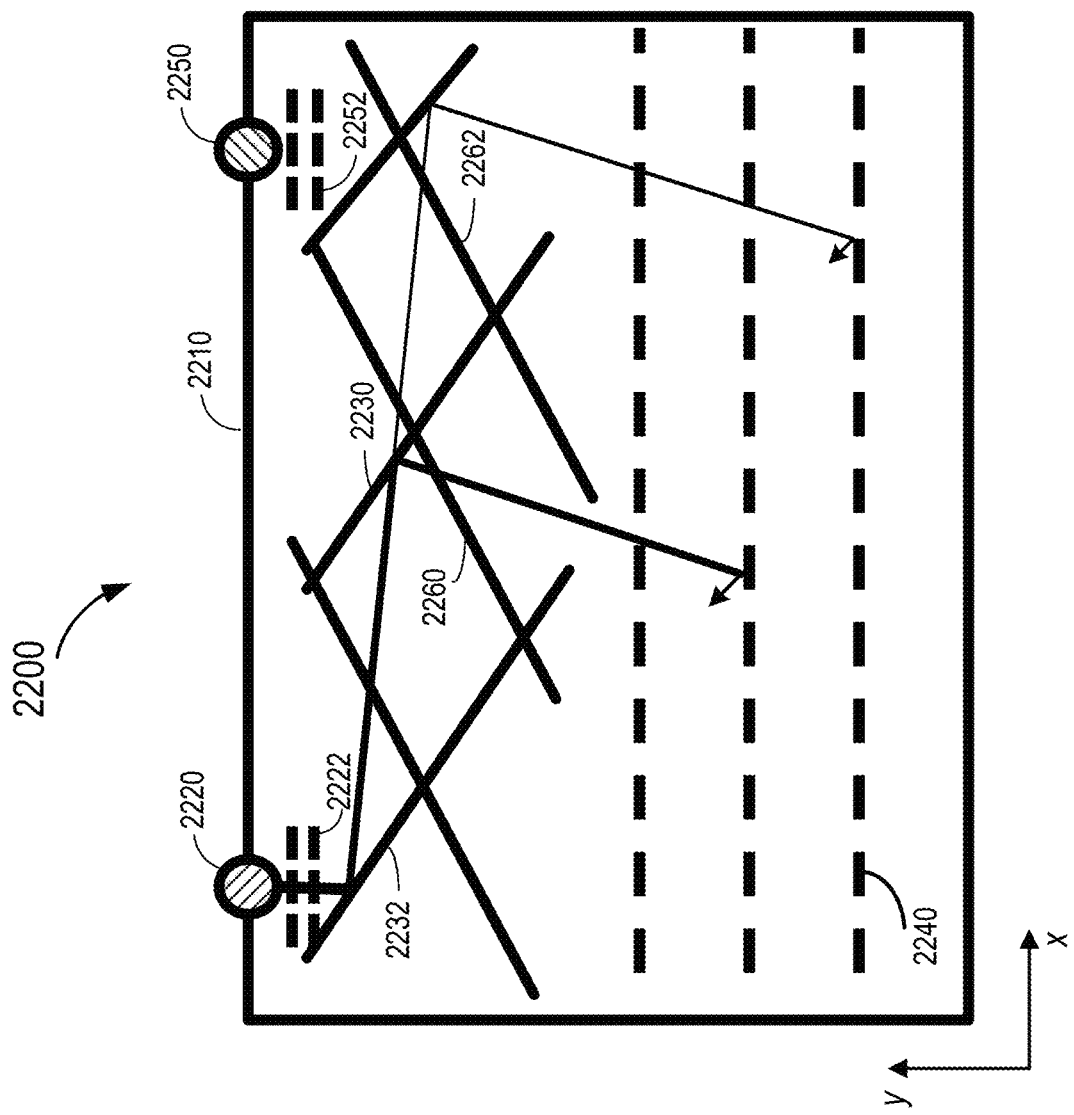
FIG. 22A
FIG. 22B

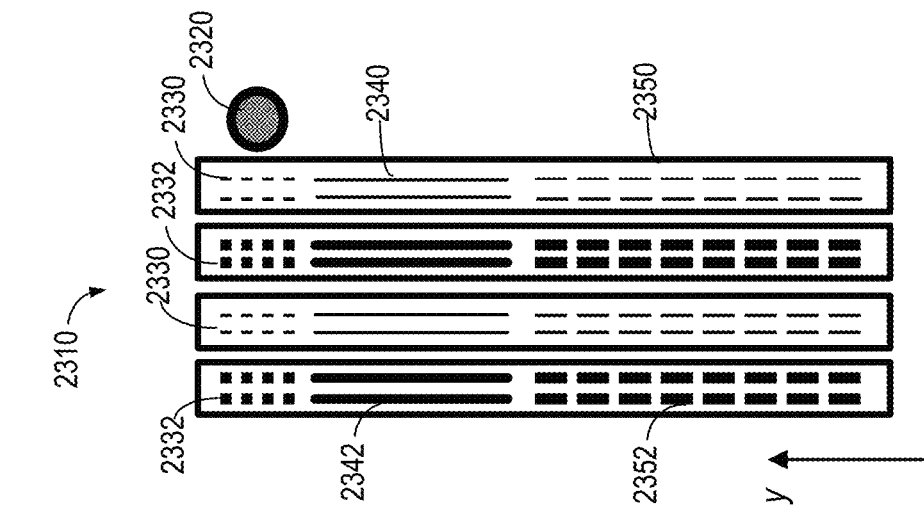
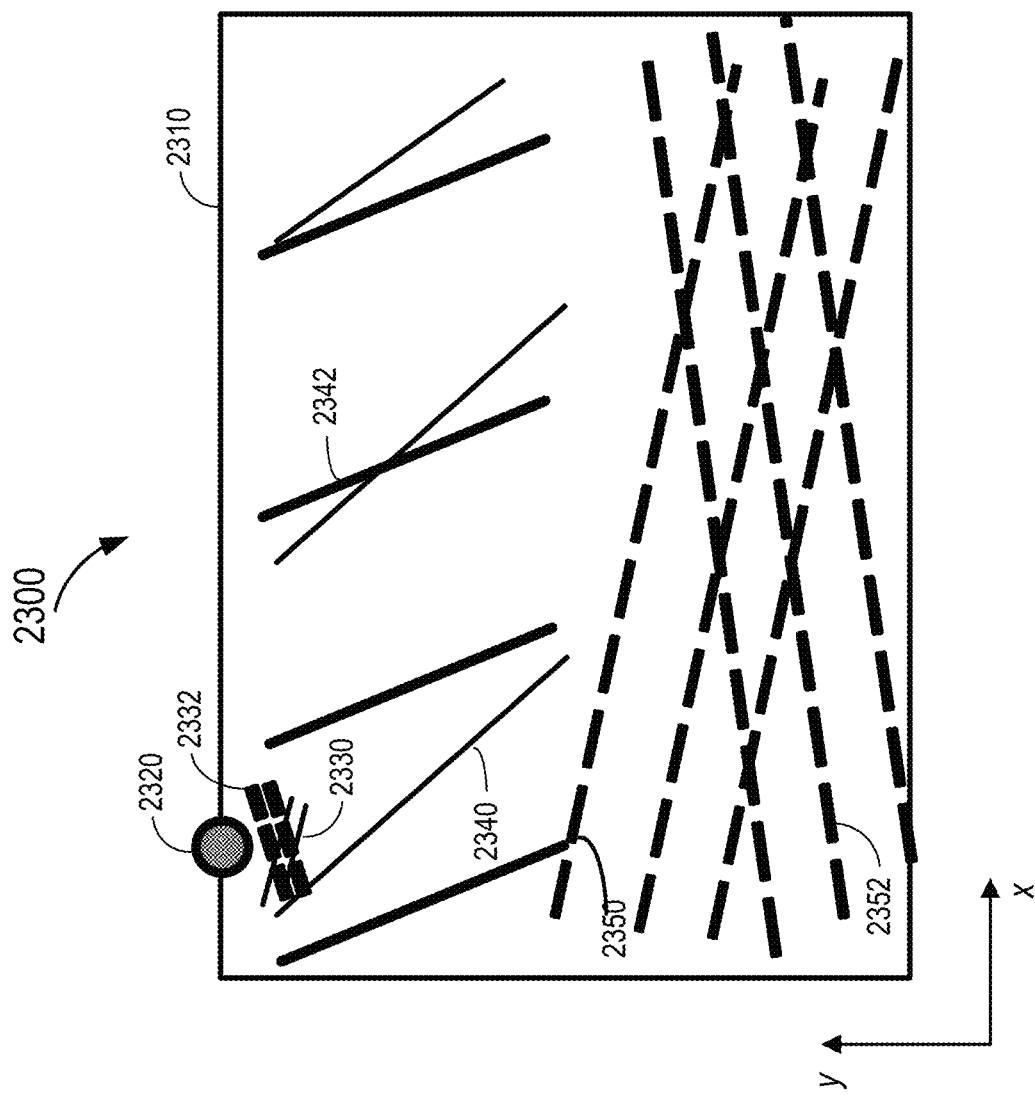
FIG. 23A
FIG. 23B

SPATIALLY MULTIPLEXED VOLUME BRAGG GRATINGS WITH VARIED REFRACTIVE INDEX MODULATIONS FOR WAVEGUIDE DISPLAY

CROSS-REFERENCE TO RELATED APPLICATION

This patent application claims priority to U.S. Provisional Patent Application Ser. No. 62/891,167, filed Aug. 23, 2019, entitled "Volume Bragg Grating-Based Waveguide Display," the disclosure of which is hereby incorporated by reference in its entirety for all purposes.

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a grating. Light from the surrounding environment may pass through a see-through region of the waveguide and reach the user's eyes as well.

SUMMARY

This disclosure relates generally to volume Bragg grating-based waveguide displays for near-eye display. More specifically, disclosed herein are techniques for expanding the eyebox, reducing display haze, reducing physical size, improving optical efficiency, reducing optical artifacts, and increasing field of view of optical see-through near-eye display systems using volume Bragg grating (VBG) couplers. Various inventive embodiments are described herein, including devices, systems, methods, and the like.

According to some embodiments, a waveguide display may include a substrate, a first reflection VBG on the substrate and characterized by a first refractive index modulation, and a second reflection VBG on the substrate and including a first region and a second region. The first reflection VBG may be configured to diffract display light in a first wavelength range such that the display light in the first wavelength range propagates in the substrate through total internal reflection to the first region and the second region of the second reflection VBG. The first region of the second reflection VBG may be characterized by a second refractive index modulation lower than the first refractive index modulation and may be configured to diffract display light in a second wavelength range that is within the first wavelength range. The second region of the second reflection VBG may be characterized by a third refractive index modulation greater than the second refractive index modulation and may be configured to diffract display light in a third wavelength range that includes and is larger than the second wavelength range. The first region and the second region of the second reflection VBG may be arranged such that the display light in the first wavelength range reaches the first region before reaching the second region.

In some embodiments, the first reflection VBG and the second reflection VBG may have a same grating vector in a plane perpendicular to a surface normal direction of the substrate. The third refractive index modulation may be equal to or less than the first refractive index modulation, and the first wavelength range may be the same as or includes the third wavelength range. In some embodiments, the second reflection VBG may further include a third region between the first region and the second region, where the third region may be characterized by a fourth refractive index modulation greater than the second refractive index modulation but lower than the third refractive index modulation and may be configured to diffract display light in a fourth wavelength range that includes the second wavelength range and is within the third wavelength range.

In some embodiments, the waveguide display may further include a third reflection VBG multiplexed with the first reflection VBG and characterized by a fourth refractive index modulation, and a fourth reflection VBG multiplexed with the second reflection VBG in the first region and second region. The third reflection VBG may be configured to diffract display light in a fourth wavelength range such that the display light in the fourth wavelength range propagates in the substrate through total internal reflection to the first region and the second region of the fourth reflection VBG. The first region of the fourth reflection VBG may be characterized by a fifth refractive index modulation lower than the fourth refractive index modulation and may be configured to diffract display light in a fifth wavelength range that is within the fourth wavelength range. The second region of the fourth reflection VBG may be characterized by a sixth refractive index modulation greater than the fifth refractive index modulation and may be configured to diffract display light in a sixth wavelength range that includes and is larger than the fifth wavelength range.

In some embodiments, the first reflection VBG may be configured to diffract display light in the first wavelength range and a first field of view (FOV) range, and diffract display light in a fourth wavelength range and a second FOV range different from the first FOV range. In some embodiments, the substrate may be transparent to visible light, and the second reflection VBG may be transparent to visible light from an ambient environment. In some embodiments, the first reflection VBG may be configured to couple the display light in the first wavelength range into the substrate, and the second reflection VBG may be configured to couple the display light in the first wavelength range out of the substrate. In some embodiments, the waveguide display may further include a third grating and a fourth grating, where the third grating may be configured to diffract the display light in the first wavelength range from the first reflection VBG to the fourth grating, and the fourth grating may be configured to diffract the display light in the first wavelength range at two or more regions of the fourth grating to the second reflection VBG. The third grating and the fourth grating may have a same grating vector in a plane perpendicular to a surface normal direction of the substrate.

In some embodiments, the waveguide display may include an input coupler configured to couple the display light in the first wavelength range into the substrate, and an output coupler configured to couple the display light diffracted by the second reflection VBG out of the substrate. The input coupler and the output coupler may include multiplexed VBGs. In some embodiments, the waveguide display may include a light source configured to generate the display light, and projector optics configured to collimate the display light and direct the display light to the first reflection VBG.

According to certain embodiments, a waveguide display may include a waveguide transparent to visible light, a first VBG on the waveguide and characterized by a first refractive index modulation, and a second reflection VBG on the waveguide and including a plurality of regions characterized by different respective refractive index modulations. The first reflection VBG may be configured to diffract display light in a first wavelength range and a first FOV range such that the display light in the first wavelength range and the first FOV range may propagate in the waveguide through total internal reflection to the plurality of regions of the second reflection VBG. The plurality of regions of the second reflection VBG may be configured to diffract the display light in different respective wavelength ranges within the first wavelength range and the first FOV range. The first reflection VBG and the second reflection VBG may have a same grating vector in a plane perpendicular to a surface normal direction of the waveguide.

In some embodiments of the waveguide display, the first refractive index modulation and at least one of the different respective refractive index modulations of the plurality of regions of the second reflection VBG may be greater than a minimum refractive index modulation for diffraction efficiency saturation. In some embodiments, the plurality of regions of the second reflection VBG may be configured such that the display light in the first wavelength range and the first FOV range may reach a first region of the plurality of regions having a second refractive index modulation before reaching a second region of the plurality of regions having a third refractive index modulation that is greater than the second refractive index modulation.

In some embodiments, the first reflection VBG may be configured to couple the display light in the first wavelength range and the first FOV range into the waveguide, and the second reflection VBG may be configured to couple the display light in the first wavelength range and the first FOV range out of the waveguide and may be transparent to visible light from an ambient environment. In some embodiments, the waveguide display may also include a third grating and a fourth grating. The third grating may be configured to diffract the display light in the first wavelength range and the first FOV range from the first reflection grating to the fourth grating. The fourth grating may be configured to diffract the display light in the first wavelength range and the first FOV range at two or more regions of the fourth grating to the second reflection VBG. The third grating and the fourth grating may have a same grating vector in a plane perpendicular to a surface normal direction of the waveguide.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 8A illustrates an example of an optical see-through augmented reality system including a waveguide display and surface-relief gratings for exit pupil expansion according to certain embodiments. FIG. 8B illustrates an example of an eye box including two-dimensional replicated exit pupils according to certain embodiments.

FIG. 10A illustrates an example of a volume Bragg grating-based waveguide display according to certain embodiments. FIG. 10B illustrates a top view of the example of the volume Bragg grating-based waveguide display shown in FIG. 10A. FIG. 10C illustrates a side view of the example of the volume Bragg grating-based waveguide display shown in FIG. 10A.

FIG. 18A illustrates the light dispersion by an example of a reflection volume Bragg grating in a waveguide display according to certain embodiments. FIG. 18B illustrates the light dispersion by an example of a transmission volume Bragg grating in a waveguide display according to certain embodiments.

FIG. 19A is a front view of an example of a volume Bragg grating-based waveguide display with exit pupil expansion and dispersion reduction according to certain embodiments.

FIG. 19B is a side view of the example of the volume Bragg grating-based waveguide display including an image projector and multiple polymer layers according to certain embodiments.

FIG. 22A is a front view of an example of a volume Bragg grating-based waveguide display including two image projectors according to certain embodiments. FIG. 22B is a side view of the example of volume Bragg grating-based waveguide display including two image projectors according to certain embodiments.

FIG. 23A is a front view of an example of a volume Bragg grating-based waveguide display including a single image projector and gratings for field-of-view stitching according to certain embodiments. FIG. 23B is a side view of the example of the volume Bragg grating-based waveguide display with the single image projector and the gratings for field-of-view stitching according to certain embodiments.

Figure 1:
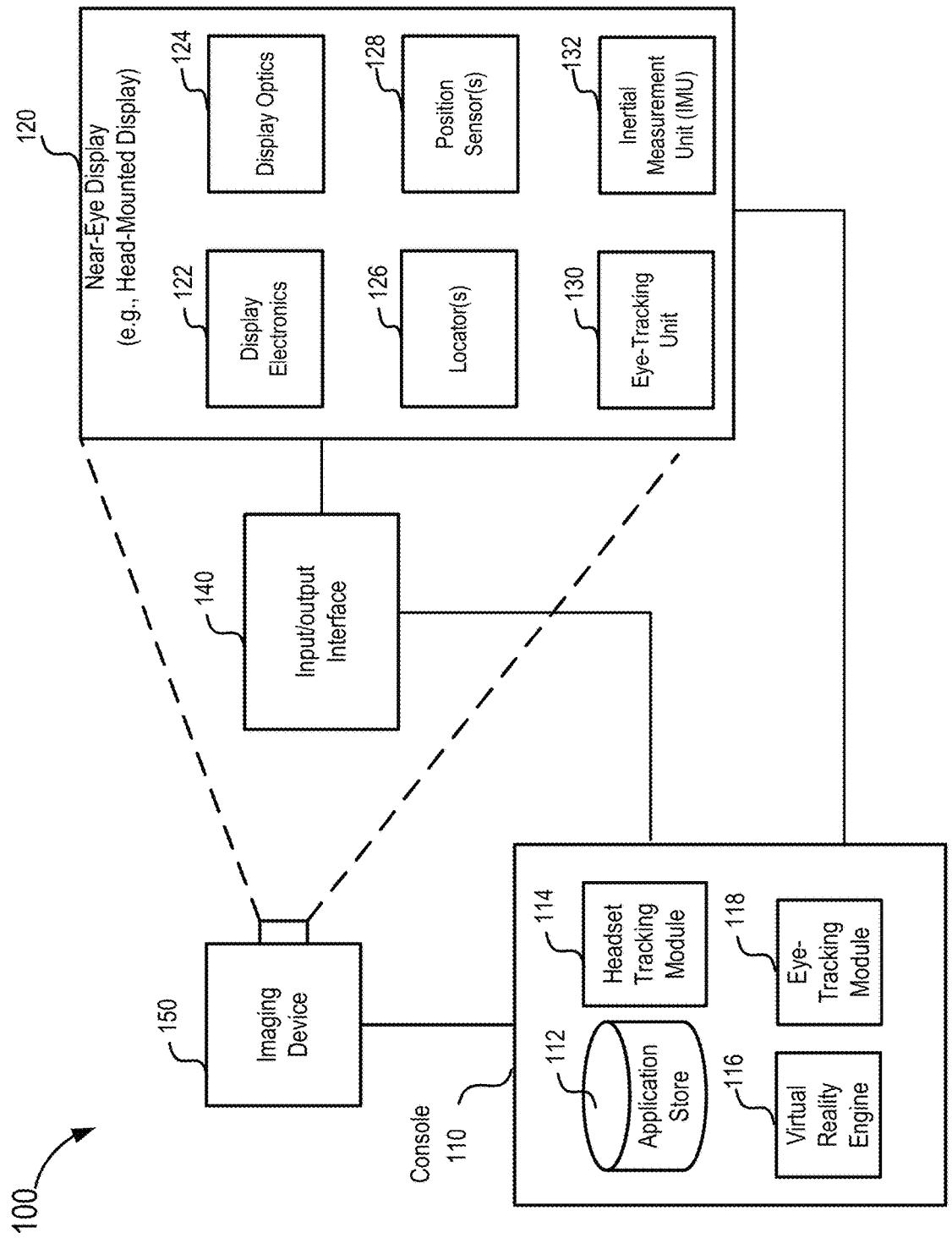
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to volume Bragg grating (VBG)-based waveguide display for near-eye display systems. In a near-eye display system, it is generally desirable to expand the eyebox, reduce display haze, improve image quality (e.g., resolution and contrast), reduce physical size, increase power efficiency, and increase the field of view. In a waveguide-based near-eye display system, light of projected images may be coupled into a waveguide (e.g., a transparent substrate), propagate within the waveguide, and be coupled out of the waveguide at different locations to replicate exit pupils and expand the eyebox. Two or more gratings may be used to expand the exit pupil in two dimensions. In a waveguide-based near-eye display system for augmented reality applications, light from the surrounding environment may pass through at least a see-through region of the waveguide display (e.g., the transparent substrate) and reach the user's eyes. In some implementations, the light of the projected images may be coupled into or out of the waveguide using diffractive optical elements, such as gratings.

Optical couplers implemented using diffractive optical elements may have a limited field of view due to the angular dependence of grating efficiency. Therefore, light incident on the couplers from multiple incident angles (e.g., from different fields of view) may not be diffracted at equivalent or similar efficiency. In addition, couplers implemented using diffractive optical elements may cause dispersion between light of different colors and may have different diffraction angles for light of different colors. Therefore, different color components in a color image may not overlap with each other. Thus, the quality of the displayed image (e.g., color reproduction neutrality) may be reduced. Furthermore, the fields of view for light of different colors may be reduced or partially clipped due to the light dispersion and the limited range of wave vectors of light that can be guided by the waveguide display. To reduce the dispersion and improve the field of view (FOV) range and diffraction efficiency, thick transmission and/or reflection VBG gratings that include many multiplexed gratings to cover different fields of view for different color components may be used, which may be impractical in many cases and/or may cause significant display and see-through haze due to the thickness of the gratings and the large number of exposures to record the multiplexed VBG gratings. For example, in some cases, transmission VBG gratings with a thickness of greater than 1 mm may be needed in order to reduce the dispersion and achieve a desired FOV range and diffraction efficiency. Reflection VBG gratings with a relatively lower thickness may be used to achieve the desired performance. However, with reflection gratings, the gratings for two-dimensional pupil expansion may not overlap and thus the physical size of the waveguide display may be large and the display haze may still be significant.

According to certain embodiments, two VBG gratings (or two portions of a same grating) with matching grating vectors (e.g., having the same grating vector in a plane perpendicular to a surface normal direction of the transparent substrate) may be used to diffract display light and expand the exit pupil in one dimension. The two VBG gratings may compensate for the dispersion of display light caused by each other to reduce the overall dispersion, due to the opposite Bragg conditions (e.g., +1 order and −1 order diffractions) at the two VBG gratings. Therefore, thin VBG gratings may be used and may still achieve the desired resolution. Because of the dispersion compensation, thin transmission VBG gratings may be used to achieve the desired resolution, and the gratings for the two-dimensional pupil expansion may at least partially overlap to reduce the physical size of the waveguide display.

In some embodiments, to achieve the desired FOV, coupling efficiency, and coupling efficiency uniformity across the full FOV and color spectrum, multiple VBG layers including multiplexed VBGs may be formed on one or more waveguide plates. Each VBG layer may be used to couple light in a certain FOV and/or color range at a relatively high efficiency, and the combination of the multiple VBG layers may provide full coverage of the desired FOV and color range at relatively high and uniform coupling efficiencies.

In some embodiments, a first pair of VBG gratings (or two portions of a grating) may be used to expand the exit pupil in one dimension and compensate for the dispersion caused by each other, and a second pair of VBG gratings (or two portions of a grating) may be used to expand the exit pupil in another dimension and may compensate for the dispersion caused by each other. Thus, the exit pupil may be replicated in two dimensions and the resolution of the displayed images may be high in both dimensions.

According to certain embodiments, the first pair and/or the second pair of gratings may each include multiplexed reflection volume Bragg gratings. The multiplexed reflection VBGs may include reflection VBGs that may have high diffraction efficiencies and low crosstalk between reflection VBGs in the multiplexed reflection VBGs. In some embodiments, the reflection VBGs may have refractive index modulations greater than the minimum refractive index modulation for diffraction efficiency saturation, and thus may have high diffraction efficiencies and wide full-width-half-magnitude (FWHM) wavelength ranges and/or FWHM angular ranges. As such, fewer reflection VBGs may be used to cover the wavelength range of the light source and the full FOV to improve the efficiency and performance of the waveguide display.

In some embodiments, each of the first pair of gratings and/or the second pair of gratings may include a first reflection VBG characterized by a first refractive index modulation, and a second reflection VBG including a plurality of regions characterized by different respective refractive index modulations. The first reflection VBG may be configured to diffract display light in a first wavelength range (and/or a first FOV range) such that the display light in the first wavelength range (and/or the first FOV range) may propagate in the waveguide through total internal reflection to the plurality of regions of the second reflection VBG. The plurality of regions of the second reflection VBG may be configured to diffract the display light in different respective wavelength (and/or FOV) ranges within the first wavelength range (and/or the first FOV range) due to the different respective refractive index modulations. The first reflection VBG and the second reflection VBG may have a same grating vector in a plane perpendicular to a surface normal direction of the waveguide to reduce dispersion. The first refractive index modulation and at least one of the different respective refractive index modulations of the plurality of regions of the second reflection VBG may be greater than the minimum refractive index modulation for diffraction efficiency saturation. The plurality of regions of the second reflection VBG may be arranged such that the display light in the first wavelength range (and/or the first FOV range) reaches a first region having a lower refractive index modulation in the plurality of regions before reaching a second region having a higher refractive index modulation in the plurality of regions. In this way, display light in a narrower portion of the first wavelength range (and/or the first FOV) may be diffracted by the first region, and display light in the first wavelength range (and/or the first FOV) but outside of the narrower portion may be diffracted by the second region.

In the following description, various inventive embodiments are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (e.g., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback applications, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
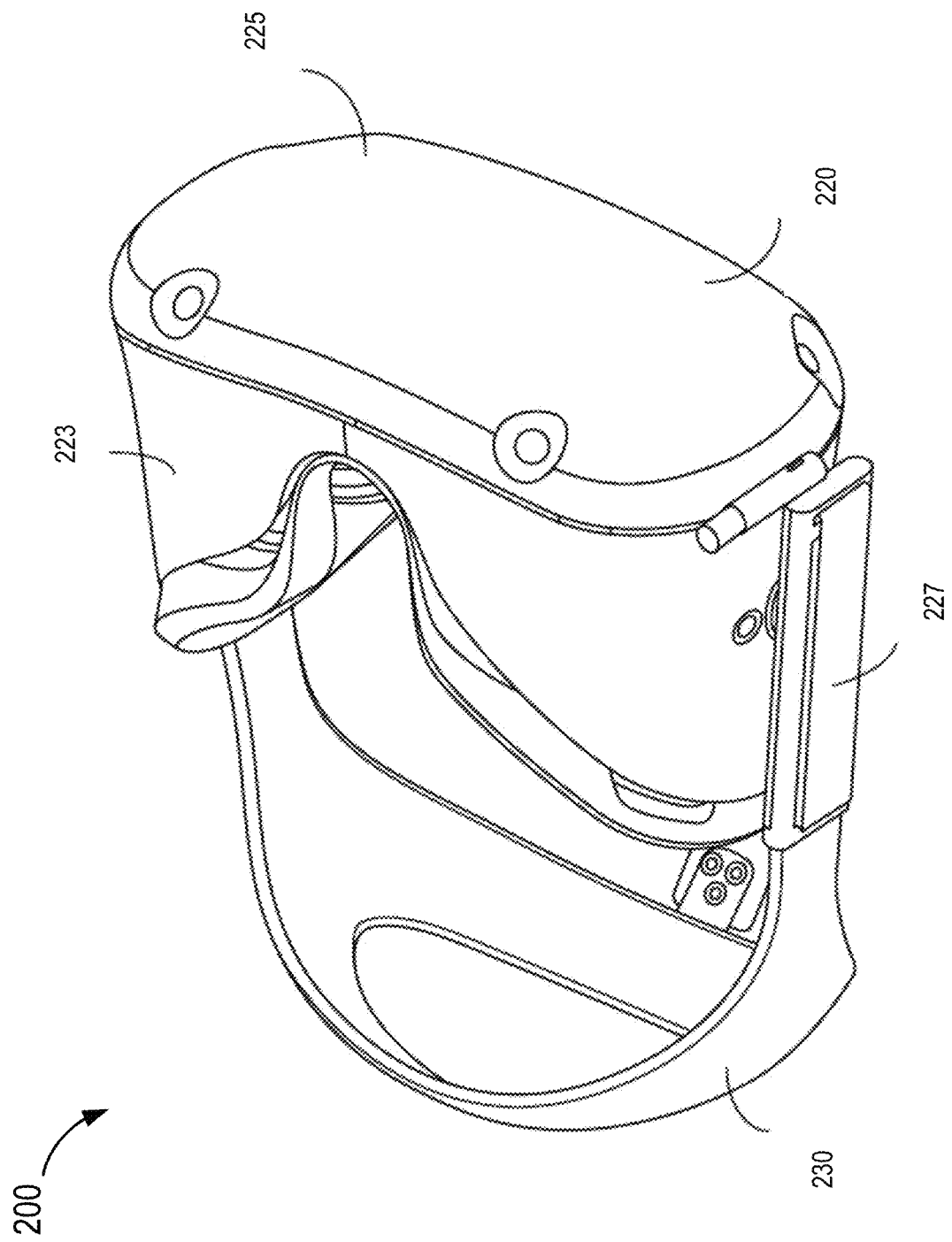
FIG. 2 is a perspective view of an example of a near-eye display system in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMO-LED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
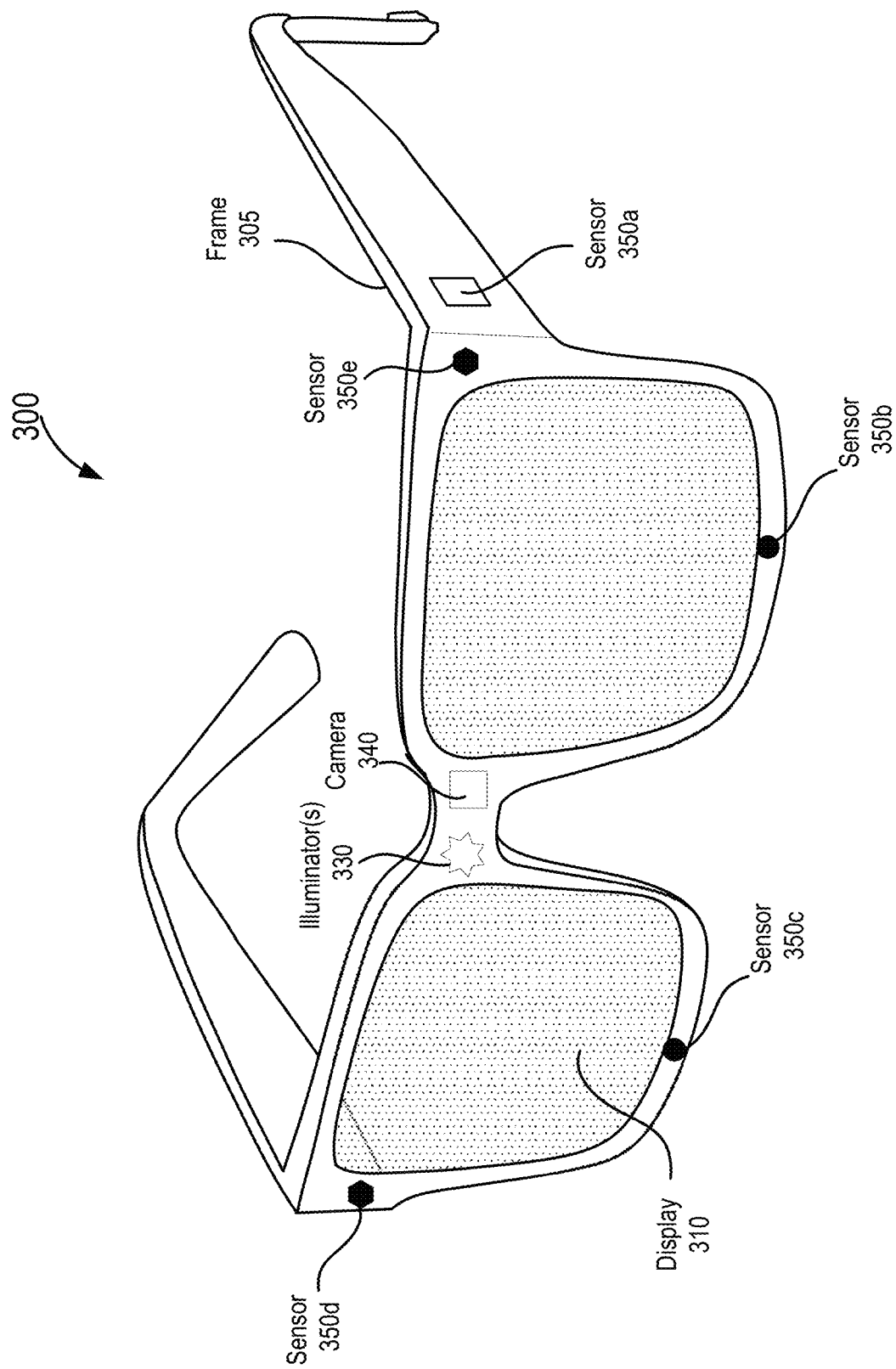
FIG. 3 is a perspective view of an example of a near-eye display system in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
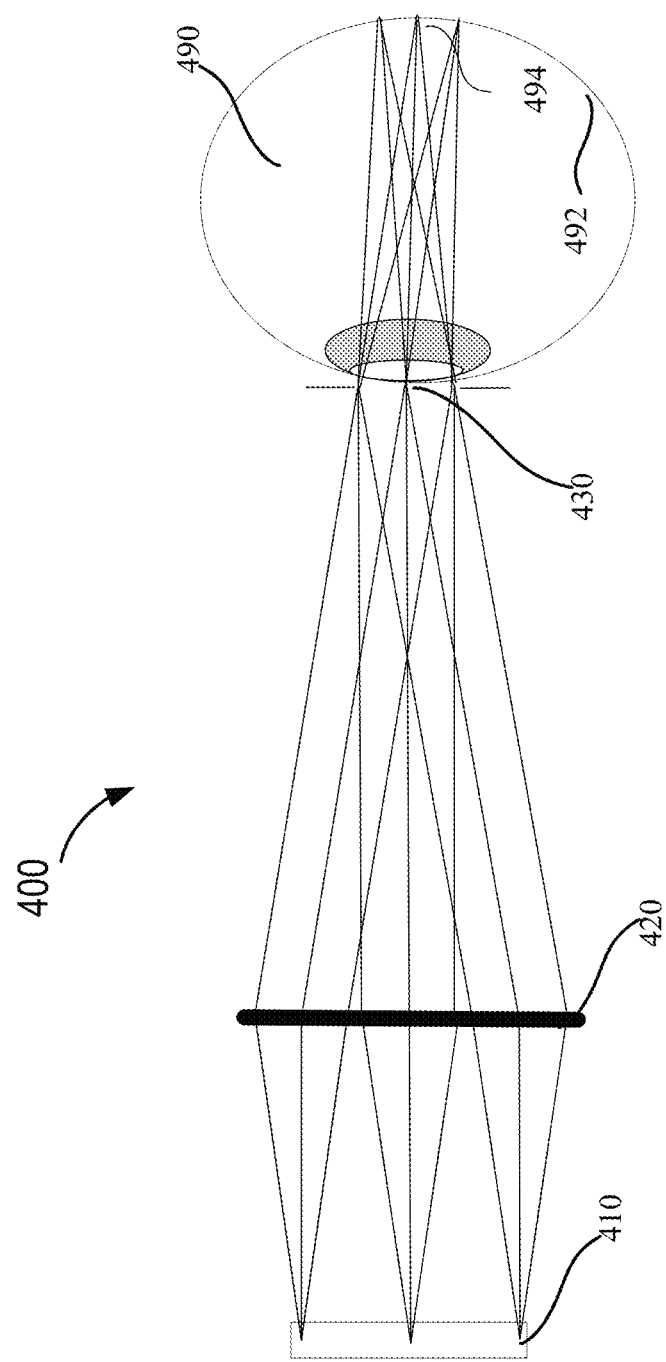
FIG. 4 is a simplified diagram illustrating an example of an optical system in a near-eye display system.

FIG. 4 is a simplified diagram illustrating an example of an optical system 400 in a near-eye display system. Optical system 400 may include an image source 410 and projector optics 420. In the example shown in FIG. 4, image source 410 is in front of projector optics 420. In various embodiments, image source 410 may be located outside of the field of view of user's eye 490. For example, one or more reflectors or directional couplers may be used to deflect light from an image source that is outside of the field of view of user's eye 490 to make the image source appear to be at the location of image source 410 shown in FIG. 4. Light from an area (e.g., a pixel or a light emitting device) on image source 410 may be collimated and directed to an exit pupil 430 by projector optics 420. Thus, objects at different spatial locations on image source 410 may appear to be objects far away from user's eye 490 in different viewing angles (FOVs). The collimated light from different viewing angles may then be focused by the lens of user's eye 490 onto different locations on retina 492 of user's eye 490. For example, at least some portions of the light may be focused on a fovea 494 on retina 492. Collimated light rays from an area on image source 410 and incident on user's eye 490 from a same direction may be focused onto a same location on retina 492. As such, a single image of image source 410 may be formed on retina 492.

The user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Field of view describes the angular range of the image as seen by the user, usually measured in degrees as observed by one eye (for a monocular HMD) or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than about 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may require larger displays or optical systems, which may influence the size, weight, cost, and comfort of using the HMD.

Resolution may refer to the angular size of a displayed pixel or image element appearing to a user, or the ability for the user to view and correctly interpret an object as imaged by a pixel and/or other pixels. The resolution of an HMD may be specified as the number of pixels on the image source for a given FOV value, from which an angular resolution may be determined by dividing the FOV in one direction by the number of pixels in the same direction on the image source. For example, for a horizontal FOV of 40° and 1080 pixels in the horizontal direction on the image source, the corresponding angular resolution may be about 2.2 arcminutes, compared with the one-arc-minute resolution associated with Snellen 20/20 human visual acuity.

In some cases, the eyebox may be a two-dimensional box in front of the user's eye, from which the displayed image from the image source may be viewed. If the pupil of the user moves outside of the eyebox, the displayed image may not be seen by the user. For example, in a non-pupil-forming configuration, there exists a viewing eyebox within which there will be unvignetted viewing of the HMD image source, and the displayed image may vignette or may be clipped but may still be viewable when the pupil of user's eye is outside of the viewing eyebox. In a pupil-forming configuration, the image may not be viewable outside the exit pupil.

The fovea of a human eye, where the highest resolution may be achieved on the retina, may correspond to an FOV of about 2° to about 3°. This may require that the eye rotates in order to view off-axis objects with a highest resolution. The rotation of the eye to view the off-axis objects may introduce a translation of the pupil because the eye rotates around a point that is about 10 mm behind the pupil. In addition, a user may not always be able to accurately position the pupil (e.g., having a radius of about 2.5 mm) of the user's eye at an ideal location in the eyebox. Furthermore, the environment where the HMD is used may require the eyebox to be larger to allow for movement of the user's eye and/or head relative the HMD, for example, when the HMD is used in a moving vehicle or designed to be used while the user is moving on foot. The amount of movement in these situations may depend on how well the HMD is coupled to the user's head.

Thus, the optical system of the HMD may need to provide a sufficiently large exit pupil or viewing eyebox for viewing the full FOV with full resolution, in order to accommodate the movements of the user's pupil relative to the HMD. For example, in a pupil-forming configuration, a minimum size of 12 mm to 15 mm may be desired for the exit pupil. If the eyebox is too small, minor misalignments between the eye and the HMD may result in at least partial loss of the image, and the user experience may be substantially impaired. In general, the lateral extent of the eyebox is more critical than the vertical extent of the eyebox. This may be in part due to the significant variances in eye separation distance between users, and the fact that misalignments to eyewear tend to more frequently occur in the lateral dimension and users tend to more frequently adjust their gaze left and right, and with greater amplitude, than adjusting the gaze up and down. Thus, techniques that can increase the lateral dimension of the eyebox may substantially improve a user's experience with an HMD. On the other hand, the larger the eyebox, the larger the optics and the heavier and bulkier the near-eye display device may be.

In order to view the displayed image against a bright background, the image source of an AR HMD may need to be sufficiently bright, and the optical system may need to be efficient to provide a bright image to the user's eye such that the displayed image may be visible in a background including strong ambient light, such as sunlight. The optical system of an HMD may be designed to concentrate light in the eyebox. When the eyebox is large, an image source with high power may be used to provide a bright image viewable within the large eyebox. Thus, there may be trade-offs among the size of the eyebox, cost, brightness, optical complexity, image quality, and size and weight of the optical system.

Figure 5:
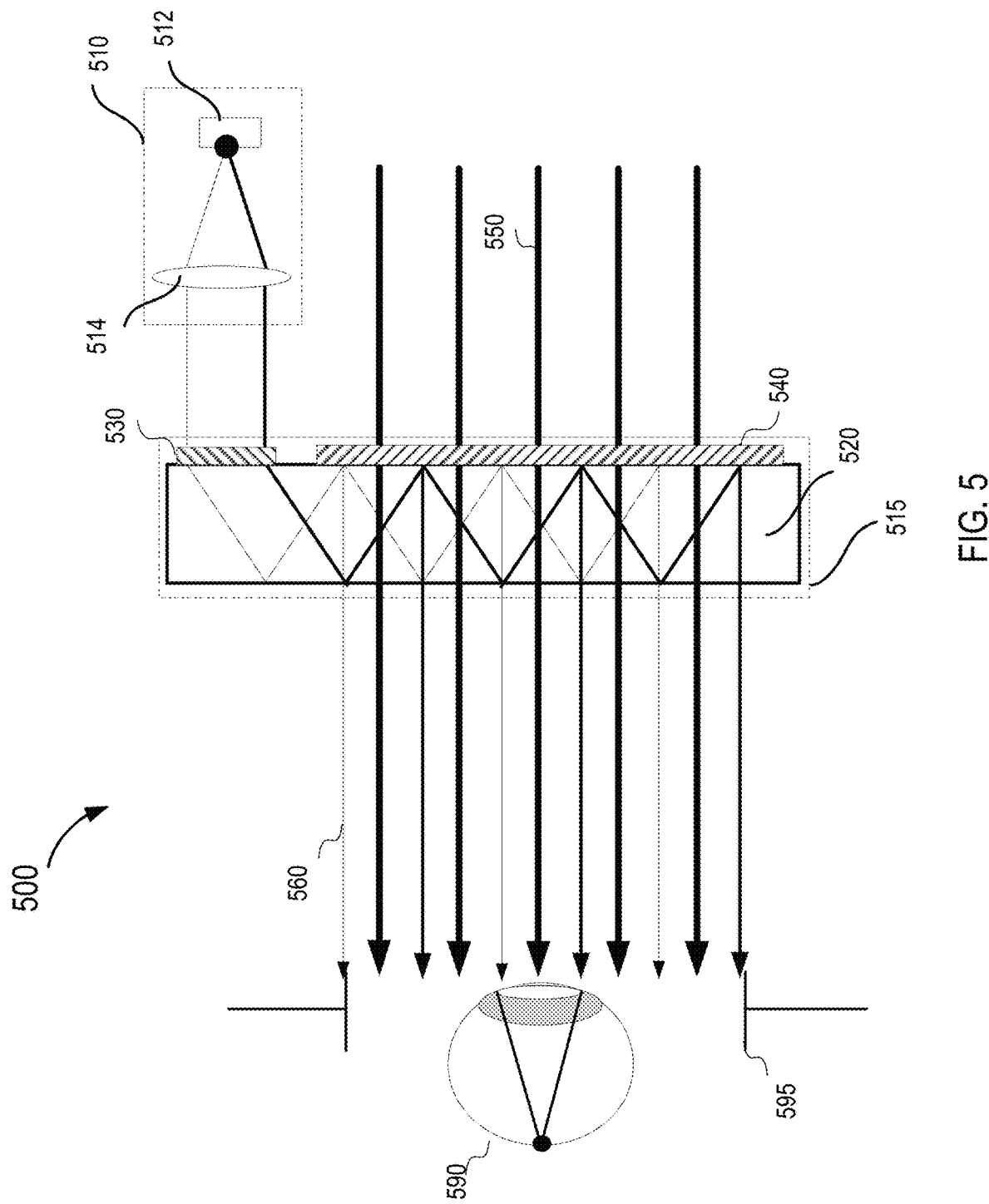
FIG. 5 illustrates an example of an optical see-through augmented reality system including a waveguide display for exit pupil expansion according to certain embodiments.

FIG. 5 illustrates an example of an optical see-through augmented reality system 500 including a waveguide display for exit pupil expansion according to certain embodiments. Augmented reality system 500 may include a projector 510 and a combiner 515. Projector 510 may include a light source or image source 512 and projector optics 514. In some embodiments, light source or image source 512 may include one or more micro-LED devices. In some embodiments, image source 512 may include a plurality of pixels that displays virtual objects, such as an LCD display panel or an LED display panel. In some embodiments, image source 512 may include a light source that generates coherent or partially coherent light. For example, image source 512 may include a laser diode, a vertical cavity surface emitting laser, an LED, a superluminescent LED (sLED), and/or a micro-LED described above. In some embodiments, image source 512 may include a plurality of light sources (e.g., an array of micro-LEDs described above) each emitting a monochromatic image light corresponding to a primary color (e.g., red, green, or blue). In some embodiments, image source 512 may include three two-dimensional arrays of micro-LEDs, where each two-dimensional array of micro-LEDs may include micro-LEDs configured to emit light of a primary color (e.g., red, green, or blue). In some embodiments, image source 512 may include an optical pattern generator, such as a spatial light modulator. Projector optics 514 may include one or more optical components that can condition the light from image source 512, such as expanding, collimating, scanning, or projecting light from image source 512 to combiner 515. The one or more optical components may include, for example, one or more lenses, liquid lenses, mirrors, free-form optics, apertures, and/or gratings. For example, in some embodiments, image source 512 may include one or more one-dimensional arrays or elongated two-dimensional arrays of micro-LEDs, and projector optics 514 may include one or more one-dimensional scanners (e.g., micro-mirrors or prisms) configured to scan the one-dimensional arrays or elongated two-dimensional arrays of micro-LEDs to generate image frames. In some embodiments, projector optics 514 may include a liquid lens (e.g., a liquid crystal lens) with a plurality of electrodes that allows scanning of the light from image source 512.

Combiner 515 may include an input coupler 530 for coupling light from projector 510 into a substrate 520 of combiner 515. Input coupler 530 may include a volume holographic grating or another diffractive optical element (DOE) (e.g., a surface-relief grating (SRG)), a slanted reflective surface of substrate 520, or a refractive coupler (e.g., a wedge or a prism). For example, input coupler 530 may include a reflection volume Bragg grating or a transmission volume Bragg grating. Input coupler 530 may have a coupling efficiency of greater than 30%, 50%, 75%, 90%, or higher for visible light. Light coupled into substrate 520 may propagate within substrate 520 through, for example, total internal reflection (TIR). Substrate 520 may be in the form of a lens of a pair of eyeglasses. Substrate 520 may have a flat or a curved surface, and may include one or more types of dielectric materials, such as glass, quartz, plastic, polymer, poly(methyl methacrylate) (PMMA), crystal, ceramic, or the like. A thickness of the substrate may range from, for example, less than about 1 mm to about 10 mm or more. Substrate 520 may be transparent to visible light.

Substrate 520 may include or may be coupled to a plurality of output couplers 540 each configured to extract at least a portion of the light guided by and propagating within substrate 520 from substrate 520, and direct extracted light 560 to an eyebox 595 where an eye 590 of the user of augmented reality system 500 may be located when augmented reality system 500 is in use. The plurality of output couplers 540 may replicate the exit pupil to increase the size of eyebox 595, such that the displayed image may be visible in a larger area. As input coupler 530, output couplers 540 may include grating couplers (e.g., volume holographic gratings or surface-relief gratings), other diffraction optical elements (DOEs), prisms, etc. For example, output couplers 540 may include reflection volume Bragg gratings or transmission volume Bragg gratings. Output couplers 540 may have different coupling (e.g., diffraction) efficiencies at different locations. Substrate 520 may also allow light 550 from the environment in front of combiner 515 to pass through with little or no loss. Output couplers 540 may also allow light 550 to pass through with little loss. For example, in some implementations, output couplers 540 may have a very low diffraction efficiency for light 550 such that light 550 may be refracted or otherwise pass through output couplers 540 with little loss, and thus may have a higher intensity than extracted light 560. In some implementations, output couplers 540 may have a high diffraction efficiency for light 550 and may diffract light 550 in certain desired directions (i.e., diffraction angles) with little loss. As a result, the user may be able to view combined images of the environment in front of combiner 515 and images of virtual objects projected by projector 510. In some implementations, output couplers 540 may have a high diffraction efficiency for light 550 and may diffract light 550 to certain desired directions (e.g., diffraction angles) with little loss.

In some embodiments, projector 510, input coupler 530, and output coupler 540 may be on any side of substrate 520. Input coupler 530 and output coupler 540 may be reflective gratings (also referred to as reflection gratings) or transmissive gratings (also referred to as transmission gratings) to couple display light into or out of substrate 520.

Figure 6:
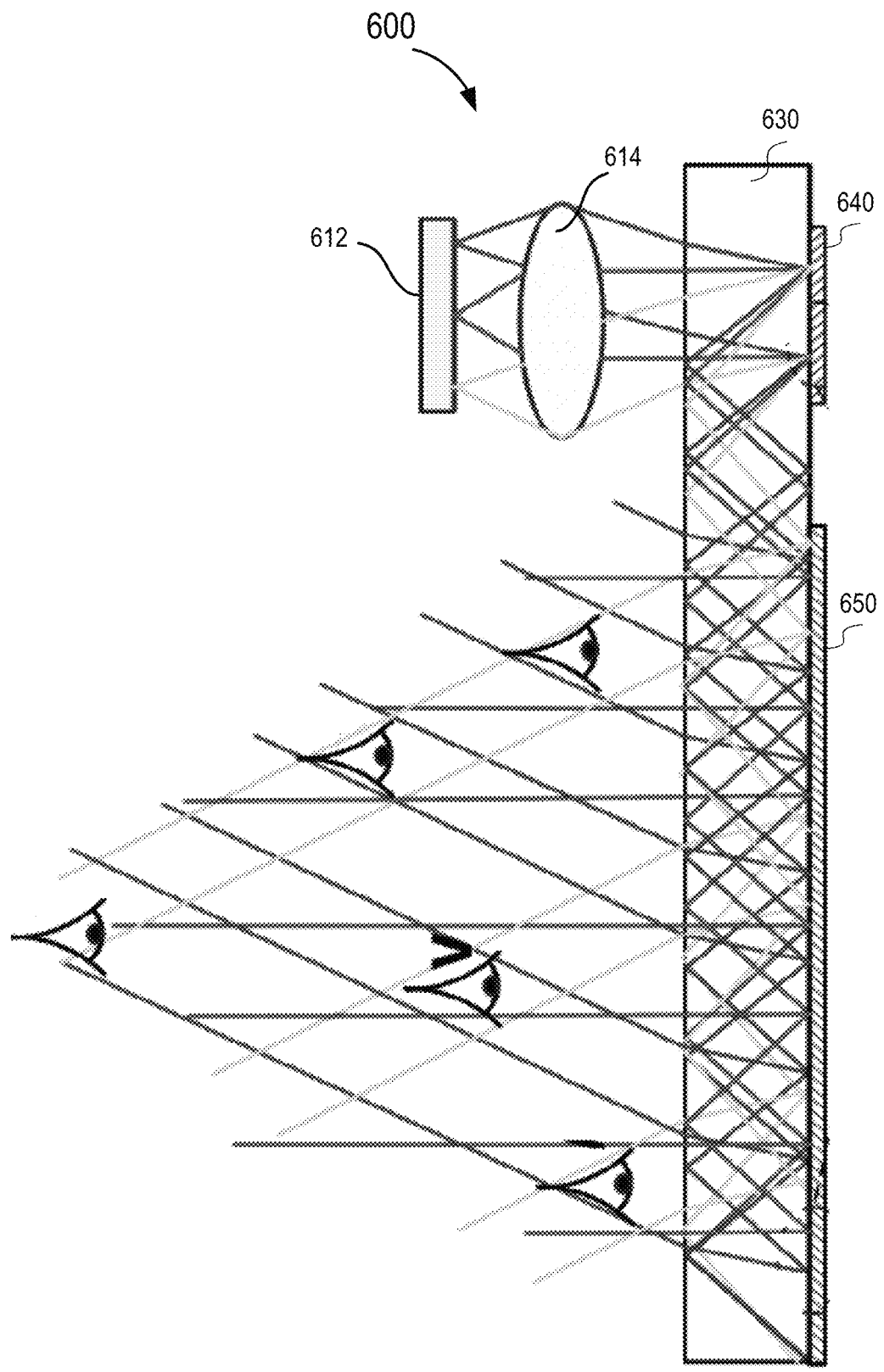
FIG. 6 illustrates an example of an optical see-through augmented reality system including a waveguide display for exit pupil expansion according to certain embodiments.

FIG. 6 illustrates an example of an optical see-through augmented reality system 600 including a waveguide display for exit pupil expansion according to certain embodiments. Augmented reality system 600 may be similar to augmented reality system 500, and may include the waveguide display and a projector that may include a light source or image source 612 and projector optics 614. The waveguide display may include a substrate 630, an input coupler 640, and a plurality of output couplers 650 as described above with respect to augmented reality system 500. While FIG. 5 only shows the propagation of light from a single field of view, FIG. 6 shows the propagation of light from multiple fields of view.

FIG. 6 shows that the exit pupil is replicated by output couplers 650 to form an aggregated exit pupil or eyebox, where different fields of view (e.g., different pixels on image source 612) may be associated with different respective propagation directions towards the eyebox, and light from a same field of view (e.g., a same pixel on image source 612) may have a same propagation direction for the different individual exit pupils. Thus, a single image of image source 612 may be formed by the user's eye located anywhere in the eyebox, where light from different individual exit pupils and propagating in the same direction may be from a same pixel on image source 612 and may be focused onto a same location on the retina of the user's eye. FIG. 6 shows that the image of the image source is visible by the user's eye even if the user's eye moves to different locations in the eyebox.

In many waveguide-based near-eye display systems, in order to expand the eyebox of the waveguide-based near-eye display in two dimensions, two or more output gratings may be used to expand the display light in two dimensions or along two axes (which may be referred to as dual-axis pupil expansion). The two gratings may have different grating parameters, such that one grating may be used to replicate the exit pupil in one direction and the other grating may be used to replicate the exit pupil in another direction.

As described above, the input and output grating couplers described above can be volume holographic gratings or surface-relief gratings, which may have very different Klein-Cook parameter Q:

$$Q = \frac{2\pi\lambda d}{n\Lambda^2},$$

where d is the thickness of the grating, λ is the wavelength of the incident light in free space, Λ is the grating period, and n is the refractive index of the recording medium. The Klein-Cook parameter Q may divide light diffraction by gratings into three regimes. When a grating is characterized by Q<<1, light diffraction by the grating may be referred to as Raman-Nath diffraction, where multiple diffraction orders may occur for normal and/or oblique incident light. When a grating is characterized by Q>>1 (e.g., Q≥10), light diffraction by the grating may be referred to as Bragg diffraction, where generally only the zeroth and the ±1 diffraction orders may occur for light incident on the grating at an angle satisfying the Bragg condition. When a grating is characterized by Q≈1, the diffraction by the grating may be between the Raman-Nath diffraction and the Bragg diffraction. To meet Bragg conditions, the thickness d of the grating may be higher than certain values to occupy a volume (rather than at a surface) of a medium, and thus may be referred to as a volume Bragg grating. VBGs may generally have relatively small refractive index modulations (e.g., Δn≤0.05) and high spectral and angular selectivity, while surface-relief gratings may generally have large refractive index modulations (e.g., Δn≥0.5) and wide spectral and angular bandwidths.

Figure 7A:
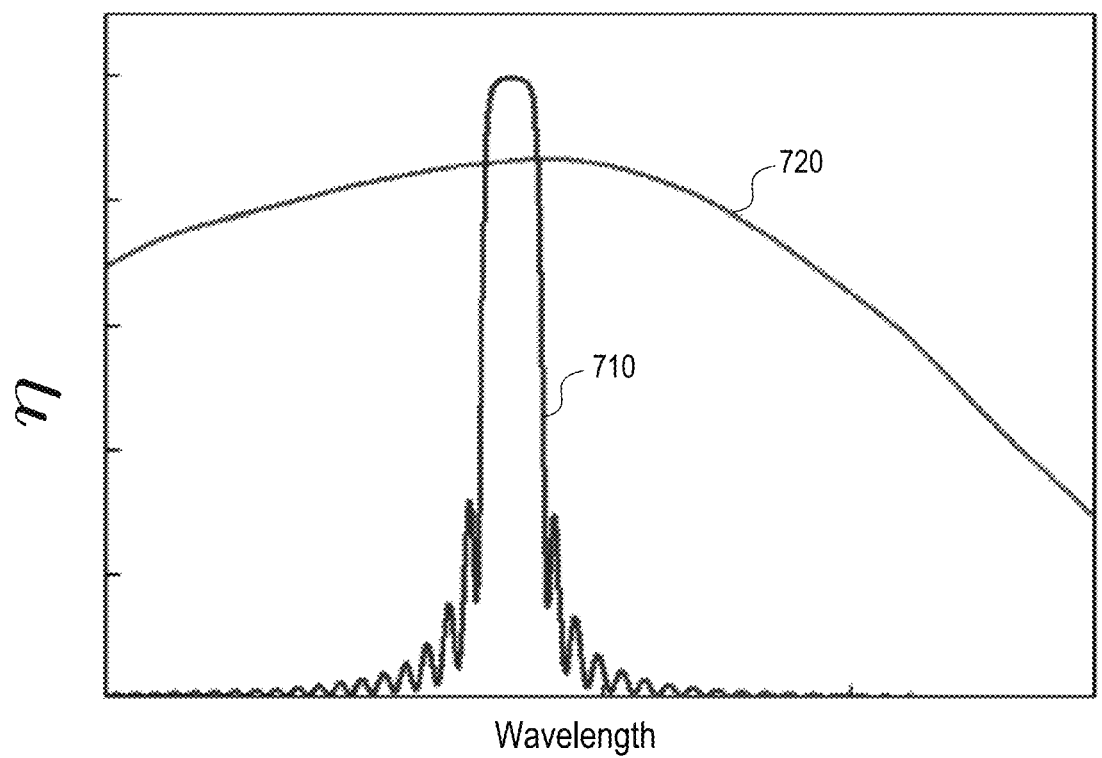
FIG. 7A illustrates the spectral bandwidth of an example of a reflection volume Bragg grating (VBG) and the spectral bandwidth of an example of a transmissive surface-relief grating (SRG).

FIG. 7A illustrates the spectral bandwidth of an example of a volume Bragg grating (e.g., a reflection VBG) and the spectral bandwidth of an example of a surface-relief grating (e.g., a transmissive SRG). The horizontal axis represents the wavelength of the incident visible light and the vertical axis corresponds to the diffraction efficiency. As shown by a curve 710, the diffraction efficiency of the reflection VBG is high in a narrow wavelength range, such as green light. In contrast, the diffraction efficiency of the transmissive SRG may be high in a very wide wavelength range, such as from blue to red light, as shown by a curve 720.

Figure 7B:
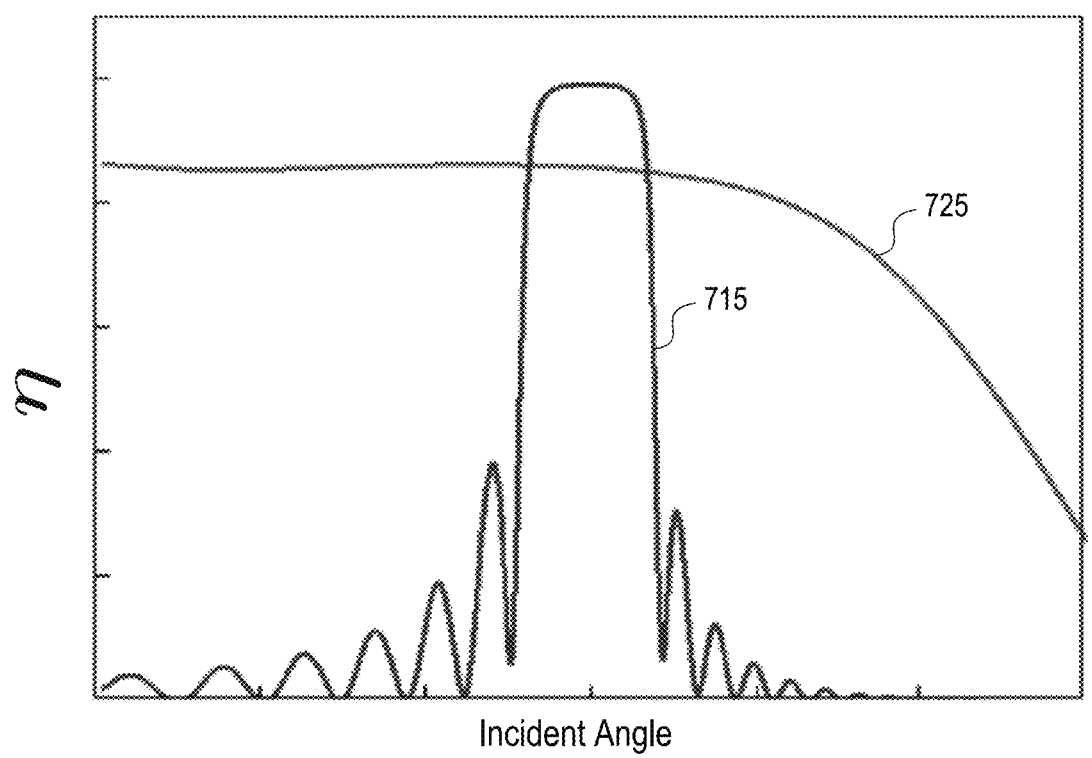
FIG. 7B illustrates the angular bandwidth of an example of a reflection VBG and the angular bandwidth of an example of a transmissive SRG.

FIG. 7B illustrates the angular bandwidth of an example of a volume Bragg grating (e.g., a reflection VBG) and the angular bandwidth of an example of a surface-relief grating (e.g., a transmissive SRG). The horizontal axis represents the incident angle of the visible light incident on the grating, and the vertical axis corresponds to the diffraction efficiency. As shown by a curve 715, the diffraction efficiency of the reflection VBG is high for light incident on the grating from a narrow angular range, such as about ±2.5° from the perfect Bragg condition. In contrast, the diffraction efficiency of the transmissive SRG is high in a very wide angular range, such as greater than about ±10° or wider, as shown by a curve 725.

Due to the high spectral selectivity at the Bragg condition, VBGs, such as reflection VBGs, may allow for single-waveguide design without crosstalk between primary colors, and may exhibit superior see-through quality. However, the spectral and angular selectivity may lead to lower efficiency because only a portion of the display light in the full FOV may be diffracted and reach user's eyes.

FIG. 8A illustrates an example of an optical see-through augmented reality system including a waveguide display 800 and surface-relief gratings for exit pupil expansion according to certain embodiments. Waveguide display 800 may include a substrate 810 (e.g., a waveguide), which may be similar to substrate 520. Substrate 810 may be transparent to visible light and may include, for example, a glass, quartz, plastic, polymer, PMMA, ceramic, or crystal substrate. Substrate 810 may be a flat substrate or a curved substrate. Substrate 810 may include a first surface 812 and a second surface 814. Display light may be coupled into substrate 810 by an input coupler 820, and may be reflected by first surface 812 and second surface 814 through total internal reflection, such that the display light may propagate within substrate 810. As described above, input coupler 820 may include a grating, a refractive coupler (e.g., a wedge or a prism), or a reflective coupler (e.g., a reflective surface having a slant angle with respect to substrate 810). For example, in one embodiment, input coupler 820 may include a prism that may couple display light of different colors into substrate 810 at a same refraction angle. In another example, input coupler 820 may include a grating coupler that may diffract light of different colors into substrate 810 at different directions. Input coupler 820 may have a coupling efficiency of greater than 10%, 20%, 30%, 50%, 75%, 90%, or higher for visible light.

Waveguide display 800 may also include a first grating 830 and a second grating 840 positioned on one or two surfaces (e.g., first surface 812 and second surface 814) of substrate 810 for expanding incident display light beam in two dimensions in order to fill an eyebox (or output or exit pupil) with the display light. First grating 830 may be configured to expand at least a portion of the display light beam along one direction, such as approximately in the x direction. Display light coupled into substrate 810 may propagate in a direction shown by a line 832. While the display light propagates within substrate 810 along a direction shown by line 832, a portion of the display light may be diffracted by a portion of first grating 830 towards second grating 840 as shown by a line 834 each time the display light propagating within substrate 810 reaches first grating 830. Second grating 840 may then expand the display light from first grating 830 in a different direction (e.g., approximately in the y direction) by diffracting a portion of the display light to the eyebox each time the display light propagating within substrate 810 reaches second grating 840. On second grating 840, an exit region 850 represents the region where display light for the full FOV at one pupil location in the eyebox (e.g., at the center the eyebox) may be coupled out of waveguide display 800

FIG. 8B illustrates an example of an eye box including two-dimensional replicated exit pupils. FIG. 8B shows that a single input pupil 805 may be replicated by first grating 830 and second grating 840 to form an aggregated exit pupil 860 that includes a two-dimensional array of individual exit pupils 852. For example, the exit pupil may be replicated in approximately the x direction by first grating 830 and in approximately the y direction by second grating 840. As described above, output light from individual exit pupils 852 and propagating in a same direction may be focused onto a same location in the retina of the user's eye. Thus, a single image may be formed by the user's eye from the output light in the two-dimensional array of individual exit pupils 852.

Figure 9B:
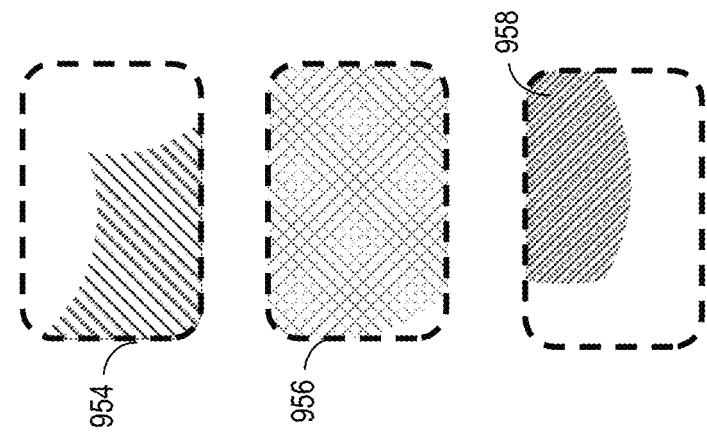
FIG. 9B illustrates the field-of-view clipping by the examples of surface-relief gratings for exit pupil expansion in the waveguide display.
Figure 9A:
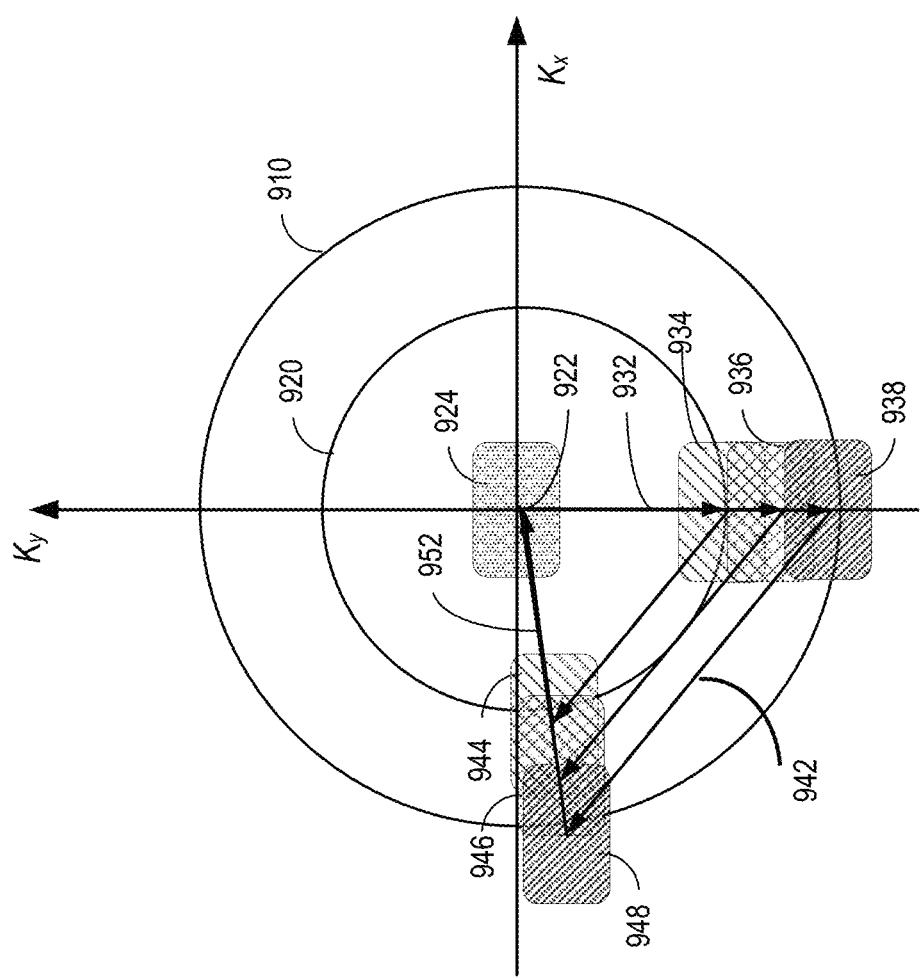
FIG. 9A illustrates wave vectors of light diffracted by examples of surface-relief gratings for exit pupil expansion in a waveguide display and exit pupils for multiple colors.

FIG. 9A illustrates wave vectors of light diffracted by examples of surface-relief gratings for exit pupil expansion in a waveguide display and exit pupils for multiple colors. A circle 910 may represent wave vectors of light that may be guided by the waveguide. For light with wave vectors outside of circle 910, the light may become evanescent. A circle 920 may represent wave vectors of light that may leak out of the waveguide because the total-internal-reflection condition is not met. Thus, the ring between circle 910 and circle 920 may represent the wave vectors of light that can be guided by the waveguide and can propagate within the waveguide through TIR. Wave vectors 932 show the light dispersion caused by the input grating, where light of different colors may have different wave vectors and different diffraction angles. Wave vectors 942 show the light dispersion caused by a front grating (e.g., first grating 830), where light of different colors may have different diffraction angles. Wave vectors 952 show the light dispersion caused by a back grating (e.g., second grating 840), where light of different colors may have different diffraction angles. The wave vectors for each color may form a respective closed triangle, and the triangles for different colors may share a common origin vertex 922. Thus, the overall dispersion by the three gratings may be close to zero.

Even though the overall dispersion by the three gratings may be zero, the dispersion by each grating may cause the reduction or clipping of the field of view of the waveguide display due to the conditions under which light may be guided by the waveguide as shown by the ring between circle 910 and circle 920. For example, for a FOV 924, the footprints of the FOV after the diffraction by the input grating may be different for different colors due to the dispersion by the input grating. In the example shown in FIG. 9A, a footprint 936 of the FOV for light of a first color may be located in the ring, while a portion of a footprint 934 of the FOV for light of a second color and a portion of a footprint 938 of the FOV for light of a third color may fall outside of the ring and thus may not be guided by the waveguide. In addition, the footprints of the FOV after the diffraction by the front grating may be further clipped or reduced. In the example shown in FIG. 9A, a small portion of a footprint 946 of the FOV for the light of the first color, a large portion of a footprint 944 of the FOV for the light of the second color, and a large portion of a footprint 948 of the FOV for the light of the third color may fall outside of the ring and thus may not be guided by the waveguide and diffracted by the back grating to reach the exit pupil.

FIG. 9B illustrates the field-of-view clipping by the examples of surface-relief gratings for exit pupil expansion in the waveguide display. For example, the FOV for the light of the first color after the diffraction by the back grating may be shown by a footprint 956, which may be close to the full FOV. For the light of the second color, a top portion of the FOV may be clipped after diffraction by the first grating and a right portion of the FOV may be clipped after diffraction by the front grating. Thus, the FOV for the light of the second color after the diffraction by the back grating may be shown by a footprint 954, which may be much smaller than the full FOV. Similarly, for the light of the third color, a bottom portion of the FOV may be clipped after diffraction by the first grating and a left portion of the FOV may be clipped after diffraction by the front grating. Thus, the FOV for the light of the third color after the diffraction by the back grating may be shown by a footprint 958, which may be much smaller than the full FOV. Thus, certain color components of the image may be missing for certain fields of view. As such, in order to achieve the full FOV for different colors, two or more waveguides and the corresponding gratings may be used. In addition, as described above, the wide bandwidth of SRGs may cause crosstalk between light of different primary colors and/or from different FOVs, and thus multiple waveguides may also be used to avoid the crosstalk.

Due to the high spectral selectivity at the Bragg condition, VBGs, such as reflection VBGs, may allow for single-waveguide design without crosstalk between primary colors in a volume Bragg grating and may achieve a superior see-through quality. Thus, input coupler 530 or 640 and output coupler 540 or 650 may include a volume Bragg grating, which may be a volume hologram recorded in a holographic recording material by exposing the holographic recording material to light patterns generated by the interference between two or more coherent light beams. In volume Bragg gratings, the incident angle and the wavelength of the incident light may need to satisfy the Bragg phase-matching condition in order for the incident light to be diffracted by the Bragg grating. When a single Bragg grating is used in a waveguide-based near-eye display, the spectral and angular selectivity of the volume Bragg gratings may lead to lower efficiency because only a portion of the display light may be diffracted and reach user's eyes, and the field of view and the working wavelength range of the waveguide-based near-eye display may be limited. In some embodiments, multiplexed VBGs may be used to improve the efficiency and increase the FOV.

FIG. 10A illustrates the front view of an example of a volume Bragg grating-based waveguide display 1000 according to certain embodiments. Waveguide display 1000 may include a substrate 1010, which may be similar to substrate 520. Substrate 1010 may be transparent to visible light and may include, for example, a glass, quartz, plastic, polymer, PMMA, ceramic, or crystal substrate. Substrate 1010 may be a flat substrate or a curved substrate. Substrate 1010 may include a first surface 1012 and a second surface 1014. Display light may be coupled into substrate 1010 by an input coupler 1020, and may be reflected by first surface 1012 and second surface 1014 through total internal reflection, such that the display light may propagate within substrate 1010. As described above, input coupler 1020 may include a diffractive coupler (e.g., a volume holographic grating or a surface-relief grating), a refractive coupler (e.g., a wedge or a prism), or a reflective coupler (e.g., a reflective surface having a slant angle with respect to substrate 1010). For example, in one embodiment, input coupler 1020 may include a prism that may couple display light of different colors into substrate 1010 at a same refraction angle. In another example, the input coupler may include a grating coupler that may diffract light of different colors into substrate 1010 at different directions.

Waveguide display 1000 may also include a first grating 1030 and a second grating 1040 positioned on one or two surfaces (e.g., first surface 1012 and second surface 1014) of substrate 1010 for expanding incident display light beam in two dimensions in order to fill an eyebox with the display light. First grating 1030 may include one or more multiplexed volume Bragg gratings each configured to expand at least a portion of the display light beam (e.g., light corresponding to a certain field of view and/or a wavelength range) along one direction, as shown by lines 1032, 1034, and 1036. For example, while the display light propagates within substrate 1010 along a direction shown by line 1032, 1034, or 1036, a portion of the display light may be diffracted by first grating 1030 to second grating 1040 each time the display light propagating within substrate 1010 reaches first grating 1030. Second grating 1040 may then expand the display light from first grating 1030 in a different direction by diffracting a portion of the display light to the eyebox each time the display light propagating within substrate 1010 reaches second grating 1040. On second grating 1040, an exit region 1050 represents the region where display light for the full FOV at one pupil location in the eyebox (e.g., at the center the eyebox) may be coupled out of waveguide display 1000.

As described above, first grating 1030 and second grating 1040 may each include a multiplexed VBG that includes multiple VBGs each designed for a specific FOV range and/or wavelength range. For example, first grating 1030 may include a few hundred or more VBGs (e.g., about 300 to about 1000 VBGs) recorded by a few hundred or more exposures, where each VBG may be recorded under a different condition. Second grating 1040 may also include tens or hundreds of VBGs (e.g., 50 or more VBGs) recorded by tens or hundreds of exposures. First grating 1030 and second grating 1040 may each be a transmission grating or a reflection grating.

FIGS. 10B and 10C illustrate the top and side views of volume Bragg grating-based waveguide display 1000, respectively. Input coupler 1020 may include projector optics (not shown, e.g., a lens) and a prism. Display light may be collimated and projected onto the prism by the projector optics, and may be coupled into substrate 1010 by the prism. The prism may have a refractive index that matches the refractive index of substrate 1010 and may include a wedge having a certain angle such that light coupled into substrate 1010 may be incident on surface 1012 or 1014 of substrate 1010 at an incident angle greater than the critical angle for substrate 1010. As such, display light coupled into substrate 1010 may be guided by substrate 1010 through total internal reflection, and may be diffracted by multiple regions of first grating 1030 towards second grating 1040 as described above. Second grating 1040 may then diffract the display light out of substrate 1010 at multiple regions to replicate the exit pupil.

Figure 11:
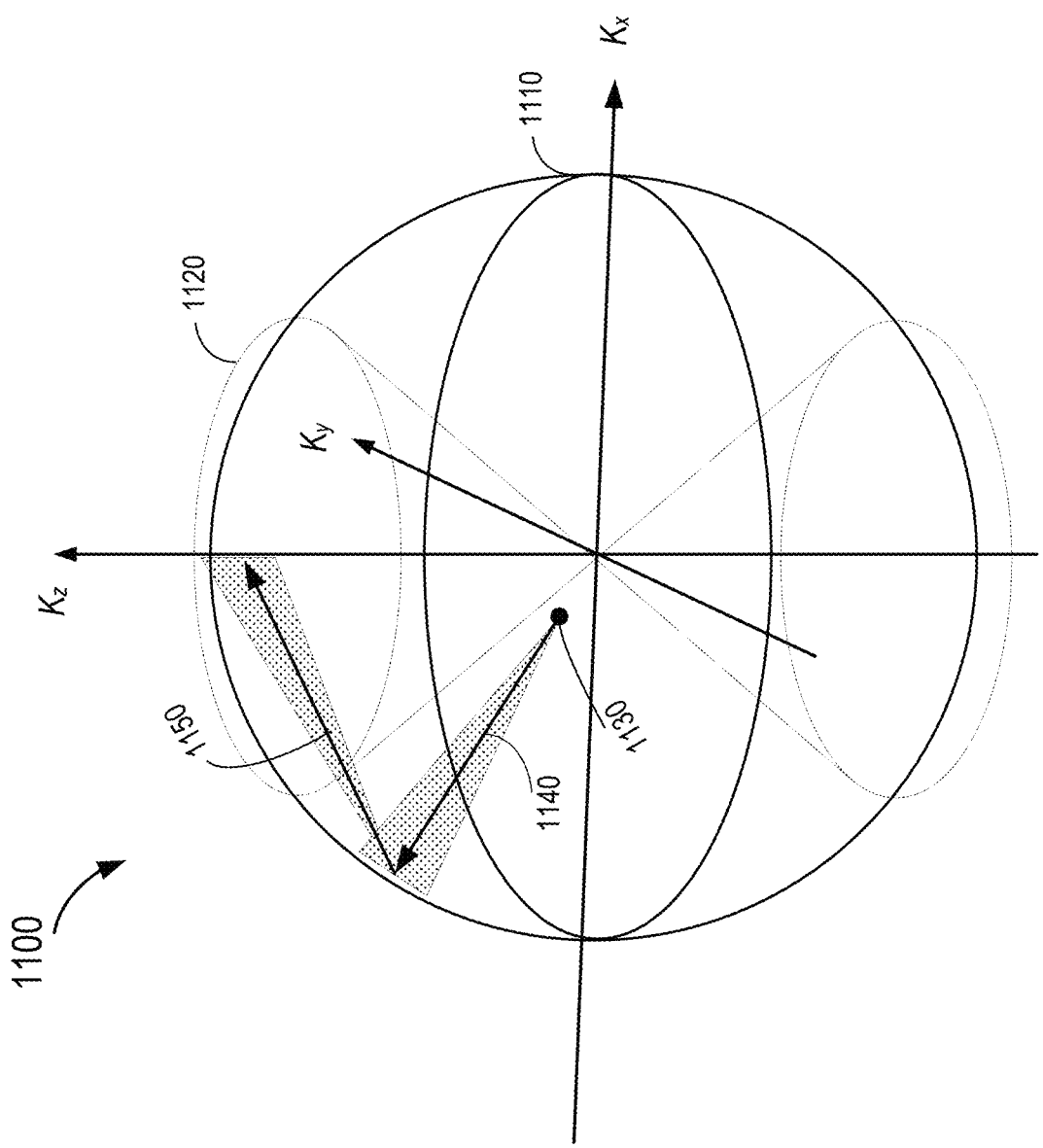
FIG. 11 illustrates light dispersion in an example of a volume Bragg grating-based waveguide display according to certain embodiments.

FIG. 11 illustrates light dispersion in an example of a volume Bragg grating-based waveguide display, such as waveguide display 1000, according to certain embodiments. As shown in the example, a sphere 1110 may represent wave vectors of light that may be guided by the waveguide. For light with wave vectors outside of sphere 1110, the light may become evanescent. A cone 1120 may represent wave vectors of light that may leak out of the waveguide because the total-internal-reflection condition is not met. Thus, the region of sphere 1110 outside of cone 1120 may represent the wave vectors of light that can be guided by the waveguide and can propagate within the waveguide through TIR. Point 1130 may represent the wave vector of the display light coupled into the waveguide by, for example, a prism. Wave vectors 1140 show the light dispersion caused by first grating 1030, where light of different colors may have different diffraction angles. Wave vectors 1150 show the light dispersion caused by second grating 1040, where light of different colors may have different diffraction angles. Thus, the light coupled out of the substrate may have some dispersion, such that the images of different colors may not perfectly overlap with each other to form one image. Therefore, the displayed image may be blurred and the resolution of the displayed image may be reduced.

Figures 12A, 12B:
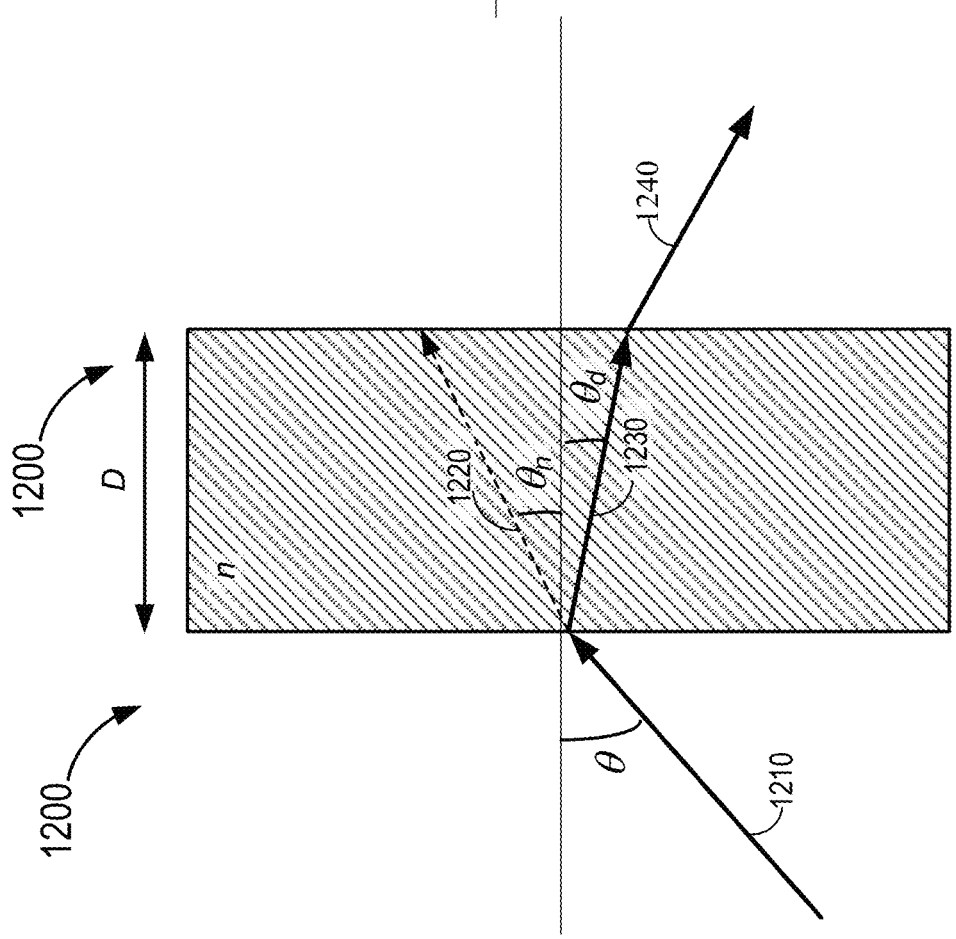
FIG. 12A illustrates an example of a volume Bragg grating (VBG).
FIG. 12B illustrates the Bragg condition for the volume Bragg grating shown in FIG. 12A.

FIG. 12A illustrates an example of a volume Bragg grating 1200. Volume Bragg grating 1200 shown in FIG. 12A may include a transmission holographic grating that has a thickness D. The refractive index n of volume Bragg grating 1200 may be modulated at an amplitude $\Delta n$, and the grating period of volume Bragg grating 1200 may be $\Lambda$. Incident light 1210 having a wavelength $\lambda$ may be incident on volume Bragg grating 1200 at an incident angle $\theta$, and may be refracted into volume Bragg grating 1200 as incident light 1220 that propagates at an angle $\theta_n$ in volume Bragg grating 1200. Incident light 1220 may be diffracted by volume Bragg grating 1200 into diffraction light 1230, which may propagate at a diffraction angle $\theta_d$ in volume Bragg grating 1200 and may be refracted out of volume Bragg grating 1200 as diffraction light 1240.

FIG. 12B illustrates the Bragg condition for volume Bragg grating 1200 shown in FIG. 12A. Volume Bragg grating 1200 may be a transmission grating. A vector 1205 may represent the grating vector $\vec{G}$, where $|\vec{G}|=2\pi/\Lambda$. A vector 1225 may represent the incident wave vector $\vec{k_i}$, and a vector 1235 may represent the diffract wave vector $\vec{k_d}$, where $|\vec{k_i}|=|\vec{k_d}|=2\pi n/\lambda$. Under the Bragg phase-matching condition, $\vec{k_i}-\vec{k_d}=\vec{G}$. Thus, for a given wavelength $\lambda$, there may only be one pair of incident angle $\theta$ (or $\theta_n$) and diffraction angle $\theta_d$ that meets the Bragg condition perfectly. Similarly, for a given incident angle $\theta$, there may be one wavelength $\lambda$ that meets the Bragg condition perfectly. As such, the diffraction may occur for a small wavelength range and in a small incident angular range around a perfect Bragg condition. The diffraction efficiency, the wavelength selectivity, and the angular selectivity of volume Bragg grating 1200 may be functions of thickness D of volume Bragg grating 1200. For example, the full-width-half-magnitude (FWHM) wavelength range and the FWHM angular range of volume Bragg grating 1200 around the Bragg condition may be inversely proportional to thickness D of volume Bragg grating 1200, while the maximum diffraction efficiency at the Bragg condition may be a function of $\sin^2(a \times \Delta n \times D)$, where a is a coefficient. For a reflection volume Bragg grating, the maximum diffraction efficiency at the Bragg condition may be a function of $\tanh^2(a \times \Delta n \times D)$.

As described above, in some designs, in order to achieve a large FOV (e.g., larger than $\pm 30°$) and diffract light of different colors, multiple polymer layers each including a Bragg grating for a different color (e.g., R, G, or B) and/or a different FOV may be arranged in a stack for coupling the display light to the user's eyes. In some designs, a multiplexed Bragg grating may be used, where each part of the multiplexed Bragg grating may be used to diffract light in a different FOV range and/or within a different wavelength range. Thus, in some designs, in order to achieve a desired diffraction efficiency and a large FOV for the full visible spectrum (e.g., from about 400 nm to about 700 nm, or from about 450 nm to about 650 nm), one or more thick volume Bragg gratings each including a large number of gratings (or holograms) recorded by a large number of exposures (e.g., holographic recordings), such as a few hundred or more than 1000, may be used.

VBGs or other holographic optical elements described above may be recorded in a holographic material (e.g., photopolymer) layer. In some embodiments, the VBGs can be recorded first and then laminated on a substrate in a near-eye display system. In some embodiments, a holographic material layer may be coated or laminated on the substrate and the VBGs may then be recorded in the holographic material layer.

In general, to record a holographic optical element in a photosensitive material layer, two coherent beams may interfere with each other at certain angles to generate a unique interference pattern in the photosensitive material layer, which may in turn generate a unique refractive index modulation pattern in the photosensitive material layer, where the refractive index modulation pattern may correspond to the light intensity pattern of the interference pattern. The photosensitive material layer may include, for example, silver halide emulsion, dichromated gelatin, photopolymers including photo-polymerizable monomers suspended in a polymer matrix, photorefractive crystals, and the like. One example of the photosensitive material layer for holographic recording is two-stage photopolymers that may include matrix precursors that can be pre-cured to form polymeric binders before holographic recording and writing monomers for holographic recording.

In one example, the photosensitive material layer may include polymeric binders, monomers (e.g., acrylic monomers), and initiating agents, such as initiators, chain transfer agents, or photosensitizing dyes. The polymeric binders may act as the support matrix. The monomers may be dispersed in the support matrix and may serve as refractive index modulators. The photosensitizing dyes may absorb light and interact with the initiators to polymerize the monomers. Thus, in each exposure (recording), the interference pattern may cause the polymerization and diffusion of the monomers to bright fringes, thus generating concentration and density gradients that may result in refractive index modulation. For example, areas with a higher concentration of monomers and polymerization may have a higher refractive index. As the exposure and polymerization proceed, fewer monomers may be available for polymerization, and the diffusion may be suppressed. After all or substantially all monomers have been polymerized, no more new gratings may be recorded in the photosensitive material layer. In a thick VBG that includes a large number of gratings recorded in a large number of exposures, display haze may be significant.

As described above, in some waveguide-based near-eye display systems, in order to expand the eyebox of the waveguide-based near-eye display, two output gratings (or two grating layers or two portions of a multiplexed grating) may generally be used to expand the display light in two dimensions or along two axes for dual-axis pupil expansion. Spatially separating the two output gratings and reducing the total number of exposures for each output grating may help to reduce the display haze because the see-through region (e.g., the middle) of the waveguide-based near-eye display may only include one output grating. For example, in some embodiments, the first output grating may be recorded with more exposures (e.g., >500 or >1000 times) and may be positioned outside of the see-through region of the waveguide-based near-eye display. The second output grating may be recorded with fewer exposures (e.g., <100 or <50 times) and may be positioned in the see-through region of the waveguide-based near-eye display. Thus, the display haze in the see-through region may be significantly reduced. However, because of the spatial separation of the two output gratings, the overall size of the waveguide-based near-eye display can be very large.

The grating couplers described above may include transmission VBGs or reflection VBGs, which may have some similar and some different characteristics. For example, as described above, the FWHM wavelength range and the FWHM angular range of a transmissive or reflection volume Bragg grating near the Bragg condition may be inversely proportional to thickness D of the transmissive or reflection volume Bragg grating. The maximum diffraction efficiency at the Bragg condition for a transmission VBG may be a function of $\sin^2(a \times \Delta n \times D)$, where a is a coefficient and $\Delta n$ is the refractive index modulation, while the maximum diffraction efficiency at the Bragg condition for a reflection VBG may be a function of $\tanh^2(a \times \Delta n \times D)$. In addition, the parameters (e.g., the grating tilt angles) of the transmissive and reflection volume Bragg gratings may be different in order to couple the display light into the waveguide at certain angles such that the coupled display light can be guided by the waveguide through TIR. Because of the different grating parameters, the dispersion characteristics of transmission gratings and reflection gratings may be different.

Figures 13A, 13B:
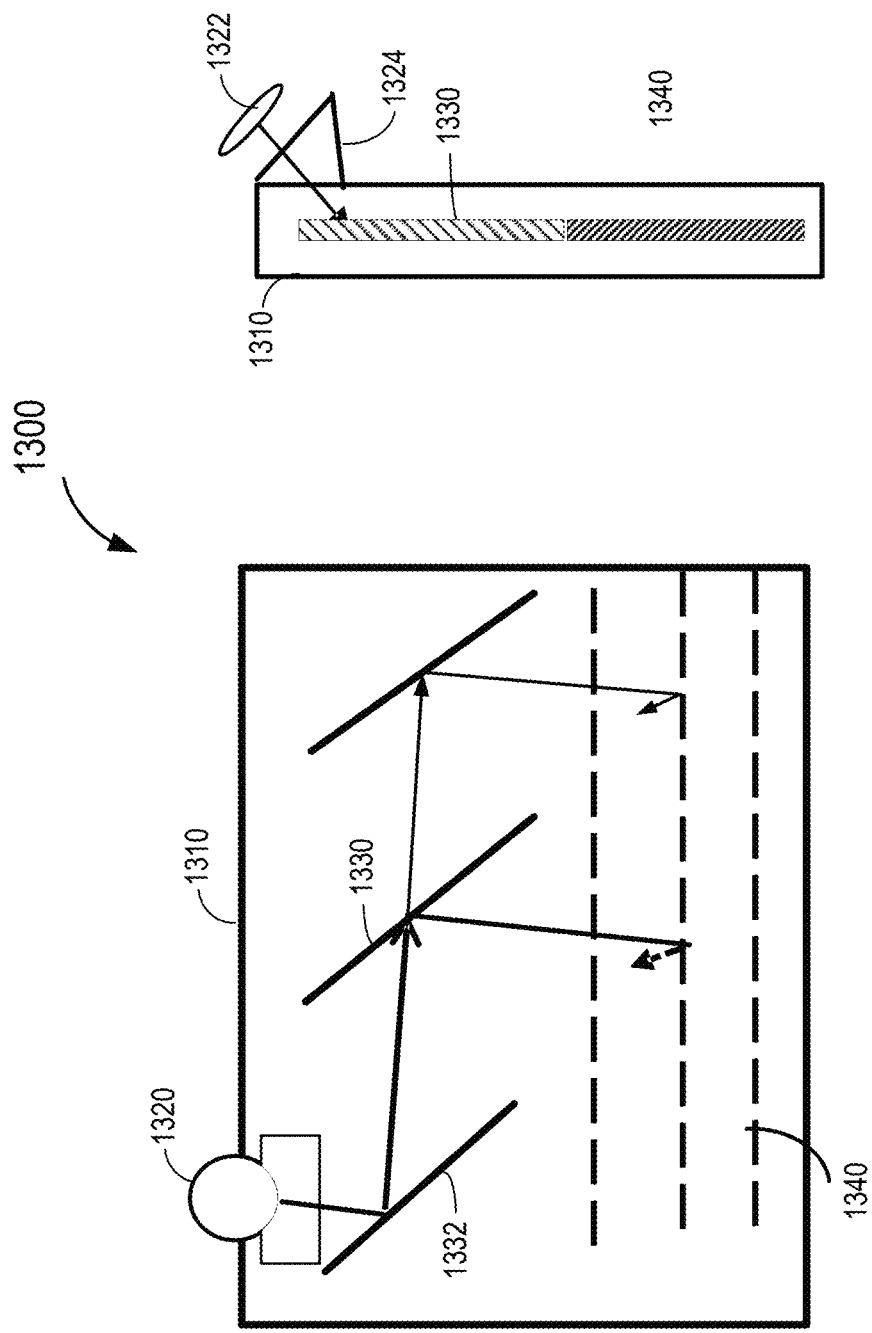
FIG. 13A illustrates a front view of an example of a volume Bragg grating-based waveguide display with exit pupil expansion and dispersion reduction according to certain embodiments.
FIG. 13B illustrates a side view of the example of the volume Bragg grating-based waveguide display shown in FIG. 13A.

FIG. 13A illustrates a front view of an example of a volume Bragg grating-based waveguide display 1300 with exit pupil expansion and dispersion reduction according to certain embodiments. FIG. 13B illustrates a side view of the example of volume Bragg grating-based waveguide display 1300 with exit pupil expansion and dispersion reduction according to certain embodiments. Waveguide display 1300 may be similar to waveguide display 1000, and may include an input coupler 1320 at a different location compared with input coupler 1020. Waveguide display 1300 may include a substrate 1310, and a first grating 1330 and a second grating 1340 formed on or in substrate 1310. As input coupler 1020, input coupler 1320 may include projector optics 1322 (e.g., a lens) and a prism 1324. Display light may be coupled into substrate 1310 by input coupler 1320 and may be guided by substrate 1310. The display light may reach a first portion 1332 of first grating 1330, and may be diffracted by first portion 1332 of first grating 1330 to change the propagation direction and reach other portions of first grating 1330, which may each diffract the display light towards second grating 1340. Second grating 1340 may diffract the display light out of substrate 1310 at different locations to form multiple exit pupils as described above.

First portion 1332 and each of other portions of first grating 1330 may have matching grating vectors (e.g., having a same grating vector in the x-y plane and having a same grating vector, opposite grating vectors, or both the same and opposite grating vectors in the z direction, but recorded in different exposure durations to achieve different diffraction efficiencies). Therefore, they may compensate for the dispersion of the display light by each other to reduce the overall dispersion, due to the opposite Bragg conditions (e.g., +1 order and −1 order diffractions) of the diffractions at first portion 1332 and each of other portions of first grating 1330. Therefore, the overall dispersion of the display light by waveguide display 1300 may be reduced in at least one direction.

Figure 14B:
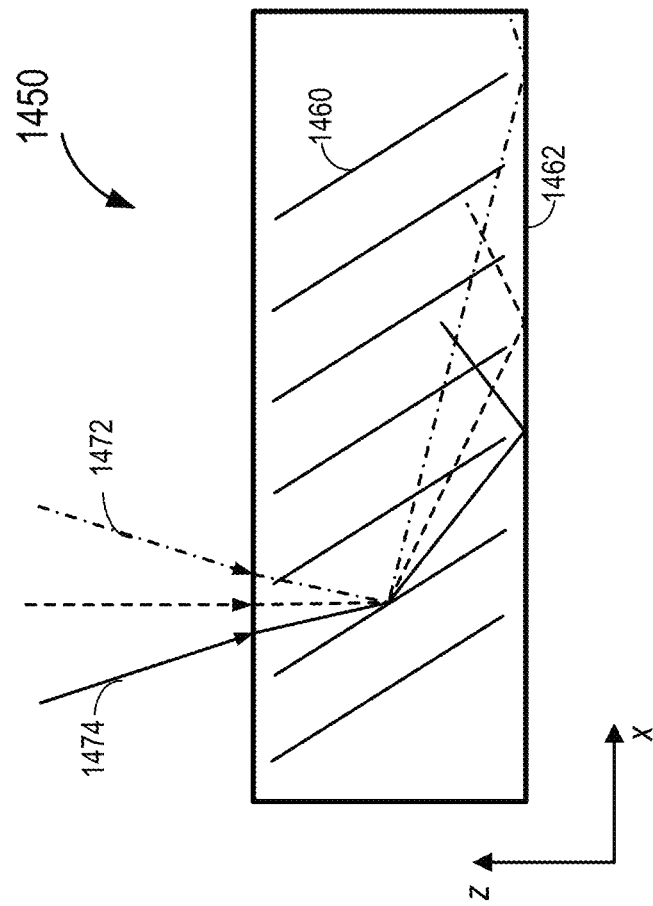
FIG. 14B illustrates the propagation of light from different fields of view in a transmission volume Bragg grating-based waveguide display according to certain embodiments.
Figure 14A:
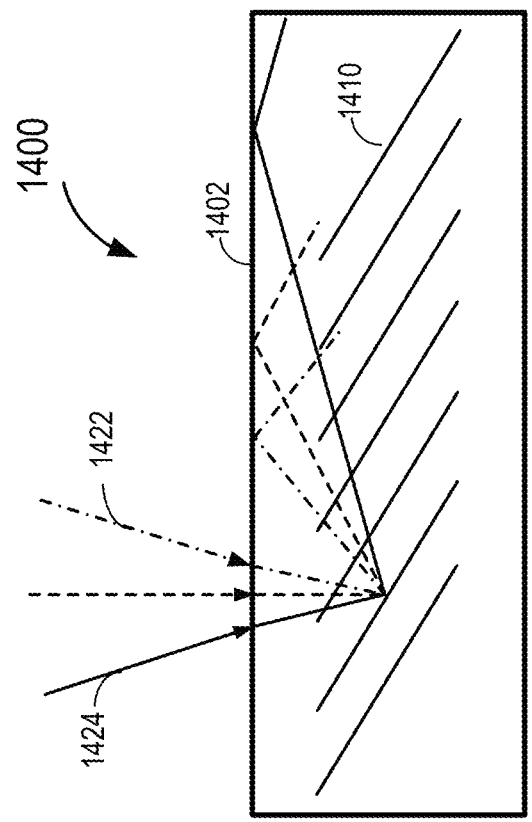
FIG. 14A illustrates the propagation of light from different fields of view in a reflection volume Bragg grating-based waveguide display according to certain embodiments.

FIG. 14A illustrates the propagation of light from different fields of view in a reflection volume Bragg grating-based waveguide display 1400 according to certain embodiments. Waveguide display 1400 may include a reflection VBG 1410. Due to the grating tilt angle and thus the grating vector of reflection VBG 1410, light from a positive field of view (shown by a line 1422) may have a smaller incident angle on fringes of reflection VBG 1410 and also a smaller incident angle on the top surface 1402 of waveguide display 1400. On the other hand, light from a negative field of view (shown by a line 1424) may have a larger incident angle on the fringes of reflection VBG 1410 and also a larger incident angle on top surface 1402 of waveguide display 1400.

FIG. 14B illustrates the propagation of light from different fields of view in a transmission volume Bragg grating-based waveguide display 1450 according to certain embodiments. Waveguide display 1450 may include a transmission VBG

1460. Due to the grating tilt angle differences, transmission VBG 1460 may diffract light from different fields of view in different manners compared with reflection VBG 1410. For example, as illustrated, light from a positive field of view (shown by a line 1472) may have a smaller incident angle on fringes of transmission VBG 1460 but a larger incident angle on the bottom surface 1452 of waveguide display 1450. On the other hand, light from a negative field of view (shown by a line 1474) may have a larger incident angle on the fringes of transmission VBG 1460 but a smaller incident angle on the bottom surface 1452 of waveguide display 1450. The manner of diffraction of light from different fields of view by a reflection or transmission grating may affect the form factor and performance of the waveguide display.

Figure 15:
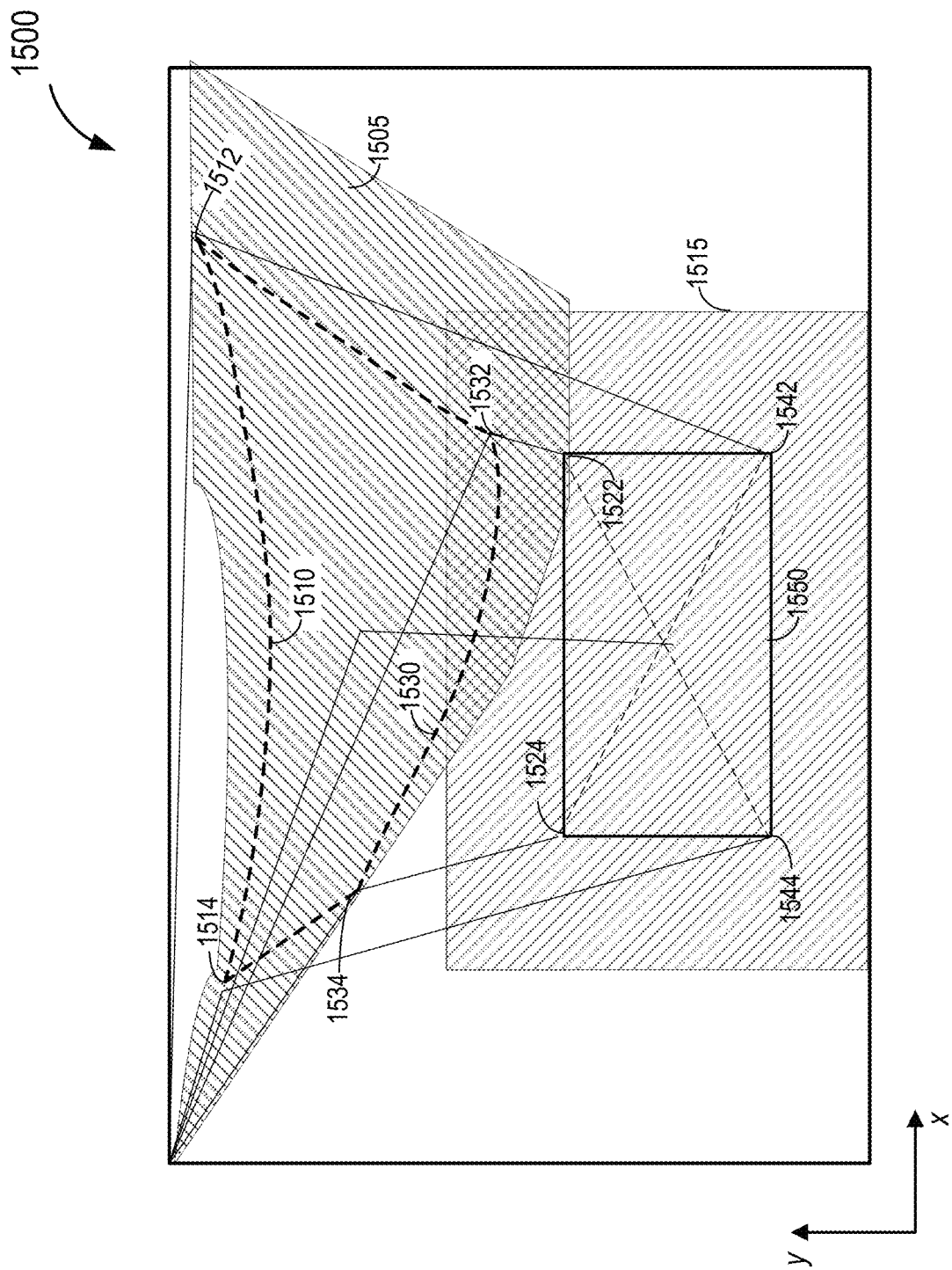
FIG. 15 illustrates an example of a reflection volume Bragg grating-based waveguide display with exit pupil expansion and dispersion reduction according to certain embodiments.

FIG. 15 illustrates an example of a reflection volume Bragg grating-based waveguide display 1500 with exit pupil expansion and dispersion reduction according to certain embodiments. Waveguide display 1500 may include a top grating 1505 and a bottom grating 1515. In the illustrated example, top grating 1505 may be a reflection VBG, and bottom grating 1515 may also be a reflection grating. On bottom grating 1515, an exit region 1550 represents the region where display light for the full FOV at one pupil location in the eyebox (e.g., at the center the eyebox) may be coupled out of the bottom grating. As shown in FIG. 15, the top FOV at exit region 1550 represented by a line between a top right corner 1522 and a top left corner 1524 may map to a curve 1530 on top grating 1505, where top right corner 1522 and top left corner 1524 of exit region 1550 may map to a location 1532 and a location 1534 on top grating 1505, respectively. The bottom FOV at exit region 1550 represented by a line between a bottom right corner 1542 and a bottom left corner 1544 may map to a curve 1510 on top grating 1505, where bottom right corner 1542 and bottom left corner 1544 of exit region 1550 may map to a location 1512 and a location 1514 on top grating 1505, respectively. Thus, if curve 1530 is below the line between top right corner 1522 and top left corner 1524 of exit region 1550, there may be some FOV clipping. As such, to preserve the full FOV, curve 1530 may be above the line between top right corner 1522 and top left corner 1524 of exit region 1550. Therefore, the size of waveguide display 1500 may be large.

Figure 16:
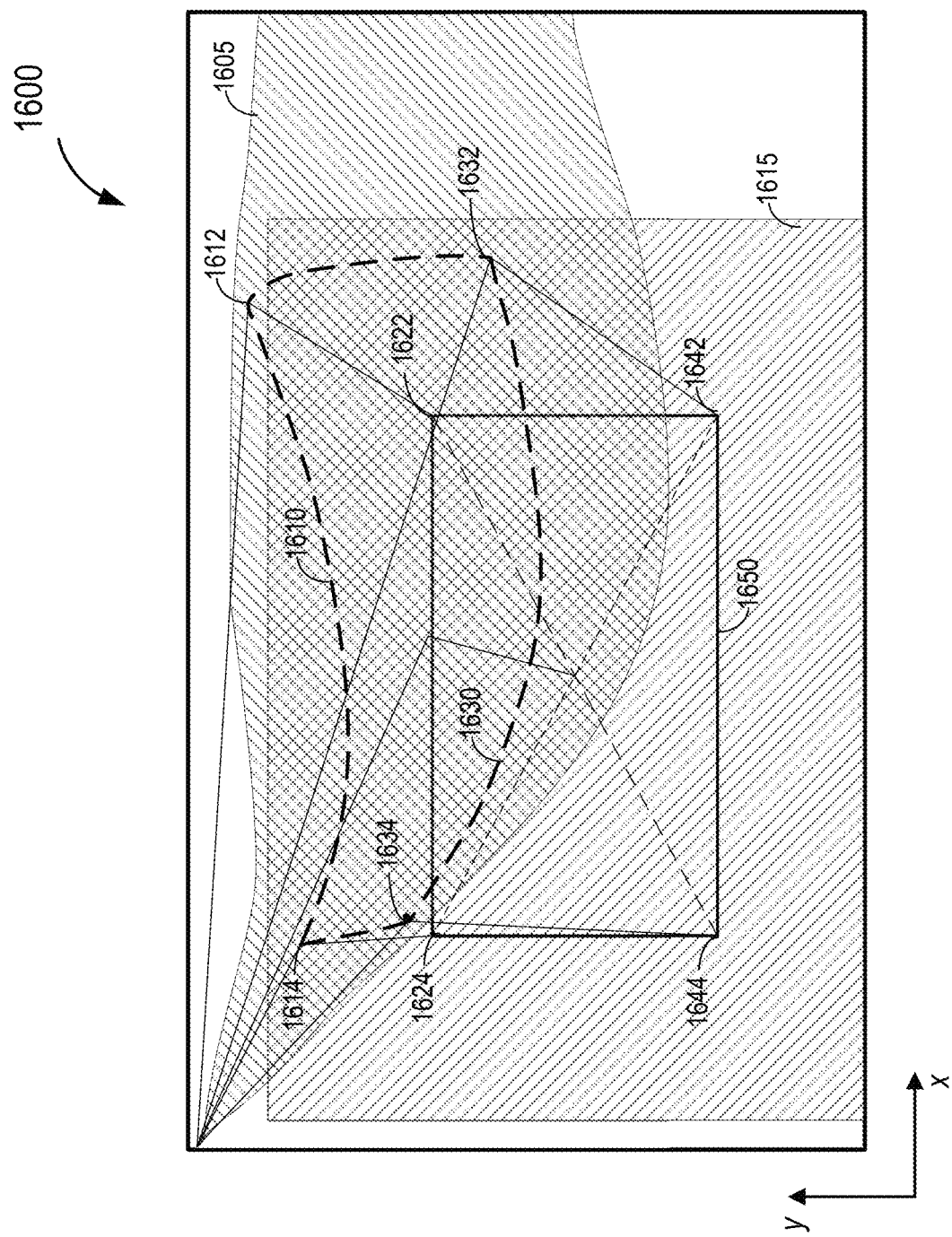
FIG. 16 illustrates an example of a transmission volume Bragg grating-based waveguide display with exit pupil expansion and form-factor reduction according to certain embodiments.

FIG. 16 illustrates an example of a transmission volume Bragg grating-based waveguide display 1600 with exit pupil expansion and form-factor reduction according to certain embodiments. Waveguide display 1600 may include a top grating 1605 and a bottom grating 1615. In the illustrated example, top grating 1605 may be a reflection VBG, and bottom grating 1615 may be a transmission VBG. On bottom grating 1615, an exit region 1650 represents the region where display light for the full FOV at one pupil location in the eyebox (e.g., at the center the eyebox) may be coupled out of the bottom grating. As shown in FIG. 16, the top FOV at exit region 1650 represented by a line between a top right corner 1622 and a top left corner 1624 may map to a curve 1610 on top grating 1605, where top right corner 1622 and top left corner 1624 of exit region 1650 may map to a location 1612 and a location 1614 on top grating 1605, respectively. The bottom FOV at exit region 1650 represented by a line between a bottom right corner 1642 and a bottom left corner 1644 may map to a curve 1630 on top grating 1605, where bottom right corner 1642 and bottom left corner 1644 of exit region 1650 may map to a location 1632 and a location 1634 on top grating 1605, respectively. Thus, there can be some overlap between top grating 1605 and bottom grating 1615 to reduce the overall size of waveguide display 1600. For example, location 1632 may be lower than top right corner 1622 and can still be mapped to bottom right corner 1642.

Figure 17A:
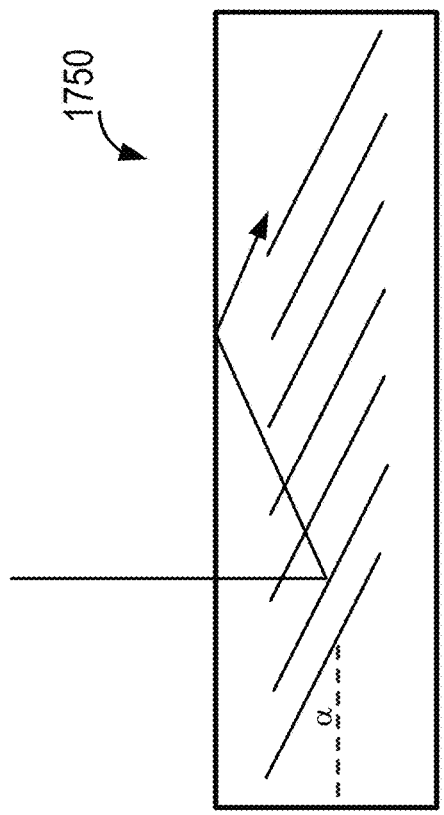
FIG. 17A illustrates an example of a transmission volume Bragg grating in a waveguide display according to certain embodiments.

FIG. 17A illustrates an example of a transmission volume Bragg grating 1700 in a waveguide display according to certain embodiments. The grating tilt angle α of transmission VBG 1700 may need to be within a certain range to transmissively diffract the display light. For example, if the grating tilt angle α of transmission VBG 1700 is lower than a certain value, transmission VBG 1700 may become a reflection VBG, the distance between two consecutive locations where the display light may reach the grating may be too large (and thus the exit pupil may be sparsely replicated in the eyebox), or the display light may become evanescent. Thus, the grating tilt angle α of transmission VBG 1700 needs to be greater than a certain value to transmissively diffract the display light.

Figure 17C:
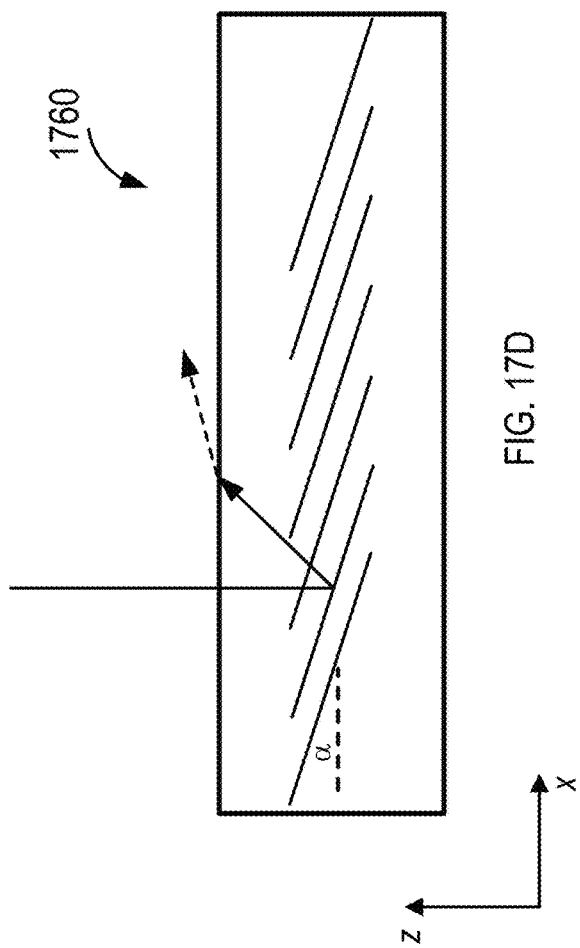
FIG. 17C illustrates an example of a reflection volume Bragg grating in a waveguide display according to certain embodiments.
Figure 17B:
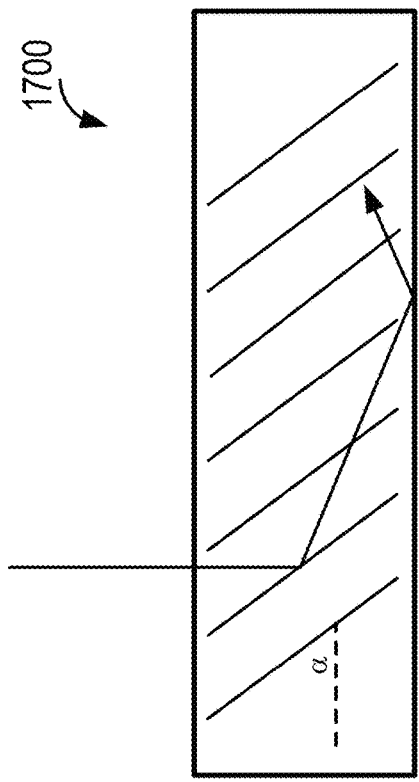
FIG. 17B illustrates an example of a transmission VBG in a waveguide display where light diffracted by the reflection VBG is not totally reflected and guided in the waveguide.

FIG. 17B illustrates an example of a transmission VBG 1710 in a waveguide display where light diffracted by the transmission VBG may not be totally reflected and guided in the waveguide. The grating tilt angle α of transmission VBG 1710 may be greater than a certain value, such as greater than about 60°. As such, light coupled into the waveguide may be incident on the surface of the waveguide at an incident angle less than the critical angle, and thus may not be totally reflected and guided in the waveguide. Thus, the grating tilt angle α of a transmission VBG may also need to be lower than a certain value (e.g., about 60°) to transmissively diffract the display light into the waveguide such that the diffracted light may be guided by the waveguide through total internal reflection. As such, the grating tilt angle α of a transmission VBG may need to be within a certain range.

FIG. 17C illustrates an example of a reflection volume Bragg grating 1750 in a waveguide display according to certain embodiments. The grating tilt angle α of reflection VBG 1750 may also need to be within a certain range to reflectively diffract the display light. If the grating tilt angle α of reflection VBG 1750 is greater than a certain value, reflection VBG 1750 may become a transmission VBG, the distance between two consecutive locations where the display light may reach the grating may be too large (and thus the exit pupil may be sparsely replicated in the eyebox), or the display light may become evanescent. Thus, the grating tilt angle α of a reflection VBG may also need to be lower than a certain value to reflectively diffract the display light. In one example, the grating tilt angle α of reflection VBG 1750 may be about 30°.

Figure 17D:
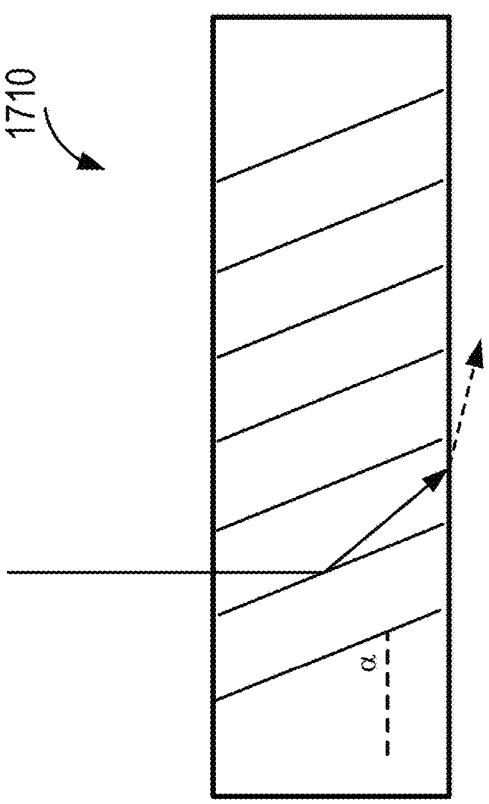
FIG. 17D illustrates an example of a reflection VBG in a waveguide display where light diffracted by the transmission VBG is not totally reflected and guided in the waveguide.

FIG. 17D illustrates an example of a reflection VBG 1760 in a waveguide display where light diffracted by the reflection VBG is not totally reflected and guided in the waveguide. The grating tilt angle α of reflection VBG 1760 shown in FIG. 17D may be less than a certain value. As such, light coupled into the waveguide may be incident on the surface of the waveguide at an incident angle less than the critical angle, and thus may not be totally reflected and guided in the waveguide. The grating tilt angle α of reflection VBG 1760 may be less than about 30°. Thus, the grating tilt angle α of a reflection VBG may also need to be greater than a certain value. As such, the grating tilt angle α of a reflection VBG may also need to be within a certain range to reflectively diffract the display light into the waveguide such that the diffracted light may be guided by the waveguide through total internal reflection. FIGS. 17A-17D show that the grating tilt angle α may be smaller for reflection gratings than for transmission gratings.

FIG. 18A illustrates the light dispersion by an example of a reflection volume Bragg grating 1800 in a waveguide display according to certain embodiments. Reflection VBG 1800 may be characterized by a grating vector $k_g$, a thickness d, and an average refractive index n. The surface normal direction of reflection VBG 1800 is N. The amount of light dispersion by reflection VBG 1800 may be determined by:

$$\Delta\theta = \frac{\lambda_0 |k_g \times N|}{n \times d |k_g \cdot k_{out}|},$$

where $\lambda_0$ is the wavelength of the light that perfectly meets the Bragg condition, and $k_{out}$ is the wave vector of the light diffracted by reflection VBG 1800. When the grating tilt angle α of reflection VBG 1800 is about 30°, the amount of light dispersion by reflection VBG 1800 may be approximately:

$$\Delta\theta \propto \frac{\sin 30°}{d \times \cos 30°} = \frac{0.58}{d}.$$

Thus, to achieve an angular resolution about 2 arcminutes, the thickness d of reflection VBG 1800 may be at least about 0.5 mm.

FIG. 18B illustrates the light dispersion by an example of a transmission volume Bragg grating 1850 in a waveguide display according to certain embodiments. Transmission VBG 1850 may similarly be characterized by a grating vector $k_g$, a thickness d, and an average refractive index n. The surface normal direction of transmission VBG 1850 is N. The amount of light dispersion by transmission VBG 1850 may be determined by:

$$\Delta\theta = \frac{\lambda_0 |k_g \times N|}{n \times d |k_g \cdot k_{out}|},$$

where $\lambda_0$ is the wavelength of the light that perfectly meets the Bragg condition, and $k_{out}$ is the wave vector of the light diffracted by transmission VBG 1850. When the grating tilt angle α of transmission VBG 1850 is about 60°, the amount of light dispersion by transmission VBG 1850 may be approximately:

$$\Delta\theta \propto \frac{\sin 60°}{d \times \cos 60°} = \frac{1.73}{d}.$$

Thus, to achieve an angular resolution about 2 arcminutes, the thickness d of transmission VBG 1850 may be at least about 1.5 mm, which is about three times of the thickness of a reflection VBG having the same angular resolution, and may be difficult to achieve or may cause significant display haze.

In order to reduce the physical size of a VBG-based waveguide display, reduce the thickness of the VBGs and display haze, and achieve the desired resolution, dispersion compensation may be desired in the VBG-based waveguide display. According to certain embodiments, one or more pairs of gratings (e.g., transmission grating) having matching grating vectors and operating in opposite diffraction conditions (e.g., +1 order diffraction versus −1 order diffraction) may be used to compensate for the dispersion caused by each other.

FIG. 19A is a front view of an example of a volume Bragg grating-based waveguide display 1900 with exit pupil expansion and dispersion reduction according to certain embodiments. FIG. 19B is a side view of the example of volume Bragg grating-based waveguide display 1900 with exit pupil expansion and dispersion reduction according to certain embodiments. Waveguide display 1900 may be similar to waveguide display 1300, but may include an input coupler that is different from input coupler 1320. Waveguide display 1900 may include a substrate 1910, and a first grating 1930 and a second grating 1940 formed on or in substrate 1910. The input coupler may include projector optics 1920 (e.g., a lens) and an input grating 1922, rather than a prism. Display light may be collimated by projector optics 1920 and projected onto input grating 1922, which may couple the display light into substrate 1910 by diffraction as described above with respect to, for example, FIGS. 5 and 6. The display light may reach a first portion 1932 of first grating 1930 and may be diffracted by first portion 1932 of first grating 1930 to change the propagation direction and reach other portions of first grating 1930, which may each diffract the display light towards second grating 1940. Second grating 1940 may diffract the display light out of substrate 1910 at different locations to form multiple exit pupils as described above.

First portion 1932 and each of other portions of first grating 1930 may have matching grating vectors (e.g., having a same grating vector in the x-y plane and a same grating vector and/or opposite grating vectors in the z direction, but recorded in different exposure durations to achieve different diffraction efficiencies). Therefore, they may compensate for the dispersion of display light caused by each other to reduce the overall dispersion in one direction, due to the opposite Bragg conditions (e.g., +1 order and −1 order diffractions) of the diffractions at first portion 1932 and each of other portions of first grating 1930. In addition, input grating 1922 and second grating 1940 may have matching grating vectors (e.g., having the same grating vector in the x-y plane and having the same and/or opposite grating vectors in the z direction, but recorded in different exposure durations to achieve different diffraction efficiencies), where input grating 1922 may couple the display light into substrate 1910, while second grating 1940 may couple the display light out of the waveguide. Therefore, input grating 1922 and second grating 1940 may compensate for the dispersion of the display light caused by each other to reduce the overall dispersion in at least one direction, due to the opposite diffraction directions and opposite Bragg conditions (e.g., +1 order and −1 order diffractions) of the diffractions at input grating 1922 and second grating 1940. In this way, the overall dispersion by first portion 1932 and each of other portions of first grating 1930 may be reduced or canceled out, and the overall dispersion by input grating 1922 and second grating 1940 may also be reduced or canceled out. Therefore, the overall dispersion of the display light by waveguide display 1900 can be minimized in any direction. As such, a higher resolution of the displayed image may be achieved. Thus, thin reflection or transmission VBGs may be used as the input and output couplers and may still achieve the desired resolution. Transmission VBGs may also allow the first and second gratings to be at least partially overlapped to reduce the physical dimensions of the waveguide display as described above.

Waveguide display 1900 may include multiple polymer layers on one or more waveguide plates, where input grating 1922, first grating 1930, and second grating 1940 may each be split into multiple gratings recorded in the multiple polymer layers. The gratings on each polymer layer may cover different respective FOVs and light spectra, and the combination of the multiple polymer layers may provide the full FOV and spectral coverage. In this way, each polymer layer can be thin (e.g., about 20 µm to about 100 µm) and can be exposed for fewer times (e.g., less than about 100) to record fewer gratings to reduce haziness, and the overall efficiency of the multiple polymer layers can still be high for the full FOV and spectrum. In the example shown in FIGS. 19A and 19B, waveguide display 1900 may include a first polymer layer 1912 and a second polymer layer 1914 on one or more plates or substrates. Each polymer layer 1912 or 1914 may include part of input grating 1922, first grating 1930, and/or second grating 1940.

Figure 20B:
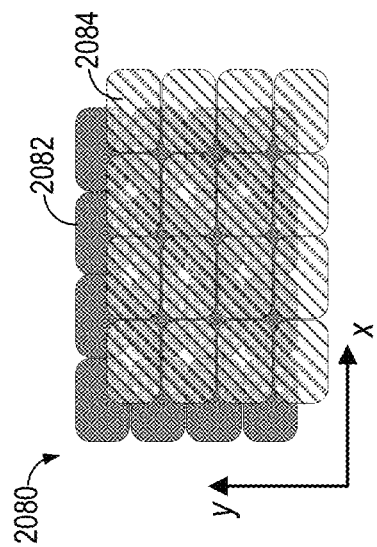
FIG. 20B illustrates examples of replicated exit pupils at an eyebox of the volume Bragg grating-based waveguide display shown in FIG. 20A.
Figure 20A:
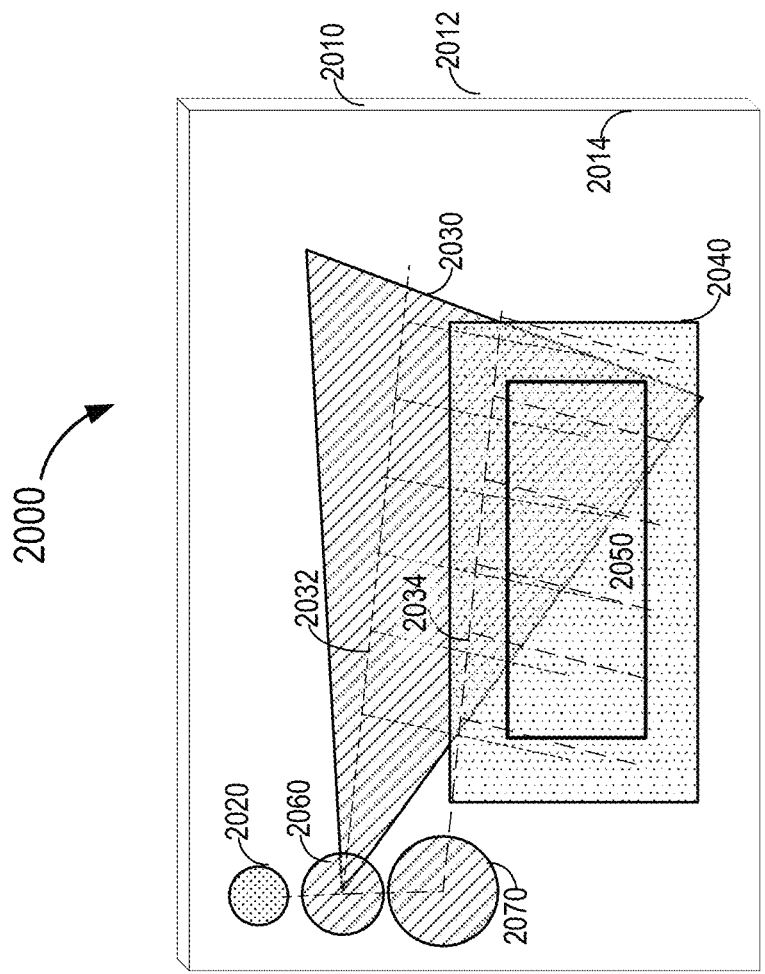
FIG. 20A illustrates another example of a volume Bragg grating-based waveguide display with exit pupil expansion, dispersion reduction, form-factor reduction, and power efficiency improvement according to certain embodiments.

FIG. 20A illustrates another example of a volume Bragg grating-based waveguide display 2000 with exit pupil expansion, dispersion reduction, form-factor reduction, and efficiency improvement according to certain embodiments. As waveguide display 2000, waveguide display 2000 may include a substrate 2010, which may be similar to substrate 1910. Substrate 2010 may include a first surface 2012 and a second surface 2014. Display light from a light source (e.g., LEDs) may be coupled into substrate 2010 by an input coupler 2020, and may be reflected by first surface 2012 and second surface 2014 through total internal reflection, such that the display light may propagate within substrate 2010 (e.g., in −y direction). As described above, input coupler 2020 may include a diffractive coupler, such as a multiplexed VBG, which may couple display light of different colors into substrate 2010 at different diffraction angles.

Waveguide display 2000 may include a first grating 2030 and a second grating 2040 formed on first surface 2012 and/or second surface 2014. Waveguide display 2000 may also include a third grating 2060 and a fourth grating 2070 formed on first surface 2012 and/or second surface 2014. Third grating 2060 and fourth grating 2070 may each be a multiplexed VBG that includes multiple VBGs. In some embodiments, third grating 2060, fourth grating 2070, and first grating 2030 may be on a same surface or different surfaces of substrate 2010. In some embodiments, third grating 2060, fourth grating 2070, and first grating 2030 may be in different regions of a same grating or a same grating material layer.

In some embodiments, first grating 2030, third grating 2060, and fourth grating 2070 may each include multiple VBGs. Third grating 2060 and first grating 2030 may be recorded in multiple exposures and under similar recording conditions (but may be recorded for different exposure durations to achieve different diffraction efficiencies), such that each VBG in third grating 2060 may match a respective VBG in first grating 2030 (e.g., having the same grating vector in the x-y plane and having the same and/or opposite grating vectors in the z direction). For example, in some embodiments, a VBG in third grating 2060 and a corresponding VBG in first grating 2030 may have the same grating period and the same grating slant angle (and thus the same grating vector), and the same thickness. Fourth grating 2070 and first grating 2030 may also be recorded in multiple exposures and under similar recording conditions (but for different exposure durations), such that each VBG in fourth grating 2070 may match a respective VBG in first grating 2030 (e.g., having the same grating vector in the x-y plane and having the same and/or opposite grating vectors in the z direction). In some embodiments, the recording conditions for recording third grating 2060 may be different from the recording conditions for recording fourth grating 2070, such that third grating 2060 and fourth grating 2070 may have different Bragg conditions (and different grating vectors) and thus may diffract light from different FOV ranges and/or wavelength ranges to improve the overall diffraction efficiency for visible light in a large FOV range. In some embodiments, third grating 2060 and fourth grating 2070 may have similar grating vectors and thus may diffract light from the same FOV ranges and/or wavelength ranges with similar or different diffraction efficiencies to improve the overall diffraction efficiency for light in certain FOV ranges and/or wavelength ranges.

In some embodiments, VBGs in first grating 2030 that match the VBGs in third grating 2060 may be recorded in one area (e.g., an upper region) of first grating 2030, while the other VBGs in first grating 2030 that match the VBGs in fourth grating 2070 may be recorded in a different area (e.g., a lower region) of first grating 2030. In one example, third grating 2060 and fourth grating 2070 may each have a thickness about 20 µm and may each include about 20 VBGs recorded through about 20 exposures. In the example, first grating 2030 may have a thickness about 20 µm or higher and may include about 40 VBGs recorded at different regions through about 40 exposures. Second grating 2040 may have a thickness about 20 µm or higher, and may include about 50 VBGs recorded through about 50 exposures.

Input coupler 2020 may couple the display light from a light source into substrate 2010. The display light may reach third grating 2060 directly or may be reflected by first surface 2012 and/or second surface 2014 to third grating 2060, where the size of the display light beam may be slightly larger than that at input coupler 2020. Each VBG in third grating 2060 may diffract a portion of the display light within a FOV range and a wavelength range that approximately satisfies the Bragg condition of the VBG to an upper region of first grating 2030. As described above, the upper region of first grating 2030 may include VBGs that match the VBGs in third grating 2060. Therefore, while the display light diffracted by a VBG in third grating 2060 propagates within substrate 2010 (e.g., along a direction shown by a line 2032) through total internal reflection, a portion of the display light may be diffracted by the corresponding VBG in first grating 2030 to second grating 2040 each time the display light propagating within substrate 2010 reaches first grating 2030.

Display light that is not diffracted by third grating 2060 (e.g., due to a less than 100% diffraction efficiency or due to a small FOV range and/or wavelength range near the Bragg condition) may continue to propagate within substrate 2010, and may reach fourth grating 2070. Each VBG in fourth grating 2070 may diffract a portion of the display light within a FOV range and a wavelength range that approximately satisfies the Bragg condition of the VBG to a lower region of first grating 2030. As described above, the lower region of first grating 2030 may include VBGs that match the VBGS in fourth grating 2070. Therefore, while the display light diffracted by a VBG in fourth grating 2070 propagates within substrate 2010 (e.g., along a direction shown by a line 2034) through total internal reflection, a portion of the display light may be diffracted by the corresponding VBG in first grating 2030 to second grating 2040 each time the display light propagating within substrate 2010 reaches first grating 2030. Second grating 2040 may expand the display light from first grating 2030 in a different direction (e.g., in approximately the y direction) by diffracting a portion of the display light to an eyebox 2050 (e.g., at a distance about 18 mm from second grating 2040 in +z or −z direction) each time the display light propagating within substrate 2010 reaches second grating 2040. In this way, the display light may be expanded in two dimensions to fill eyebox 2050.

FIG. 20B illustrates examples of replicated exit pupils at an eyebox 2080 (e.g., eyebox 2050) of volume Bragg grating-based waveguide display 2000. The exit pupils may include a first set of exit pupils 2082 replicated by gratings 2060, 2030, and 2040, and a second set of exit pupils 2084 replicated by gratings 2070, 2030, and 2040. In embodiments where gratings 2060 and 2070 have different grating vectors, the first set of exit pupils 2082 and the second set of exit pupils 2084 may correspond to different FOV ranges and/or different wavelength ranges. In embodiments where gratings 2060 and 2070 have similar grating vectors, the first set of exit pupils 2082 and the second set of exit pupils 2084 may correspond to a same FOV range and/or wavelength range. The first set of exit pupils 2082 and the second set of exit pupils 2084 may overlap or partially overlap. Thus, the pupil replication density may be increased, and the light may be more uniform in the eyebox, due to the diffraction of display light by two spatially multiplexed sets of VBGs.

In addition, the dispersion may be reduced in the two dimensions due to the dual diffraction in each dimension by a pair of matching gratings that operate under opposite Bragg conditions as described above. Furthermore, display light in a broader bandwidth may be diffracted at a higher diffraction efficiency by the gratings to the eyebox because of the lower number of exposures (and thus a higher refractive index modulation do for each VBG). Thus, the power efficiency of the waveguide display may be improved. In some embodiments, first grating 2030 and second grating 2040 may at least partially overlap to reduce the form factor of waveguide display 2000 as described above.

Figures 21A, 21B:
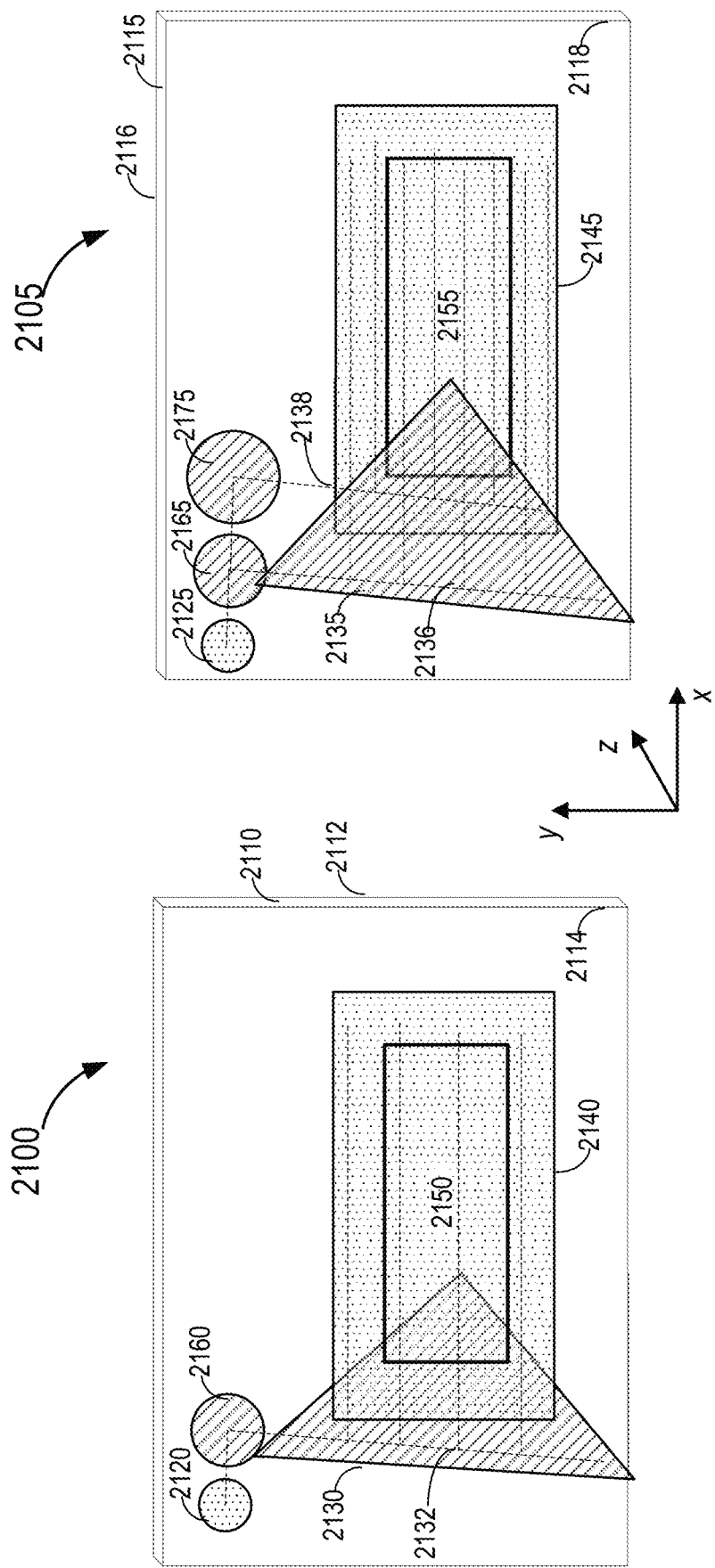
FIG. 21A illustrates an example of a volume Bragg grating-based waveguide display with exit pupil expansion, dispersion reduction, and form-factor reduction according to certain embodiments.
FIG. 21B illustrates an example of a volume Bragg grating-based waveguide display with exit pupil expansion, dispersion reduction, form-factor reduction, and efficiency improvement according to certain embodiments.

FIG. 21A illustrates another example of a volume Bragg grating-based waveguide display 2100 with exit pupil expansion, dispersion reduction, and form-factor reduction according to certain embodiments. As waveguide display 2100, waveguide display 2100 may include a substrate 2110, which may be similar to substrate 2110. Substrate 2110 may include a first surface 2112 and a second surface 2114. Display light from a light source (e.g., LEDs) may be coupled into substrate 2110 by an input coupler 2120, and may be reflected by first surface 2112 and second surface 2114 through total internal reflection, such that the display light may propagate within substrate 2110. As described above, input coupler 2120 may include a diffractive coupler, such as a VBG. Waveguide display 2100 may also include a first grating 2130 and a second grating 2140 formed on first surface 2112 and/or second surface 2114. In the example shown in FIG. 21A, first grating 2130 and second grating 2140 may be at different locations in the x direction, and may overlap in at least a portion of the see-through region of waveguide display 2100. First grating 2130 and second grating 2140 may be used for dual-axis pupil expansion to expand the incident display light beam in two dimensions to fill an eyebox 2150 (e.g., at a distance about 18 mm from second grating 2140 in +z or −z direction) with the display light. For example, first grating 2130 may expand the display light beam in approximately the y direction, while second grating 2140 may expand the display light beam in approximately the x direction.

In addition, waveguide display 2100 may include a third grating 2160 formed on first surface 2112 and/or second surface 2114. In some embodiments, third grating 2160 and first grating 2130 may be arranged at different locations in the y direction on a same surface of substrate 2110. In some embodiments, third grating 2160 and first grating 2130 may be in different regions of a same grating or a same grating material layer. In some embodiments, third grating 2160 may be spatially separate from first grating 2130. In some embodiments, third grating 2160 and first grating 2130 may be recorded in a same number of exposures and under similar recording conditions (but may be recorded for different exposure durations to achieve different diffraction efficiencies), such that each VBG in third grating 2160 may match a respective VBG in first grating 2130 (e.g., having the same grating vector in the x-y plane and having the same and/or opposite grating vectors in the z direction).

Input coupler 2120 may couple the display light from the light source into substrate 2110. The display light may propagate approximately along the x direction within substrate 2110, and may reach third grating 2160 directly or may be reflected by first surface 2112 and/or second surface 2114 to third grating 2160. Each VBG in third grating 2160 may diffract a portion of the display light within a FOV range and a wavelength range that approximately satisfies the Bragg condition of the VBG downward to first grating 2130. While the display light diffracted by a VBG in third grating 2160 propagates within substrate 2110 along a direction (e.g., approximately in the y direction shown by a line 2132) through total internal reflection, a portion of the display light may be diffracted by the corresponding VBG in first grating 2130 to second grating 2140 each time the display light propagating within substrate 2110 reaches first grating 2130. Second grating 2140 may then expand the display light from first grating 2130 in a different direction (e.g., approximately in the x direction) by diffracting a portion of the display light to eyebox 2150 each time the display light propagating within substrate 2110 reaches second grating 2140. Input coupler 2120 and second grating 2140 may include matching VBGs (e.g., VBGs with same grating vectors in the x-y plane and the same or opposite grating vectors in the z direction) to reduce the overall dispersion caused by input coupler 2120 and second grating 2140. Similarly, gratings 2130 and 2160 may include matching VBGs (e.g., VBGs with same grating vectors in the x-y plane and having the same and/or opposite grating vectors in the z direction) to reduce the overall dispersion caused by gratings 2130 and 2160. Thus, the overall dispersion by the gratings in waveguide display 2100 may be reduced or minimized.

Each of first grating 2130 and second grating 2140 may have a thickness less than, for example, 100 μm (e.g., 20 μm), and may include, for example, fewer than 50 VBGs. Thus, any area in the optical see-through region of waveguide display 2100 may include fewer than 100 VBGs. As such, the display haze may not be significant. In addition, first grating 2130 and second grating 2140 may at least partially overlap to reduce the form factor of waveguide display 2100, and thus the physical dimensions of waveguide display 2100 may be similar to the physical dimensions of a lens in a regular pair of eye glasses.

FIG. 21B illustrates an example of a volume Bragg grating-based waveguide display 2105 with exit pupil expansion, dispersion reduction, form-factor reduction, and efficiency improvement according to certain embodiments. As waveguide display 2100, waveguide display 2105 may include a first grating 2135, second grating 2145, a third grating 2165, and a fourth grating 2175 formed on a first surface 2116 and/or a second surface 2118 of a substrate 2115. First grating 2135, a second grating 2145, third grating 2165, and fourth grating 2175 may each include a multiplexed VBG that includes multiple VBGs. In some embodiments, third grating 2165, fourth grating 2175, and first grating 2135 may be on a same surface of substrate 2115. In some embodiments, third grating 2165, fourth grating 2175, and first grating 2135 may be in different regions of a same grating or a same grating material layer.

Each VBG in third grating 2165 may have a grating vector matching a grating vector of a respective VBG in first grating 2135 (e.g., having the same grating vector in the x-y plane and having the same and/or opposite grating vectors in the z direction). Each VBG in fourth grating 2175 may have a grating vector matching a grating vector of a respective VBG in first grating 2135 (e.g., having the same grating vector in the x-y plane and having the same and/or opposite grating vectors in the z direction). In some embodiments, third grating 2165 and fourth grating 2175 may have different grating vectors and thus may diffract light from different FOV ranges and/or wavelength ranges to improve the overall diffraction efficiency for visible light in a large FOV range. In some embodiments, third grating 2165 and fourth grating 2175 may have similar grating vectors and thus may diffract light from the same FOV ranges and/or wavelength ranges with similar or different diffraction efficiencies to improve the overall diffraction efficiency for light in certain FOV ranges and/or wavelength ranges.

Input coupler 2125 may couple the display light from the light source into substrate 2115. The display light may reach third grating 2165 directly or may be reflected by first surface 2116 and/or second surface 2118 to third grating 2165. Each VBG in third grating 2165 may diffract a portion of the display light within a FOV range and a wavelength range that approximately satisfies the Bragg condition of the VBG to a left region of first grating 2135. While the display light diffracted by a VBG in third grating 2165 propagates within substrate 2115 (e.g., along a direction shown by a line 2136) through total internal reflection, a portion of the display light may be diffracted by the corresponding VBG in first grating 2135 to second grating 2145 each time the display light propagating within substrate 2115 reaches first grating 2135.

Display light that is not diffracted by third grating 2165 (e.g., due to a less than 100% diffraction efficiency or due to a small FOV range and/or wavelength range near the Bragg condition) may continue to propagate within substrate 2115, and may reach fourth grating 2175. Each VBG in fourth grating 2175 may diffract a portion of the display light within a FOV range and a wavelength range that approximately satisfies the Bragg condition of the VBG to a right region of first grating 2135. While the display light diffracted by a VBG in fourth grating 2175 propagates within substrate 2115 (e.g., along a direction shown by a line 2138) through total internal reflection, a portion of the display light may be diffracted by the corresponding VBG in first grating 2135 to second grating 2145 each time the display light propagating within substrate 2115 reaches first grating 2135.

Second grating 2145 may expand the display light from first grating 2135 in a different direction (e.g., in approximately the x direction) by diffracting a portion of the display light to an eyebox 2155 (e.g., at a distance about 18 mm from second grating 2145 in +z or −z direction) each time the display light propagating within substrate 2115 reaches second grating 2145. In this way, the display light may be expanded in two dimensions to fill eyebox 2155. The resultant exit pupils may include a first set of exit pupils replicated by gratings 2165, 2135, and 2145, and a second set of exit pupils replicated by gratings 2175, 2135, and 2145. In embodiments where gratings 2165 and 2175 have different grating vectors, the first set of exit pupils and the second set of exit pupils may correspond to different FOV ranges and/or different wavelength ranges. In embodiments where gratings 2165 and 2175 have similar grating vectors, the first set of exit pupils and the second set of exit pupils may correspond to a same FOV range and/or wavelength range. The first set of exit pupils and the second set of exit pupils may overlap or partially overlap. Thus, the pupil replication density may be increased, and the light may be more uniform in the eyebox, due to the diffraction of display light by two spatially multiplexed sets of VBGs.

In some embodiments, the full FOV range of a display image may be divided into two or more FOV ranges to be covered by two or more sets of gratings. The two or more FOV ranges may be stitched together to provide the full field of view. For each FOV range, a set of gratings may be used to expand the exit pupil in two dimensions to fill an eye-box.

FIG. 22A is a front view of an example of a volume Bragg grating-based waveguide display 2200 including two image projectors 2220 and 2250 according to certain embodiments. FIG. 22B is a side view of the example of volume Bragg grating-based waveguide display 2200 including two image projectors 2220 and 2250 according to certain embodiments. Image projector 2220, a first input grating 2222, a first top grating 2230, and a bottom grating 2240 may be used to provide a first portion (e.g., the left half) of the full FOV of waveguide display 2200. Display light for the first portion of the full FOV may be collimated and projected onto a first input grating 2222, which may couple the display light into a waveguide 2210 by diffraction as described above with respect to, for example, FIGS. 5-6. The display light may reach a first portion 2232 of first top grating 2230 and may be diffracted by first portion 2232 of first top grating 2230 to change the propagation direction and reach other portions of first top grating 2230, which may each diffract the display light towards bottom grating 2240. Bottom grating 2240 may diffract the display light out of waveguide 2210 at different locations to form multiple exit pupils as described above. First portion 2232 of first top grating 2230 and each of other portions of first top grating 2230 may have similar grating parameters (but may be recorded in different exposure durations to achieve different diffraction efficiencies). Therefore, they may compensate the dispersion of display light caused by each other to reduce the overall dispersion, due to the opposite Bragg conditions (e.g., +1 order and −1 order diffractions) for the diffractions at first portion 2232 of first top grating 2230 and each of other portions of first top grating 2230.

In addition, first input grating 2222 and bottom grating 2240 may have similar grating parameters or similar grating vectors at least in the x-y plane (but may be recorded in different exposure durations to achieve different diffraction efficiencies), where first input grating 2222 may couple the display light into waveguide 2210, while bottom grating 2240 may couple the display light out of waveguide 2210. Therefore, first input grating 2222 and bottom grating 2240 may compensate the dispersion of display light caused by each other to reduce the overall dispersion, due to the opposite diffraction directions and opposite Bragg conditions (e.g., +1 order and −1 order diffractions) for the respective diffractions. In this way, the dispersion by first portion 2232 of first top grating 2230 and each of other portions of first top grating 2230 may be canceled out, and the dispersion by first input grating 2222 and bottom grating 2240 may also be canceled out.

Similarly, image projector 2250, a second input grating 2252, a second top grating 2260, and bottom grating 2240 (or a different bottom grating) may be used to provide another portion (e.g., the right half) of the full FOV of waveguide display 2200. As described above, bottom grating 2240 may be used for both portions of the field of view, or may include two gratings each for a portion of the field of view. The dispersion by a first portion 2262 and each of other portions of second top grating 2260 may be canceled out, and the dispersion by second input grating 2252 and bottom grating 2240 may also be canceled out. Therefore, the overall dispersion of the display light by waveguide display 2200 can be minimized in any direction. As such, a higher resolution of the displayed image may be achieved even if the polymer layers are thin and transmission VBGs are recorded in the thin polymer layers.

Waveguide display 2200 may include multiple polymer layers on one or more waveguide plates, such as a first waveguide plate 2212 and a second waveguide plate 2214. Input gratings 2222 and 2252, top gratings 2230 and 2260, and bottom grating 2240 may each be split into multiple gratings recorded in the multiple polymer layers. The gratings on each polymer layer may cover different respective FOVs and light spectra. The combination of the multiple polymer layers may provide the full FOV and spectral coverage. In this way, each polymer layer can be thin (e.g., about 20 µm to about 100 µm) and can be exposed for fewer times (e.g., less than about 100) to record fewer gratings, thus reducing haziness for see-through images. The overall efficiency of the multiple polymer layers can still be high for the full FOV and visible light spectrum.

FIG. 23A is a front view of an example of a volume Bragg grating-based waveguide display 2300 including a single image projector 2320 and gratings for field-of-view stitching according to certain embodiments. FIG. 23B is a side view of the example of volume Bragg grating-based waveguide display 2300 with image projector 2320 and the gratings for field-of-view stitching according to certain embodiments. Waveguide display 2300 may include multiple polymer layers on one or more waveguide plates 2310. Image projector 2320, an input grating 2330, a top grating 2340, and a bottom grating 2350 may be used to provide a first portion (e.g., the left half) of the full FOV of waveguide display 2300. As described above, display light for the first portion of the FOV may be collimated and projected onto input grating 2330, which may couple the display light into a waveguide plate 2310 by diffraction as described above. The display light may reach a first portion of top grating 2340 and may be diffracted by the first portion of top grating 2340 to other portions of top grating 2340, which may each diffract the display light towards bottom grating 2350. Bottom grating 2350 may diffract the display light out of waveguide plate 2310 at different locations to replicate exit pupils as described above. The first portion and each of the other portions of top grating 2340 may compensate for the dispersion caused by each other, and input grating 2330 and bottom grating 2350 may also compensate for the dispersion caused by each other as described above.

Image projector 2320, an input grating 2332, a top grating 2342, and a bottom grating 2352 may be used to provide a portion (e.g., the right half) of the full FOV of waveguide display 2300. The display light may be collimated and coupled into waveguide plate 2310 by input grating 2332. The display light may reach a first portion of top grating 2342 and may be diffracted by the first portion of top grating 2342 to other portions of top grating 2342, which may each diffract the display light towards bottom grating 2352. Bottom grating 2352 may diffract the display light out of waveguide plate 2310 at different locations to replicate exit pupils as described above. The first portion and each of other portions of top grating 2342 may compensate for the dispersion caused by each other, and input grating 2332 and bottom grating 2352 may also compensate for the dispersion caused by each other as described above.

Waveguide display 2300 may include multiple polymer layers on one or more waveguide plates 2310, where input gratings 2330 and 2332, top gratings 2340 and 2342, and bottom gratings 2350 and 2352 may each be split into multiple gratings recorded in the multiple polymer layers, where the gratings on each polymer layer may cover different respective FOVs and light spectra. The combination of the multiple polymer layers may provide the full FOV and spectral coverage. In this way, each polymer layer can be thin (e.g., about 20 µm to about 100 µm) and can be exposed for fewer times (e.g., less than about 100) to record fewer gratings to reduce haziness, and the overall efficiency of the multiple polymer layers can still be high for the full FOV and the visible light spectrum.

In the example shown in FIG. 23B, each of input grating 2330, top grating 2340, and bottom grating 2350 may be split into two multiplexed gratings that are each recorded in a respective polymer layer and each cover a respective FOV, where multiple VBGs may be recorded in each respective polymer layer to form a multiplexed grating. Similarly, each of input grating 2332, top grating 2342, and bottom grating 2352 may be split into two multiplexed gratings that are each recorded in a respective polymer layer and each cover a respective FOV, where multiple VBGs may be recorded in each respective polymer layer to form a multiplexed grating. As shown in FIG. 23B, input gratings 2332 and 2330 may be in different polymer layers. Similarly, top gratings 2340 and 2342 may be in different polymer layers, and bottom gratings 2350 and 2352 may be in different polymer layers. Thus, the crosstalk between them can be reduced.

Figure 24:
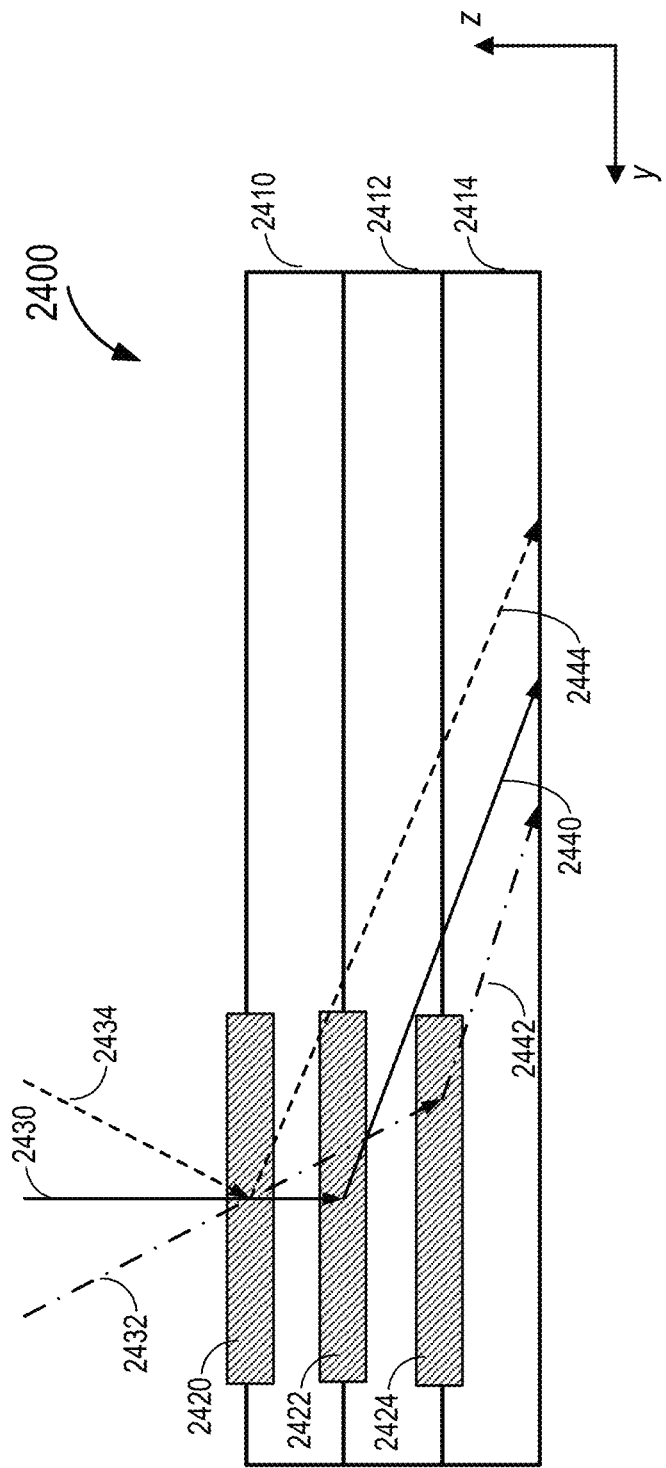
FIG. 24 illustrates an example of a volume Bragg grating-based waveguide display including multiple grating layers for different fields of view and/or light wavelengths according to certain embodiments.

FIG. 24 illustrates an example of a volume Bragg grating-based waveguide display 2400 including multiple grating layers for different fields of view and/or light wavelengths according to certain embodiments. VBG-based waveguide display 2400 may be an example of VBG-based waveguide display 2300 described above. In waveguide display 2400, gratings may be spatially multiplexed along the z direction. For example, waveguide display 2400 may include multiple substrates, such as substrates 2410, 2412, 2414, and the like. The substrates may include a same material or materials having similar refractive indexes. One or more VBGs (e.g., VBGs 2420, 2422, 2424, etc.) may be made on each substrate, such as recorded in a holographic material layer formed on the substrate. The VBGs may be reflection gratings or transmission gratings. The substrates with the VBGs may be arranged in a substrate stack along the z direction for spatial multiplexing. Each VBG may be a multiplexed VBG that includes multiple gratings designed for different Bragg conditions to couple display light in different wavelength ranges and/or different FOVs into or out of the waveguide.

In the example shown in FIG. 24, VBG 2420 may couple light 2434 from a positive field of view into the waveguide as shown by a light ray 2444 within the waveguide. VBG 2422 may couple light 2430 from around 0° field of view into the waveguide as shown by a light ray 2440 within the waveguide. VBG 2424 may couple light 2432 from a negative field of view into the waveguide as shown by a light ray 2442 within the waveguide. As described above, each of VBGs 2420, 2422, and 2424 may be a multiplexed VBG with many exposures, and thus may couple light from different FOV ranges into or out of the waveguide.

Figure 25:
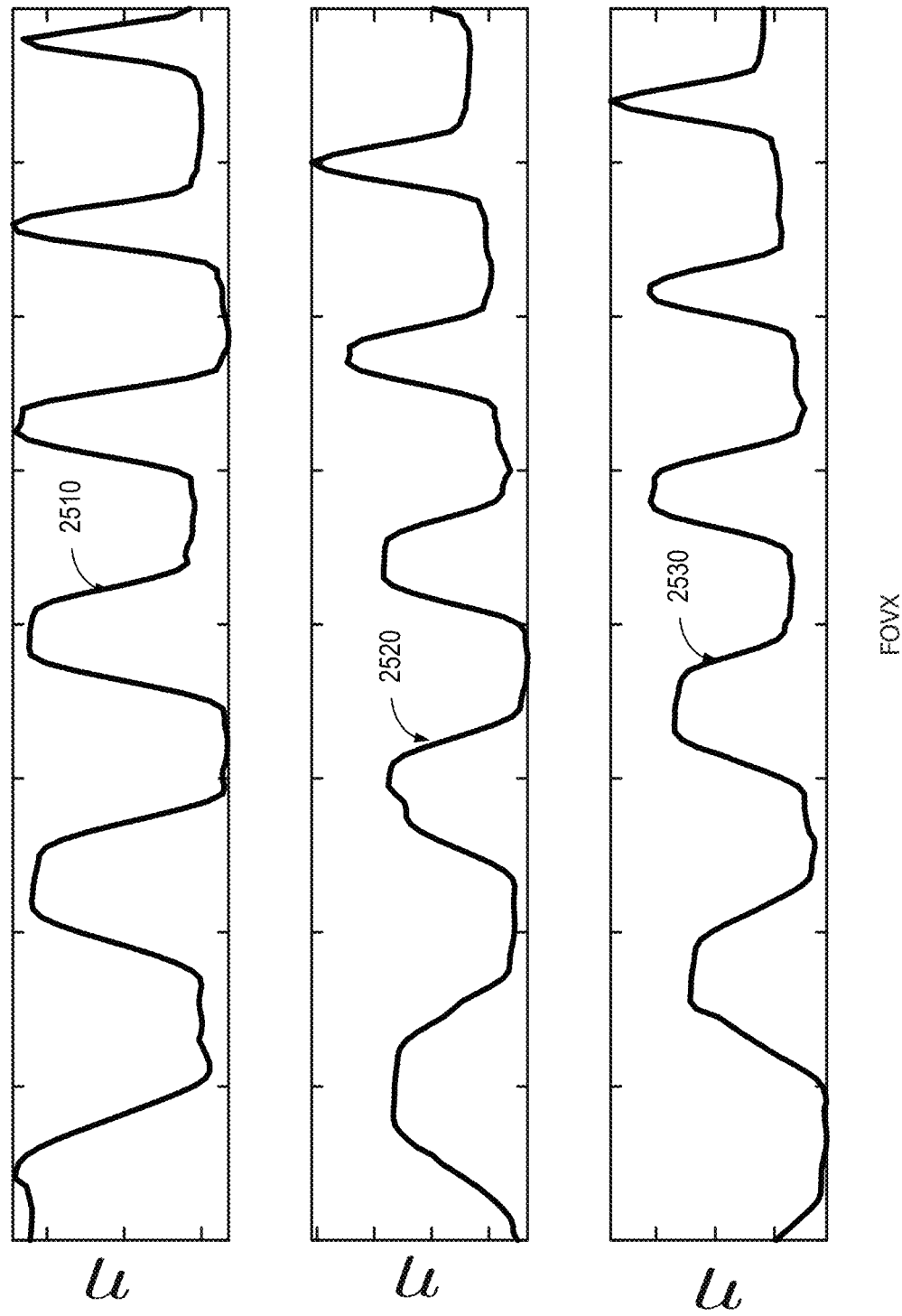
FIG. 25 illustrates the fields of view of multiple gratings in an example of a volume Bragg grating-based waveguide display according to certain embodiments.

FIG. 25 illustrates the fields of view of multiple gratings in an example of a volume Bragg grating-based waveguide display according to certain embodiments. In some embodiments, each of the gratings may be in a respective grating layer or on a respective waveguide plate. Each of the gratings may be a multiplexed grating including many exposures, and may be used to couple display light from multiple FOV ranges into or out of the waveguide at high efficiencies. For example, a curve 2510 may show the diffraction efficiency of a first VBG (e.g., VBG 2422 of FIG. 24) for light from different fields of view. A curve 2520 may show the diffraction efficiency of a second VBG (e.g., VBG 2420 of FIG. 24) for light from different fields of view. A curve 2530 may show the diffraction efficiency of a third VBG (e.g., VBG 2424 of FIG. 24) for light from different fields of view. The first, second, and third VBGs, when arranged in a stack, may more uniformly diffract light in the full field of view (e.g., from about −20° to about 20°) at high efficiencies. In some embodiments, the first VBG, the second VBG, and the third VBG may be used to couple display light of the same color. Different sets of VBGS may be used to cover the full field of view for display light of different colors.

A VBG designed to diffract light in one wavelength and from one angular range may also diffract light in another wavelength and from another angular range. For example, a VBG characterized by a particular period and slant angle may diffract light in different wavelengths and from different incident angles.

Figure 26B:
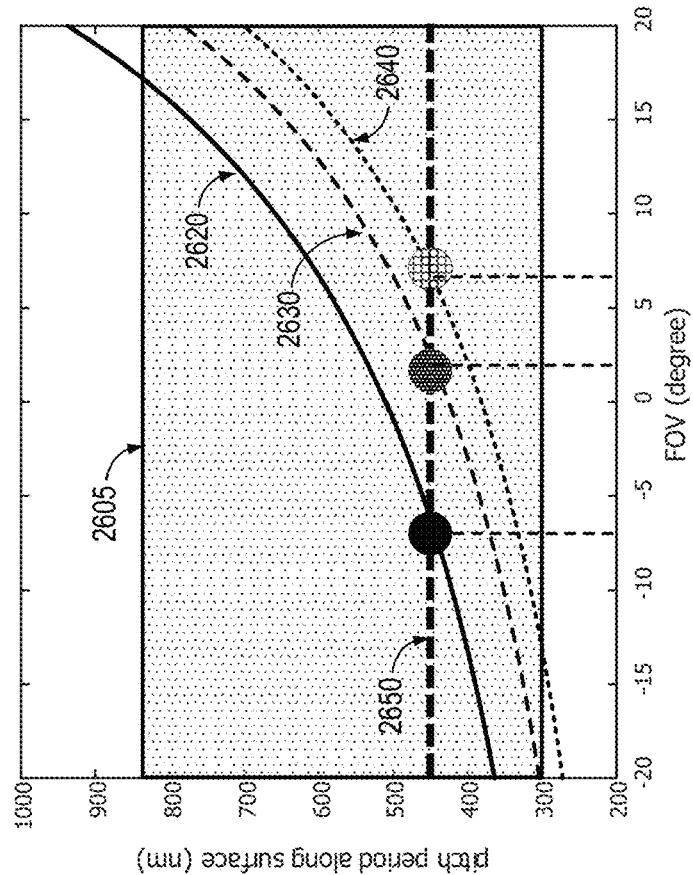
FIG. 26B illustrates the relationship between grating periods of volume Bragg gratings and the corresponding fields of view for incident light of different colors.
Figure 26A:
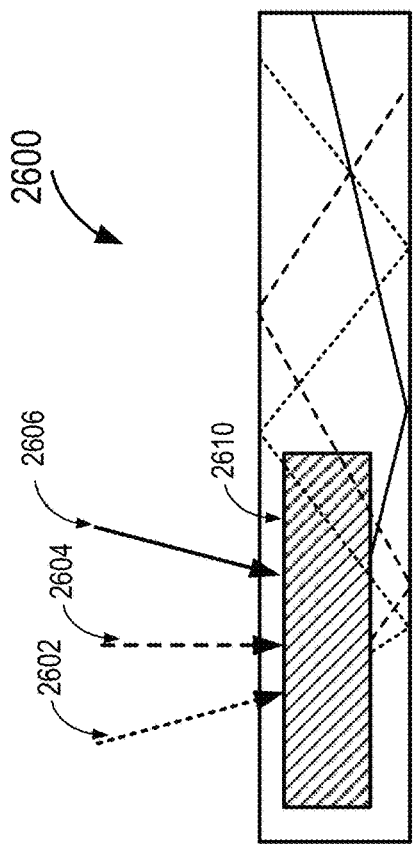
FIG. 26A illustrates the diffraction of light of different colors from different corresponding fields of view by an example of a volume Bragg grating.

FIG. 26A illustrates the diffraction of light of different colors from corresponding fields of view by an example of a volume Bragg grating 2610 and. As shown in the example, VBG 2610 may diffract blue light 2602 from a first incident angle into a waveguide at a first diffraction angle. VBG 2610 may also diffract green light 2604 from a second incident angle into the waveguide at a second diffraction angle. VBG 2610 may further diffract red light 2606 from a third incident angle into the waveguide at a third diffraction angle.

FIG. 26B illustrates the relationship between grating periods of volume Bragg gratings and the corresponding fields of view for incident light of different colors. A curve 2620 shows that red light from different fields of view may be diffracted by VBGs having different grating periods. Similarly, a curve 2630 shows that green light from different fields of view may be diffracted by VBGs having different grating periods, and a curve 2630 shows that blue light from different fields of view may be diffracted by VBGs having different grating period. FIG. 26B also shows that a VBG having a particular grating period and slant angle may diffract light in different wavelengths and from different incident angles (e.g., from different fields of view). A region 2605 in FIG. 26B shows gratings that may diffract light of two or more colors from two or more respective FOVs. For example, a dashed line 2650 in FIG. 26B may correspond to a VBG with a grating period about 450 nm, where the VBG may diffract red light from about −7° field of view, diffract green light from about 2° field of view, and diffract blue light from about 6° field of view.

As described above, VBGs may be reflection VBGs or transmission VBGs. Reflection VBGs and transmission VBGs can have different diffraction properties. For example, as described above with respect to FIGS. 18A and 18B, reflection gratings may have relatively lower dispersion than transmission gratings of similar thicknesses. Transmission gratings used as output gratings may allow for the overlapping of the gratings for two-dimensional exit pupil replication to reduce the physical size of the waveguide display as described above with respect to FIG. 16, while reflection gratings may not as described above with respect to FIG. 15.

Figure 27A:
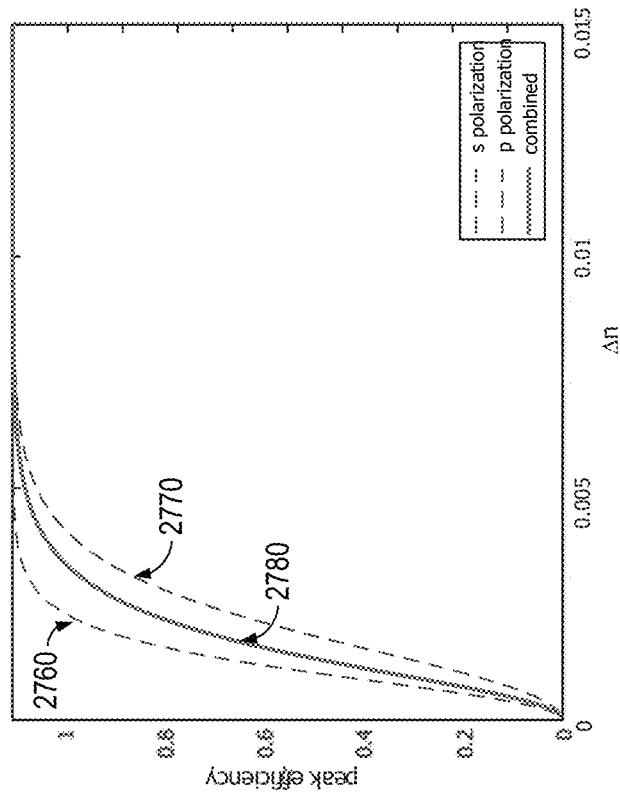
FIG. 27A illustrates the diffraction efficiencies of examples of transmission volume Bragg gratings with the same thickness but different refractive index modulations.

FIG. 27A illustrates the diffraction efficiencies of examples of transmission volume Bragg gratings with the same thickness but different refractive index modulations. The diffraction efficiencies may be polarization-dependent. A curve 2710 shows the diffraction efficiencies of the examples of transmission VBGs for s-polarized light, while a curve 2720 shows the diffraction efficiencies of the examples of transmission VBGs for p-polarized light. A curve 2730 shows the average diffraction efficiencies of the examples of transmission VBGs for s- and p-polarized light (e.g., unpolarized light). As shown in FIG. 27A, curve 2710 and curve 2720 may correspond to functions proportional to a square of a sinusoidal function (e.g., $\propto \sin^2(a \times n_1 \times D)$). The diffraction efficiencies of transmission gratings may increase or decrease with the increase of the refractive index modulation. Thus, increasing the refractive index modulation of a transmission VBG may not necessarily increase the diffraction efficiency of the transmission VBG.

Figure 27B:
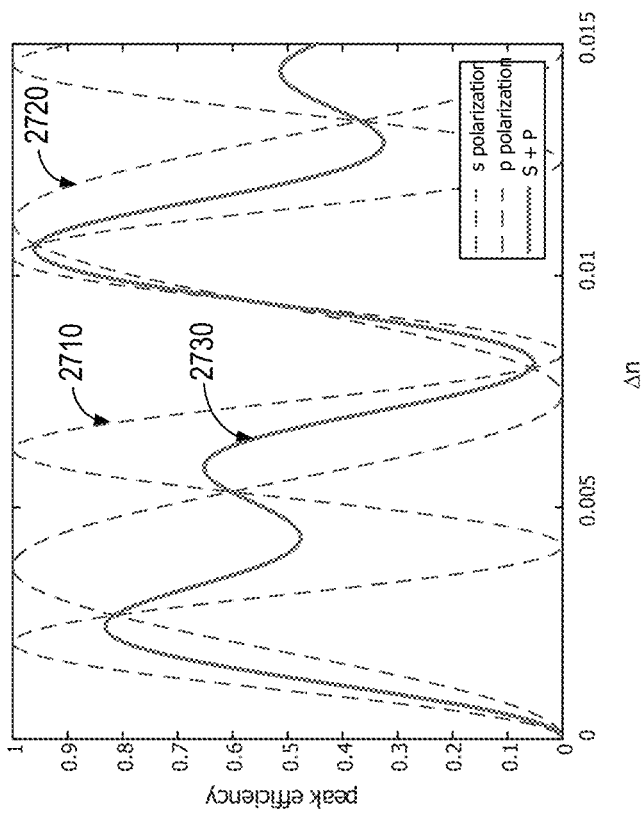
FIG. 27B illustrates the diffraction efficiencies of examples of reflection volume Bragg gratings with the same thickness but different refractive index modulations.

FIG. 27B illustrates the diffraction efficiencies of examples of reflection volume Bragg gratings with the same thickness but different refractive index modulations. The diffraction efficiencies for reflection VBGs are also polarization-dependent. A curve 2760 shows the diffraction efficiencies of the examples of reflection VBGs for s-polarized light, while a curve 2720 shows the diffraction efficiencies of the examples of reflection VBGs for p-polarized light. A curve 2730 shows the average diffraction efficiencies of the examples of reflection VBGs for s- and p-polarized light (e.g., unpolarized light). As shown in FIG. 27B, the diffraction efficiencies of reflection VBGs may increase with the increase of the refractive index modulation (e.g., $\propto \tanh^2(a \times n_1 \times D)$) and may saturate when the refractive index modulation reaches a certain value.

Figure 28A:
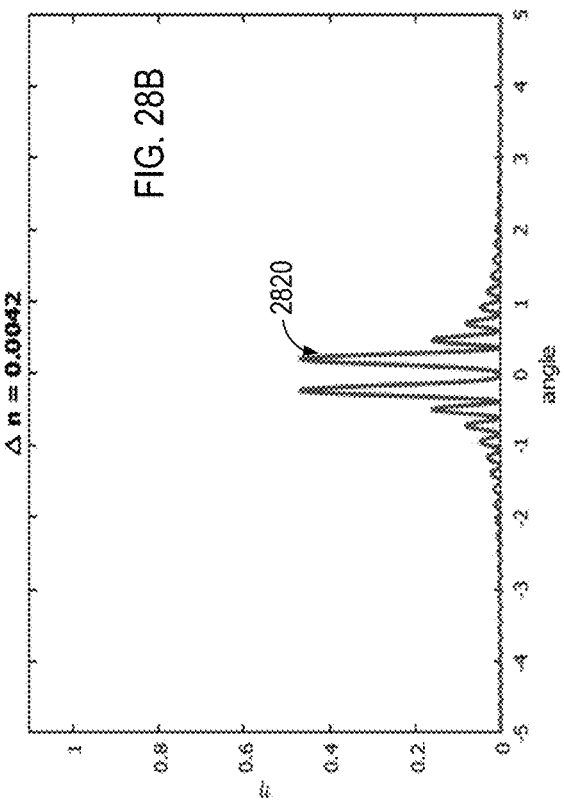
FIG. 28A illustrates the diffraction efficiency of an example of a transmission volume Bragg grating with a first refractive index modulation as a function of the deviation of the incident angle from the Bragg condition.
Figure 28B:
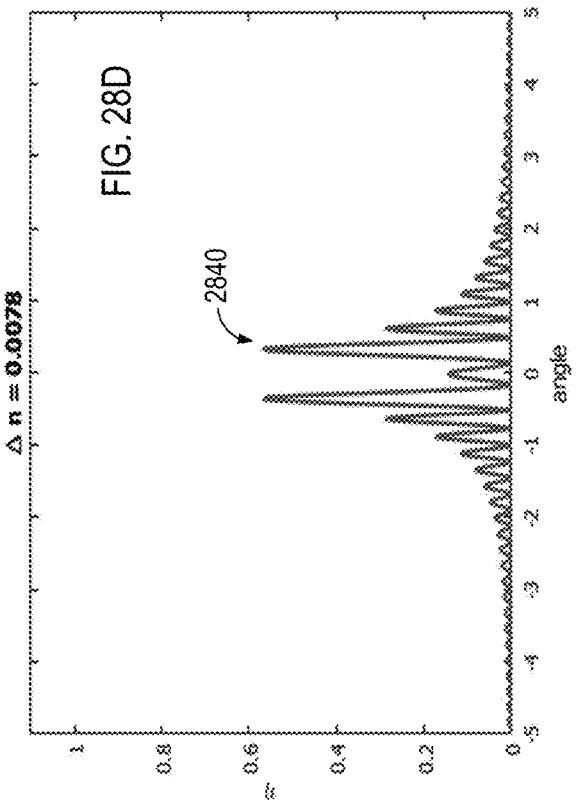
FIG. 28B illustrates the diffraction efficiency of an example of a transmission volume Bragg grating with a second refractive index modulation as a function of the deviation of the incident angle from the Bragg condition.
Figure 28C:
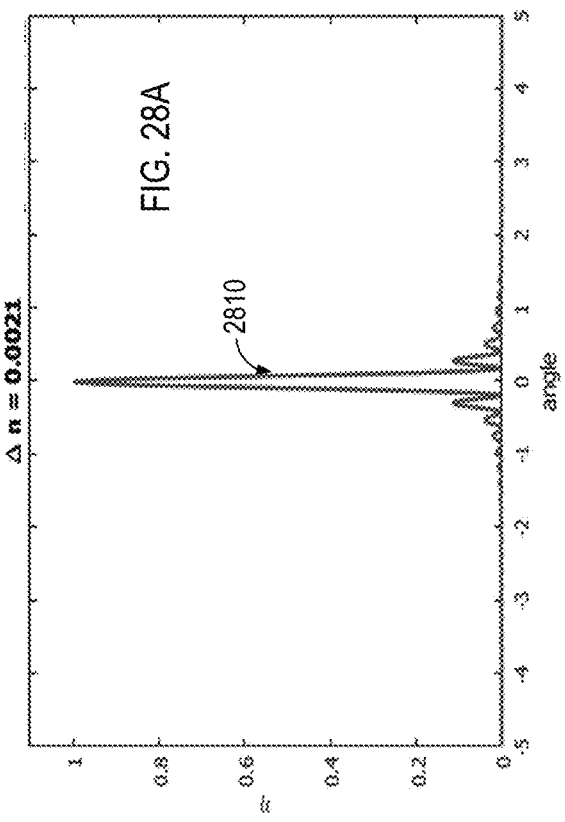
FIG. 28C illustrates the diffraction efficiency of an example of a transmission volume Bragg grating with a third refractive index modulation as a function of the deviation of the incident angle from the Bragg condition.
Figure 28D:
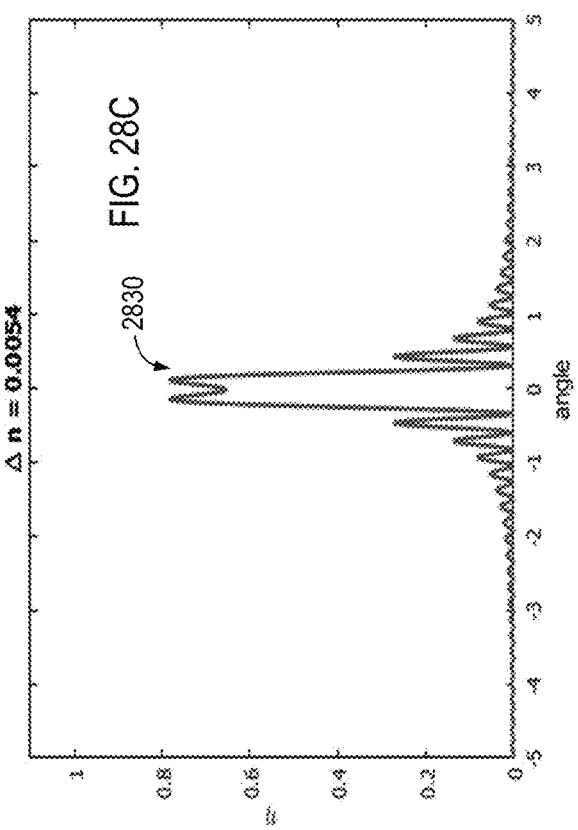
FIG. 28D illustrates the diffraction efficiency of an example of a transmission volume Bragg grating with a fourth refractive index modulation as a function of the deviation of the incident angle from the Bragg condition.

FIGS. 28A-28D illustrate the diffraction efficiency of examples of transmission volume Bragg gratings with different refractive index modulations as a function of the deviation of the incident angle from the Bragg condition. A curve 2810 in FIG. 28A shows the diffraction efficiency of an example of a transmission VBG with a refractive index modulation about 0.002, where the peak diffraction efficiency of the main lobe is close to 100%. A curve 2820 in FIG. 28B shows the diffraction efficiency of an example of a transmission VBG with a refractive index modulation about 0.004, where the peak diffraction efficiency drops to about 0 at about 0°, the diffraction efficiency curve 2820 has two peaks, and the sidelobes increase, compared with the transmission VBG of FIG. 28A. A curve 2830 in FIG. 28C shows the diffraction efficiency of an example of a transmission VBG with a refractive index modulation about 0.0054, where the peak diffraction efficiency, the FWHM angular range of the main lobe, and the sidelobes may increase compared with the transmission VBG of FIG. 28B. A curve 2840 in FIG. 28D shows the diffraction efficiency of an example of a transmission VBG with a refractive index modulation about 0.0078, where the peak diffraction efficiency decreases, the diffraction efficiency curve 2840 has two peaks, and the sidelobes increase, compared with the transmission VBG of FIG. 28C.

Figure 29A:
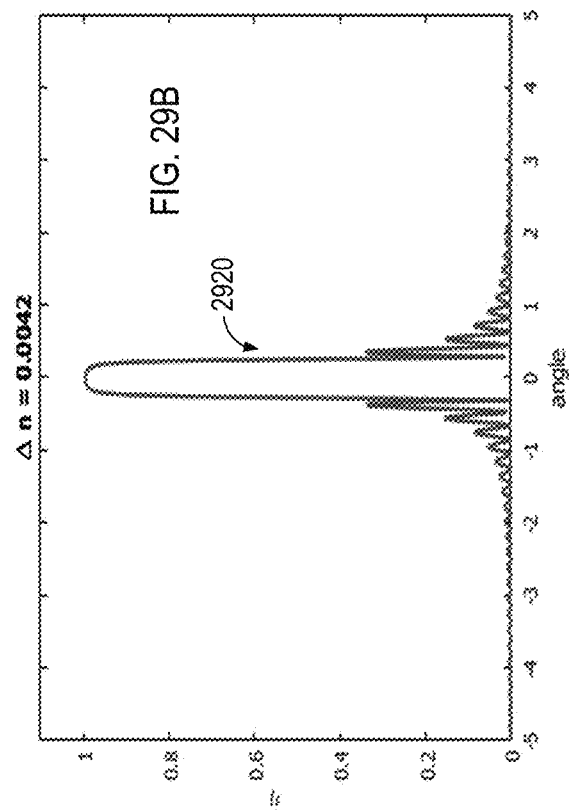
FIG. 29A illustrates the diffraction efficiency of an example of a reflection volume Bragg grating with a first refractive index modulation as a function of the deviation of the incident angle from the Bragg condition.
Figure 29B:
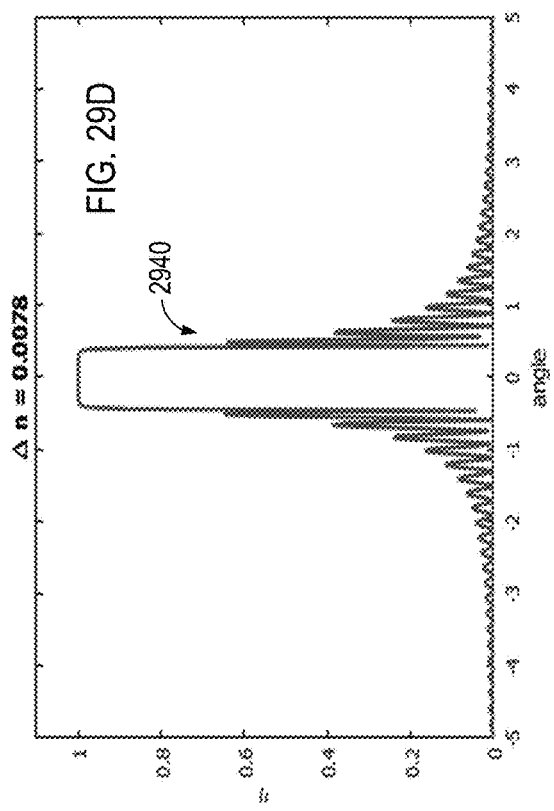
FIG. 29B illustrates the diffraction efficiency of an example of a reflection volume Bragg grating with a second refractive index modulation as a function of the deviation of the incident angle from the Bragg condition.
Figure 29C:
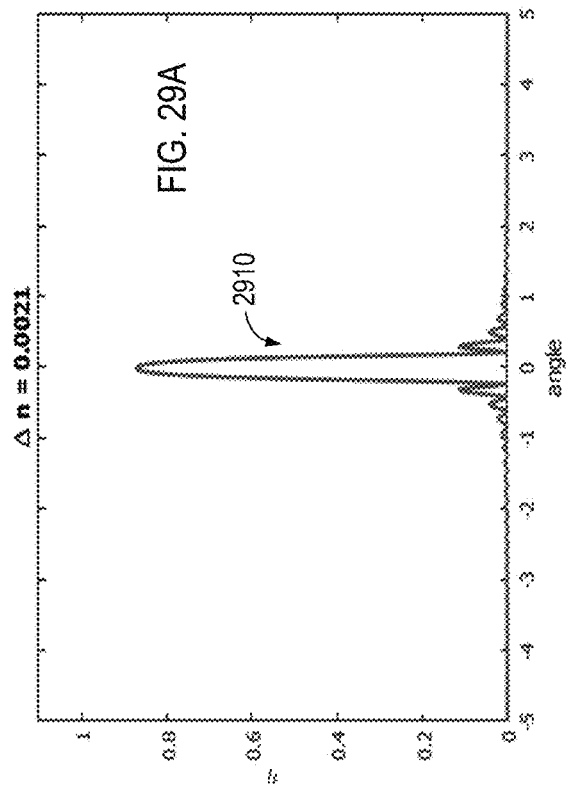
FIG. 29C illustrates the diffraction efficiency of an example of a reflection volume Bragg grating with a third refractive index modulation as a function of the deviation of the incident angle from the Bragg condition.
Figure 29D:
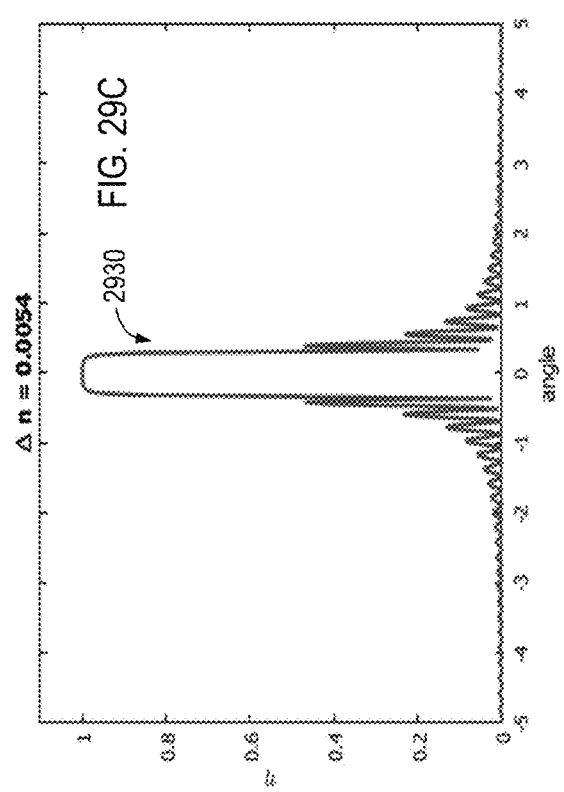
FIG. 29D illustrates the diffraction efficiency of an example of a reflection volume Bragg grating with a fourth refractive index modulation as a function of the deviation of the incident angle from the Bragg condition.

FIGS. 29A-29D illustrate the diffraction efficiency of examples of reflection volume Bragg gratings having different refractive index modulations as a function of the deviation of the incident angle from the Bragg condition. A curve 2910 in FIG. 29A shows the diffraction efficiency of an example of a reflection VBG with a refractive index modulation about 0.002, where the peak diffraction efficiency of the main lobe is greater than 80%. A curve 2920 in FIG. 29B shows the diffraction efficiency of an example of a reflection VBG with a refractive index modulation about 0.004, where the peak diffraction efficiency increases to 100%, the FWHM angular range of the main lobe increases, and the sidelobes increase compared with the reflection VBG of FIG. 29A. A curve 2930 in FIG. 29C shows the diffraction efficiency of an example of a reflection VBG with a refractive index modulation about 0.0054, where the peak diffraction efficiency is about 100%, the FWHM angular range of the main lobe further increases, and the sidelobes further increase as well compared with the reflection VBG of FIG. 29B. A curve 2940 in FIG. 29D shows the diffraction efficiency of an example of a reflection VBG with a refractive index modulation about 0.0078, where the peak diffraction efficiency is about 100%, the FWHM angular range of the main lobe further increases, and the sidelobes further increase as well compared with the reflection VBG of FIG. 29C.

For transmission VBGs, the diffraction efficiency of a polarized light may be a function of the refractive index modulation (e.g., $\propto \sin^2(a \times n_1 \times D)$) as shown in FIG. 27A. In addition, the diffraction efficiency may be color dependent. For example, a transmission VBG may need a lower refractive index modulation to reach the first diffraction peak shown in FIG. 27A for one color (e.g., blue) than for another color (e.g., green or red). A grating with a certain refractive index modulation less than the refractive index modulation corresponding to the first diffraction peak shown in FIG. 27A may have a higher diffraction efficiency for blue light than for green or red light.

Figure 30A:
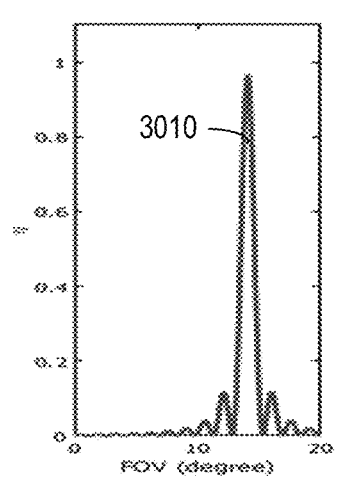
FIG. 30A illustrates diffraction efficiencies of an example of a transmission VBG with a first refractive index modulation for blue light from different fields of view.
Figure 30B:
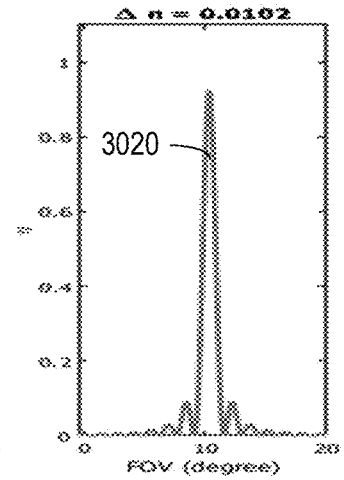
FIG. 30B illustrates diffraction efficiencies of the example of transmission VBG with the first refractive index modulation for green light from different fields of view.
Figure 30C:
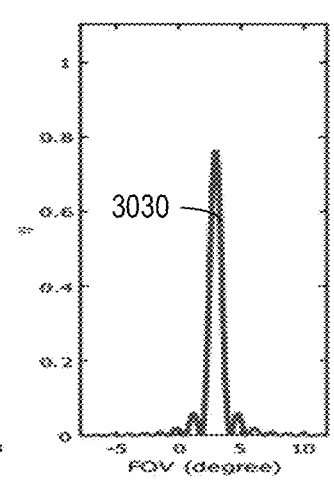
FIG. 30C illustrates diffraction efficiencies of the example of transmission VBG with the first refractive index modulation for red light from different fields of view.

FIGS. 30A-30C illustrate the diffraction efficiency of an example of a transmission VBG with a first refractive index modulation (e.g., about 0.01). The transmission VBG may diffract light of different colors from different respective fields of view with different respective diffraction efficiencies as described above with respect to FIGS. 26A and 26B. For example, a curve 3010 in FIG. 30A may illustrate the diffraction efficiency of the transmission VBG for blue light from about 14° field of view, where the peak diffraction efficiency may be close to 100%. A curve 3020 in FIG. 30B may illustrate the diffraction efficiency of the same transmission VBG for green light from about 10° field of view, where the peak diffraction efficiency has not reached 100% yet (e.g., at about 90%). A curve 3030 in FIG. 30C may illustrate the diffraction efficiency of the same transmission VBG for red light from about 3° field of view, where the peak diffraction efficiency may be about 80%.

Figure 30D:
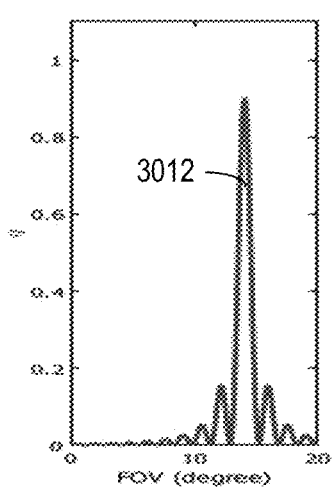
FIG. 30D illustrates diffraction efficiencies of an example of a transmission VBG with a second refractive index modulation for blue light from different fields of view.
Figure 30E:
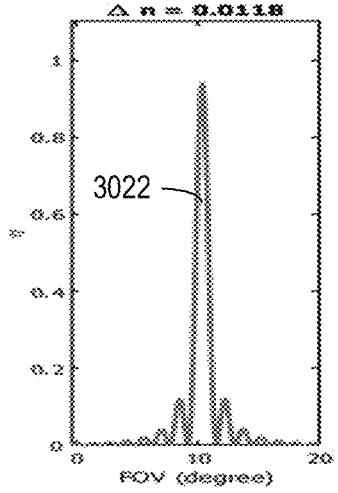
FIG. 30E illustrates diffraction efficiencies of the example of transmission VBG with the second refractive index modulation for green light from different fields of view.
Figure 30F:
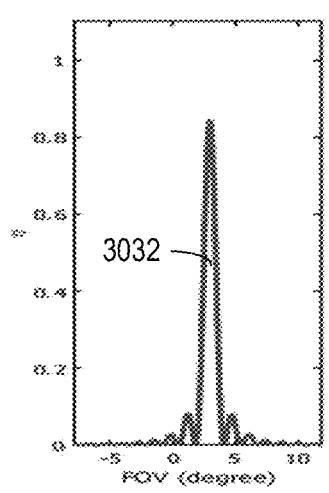
FIG. 30F illustrates diffraction efficiencies of the example of transmission VBG with the second refractive index modulation for red light from different fields of view.

FIGS. 30D-30F illustrate the diffraction efficiency of an example of a transmission VBG with a second refractive index modulation (e.g., 0.012). The transmission VBG may be different from the transmission VBG associated with FIGS. 30A-30C in only the refractive index modulation. The transmission VBG may diffract light of different colors from different respective fields of view with different respective diffraction efficiencies. For example, a curve 3012 in FIG. 30D may illustrate the diffraction efficiency of the transmission VBG for blue light from about 14° field of view, where the peak diffraction efficiency may have decreased from the peak value of about 100% shown in FIG. 30A because the refractive index modulation is greater than the refractive index modulation associated with the first diffraction efficiency peak as shown in FIG. 30A. A curve 3022 in FIG. 30E may illustrate the diffraction efficiency of the same transmission VBG for green light from about 10° field of view, where the peak diffraction efficiency may have increased (e.g., greater than 90%). A curve 3032 in FIG. 30F may illustrate the diffraction efficiency of the same transmission VBG for red light from about 3° field of view, where the peak diffraction efficiency may have increased to greater than 80%.

Figure 30G:
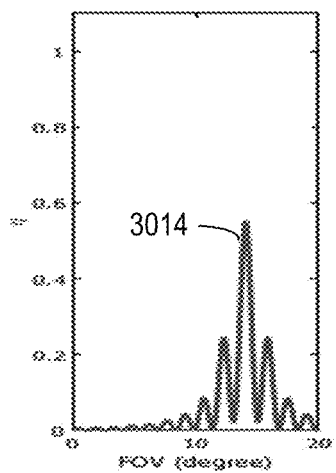
FIG. 30G illustrates diffraction efficiencies of an example of a transmission VBG with a third refractive index modulation for blue light from different fields of view.
Figure 30H:
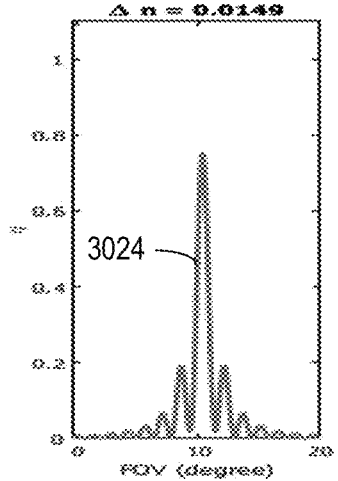
FIG. 30H illustrates diffraction efficiencies of the example of transmission VBG with the third refractive index modulation for green light from different fields of view.
Figure 30I:
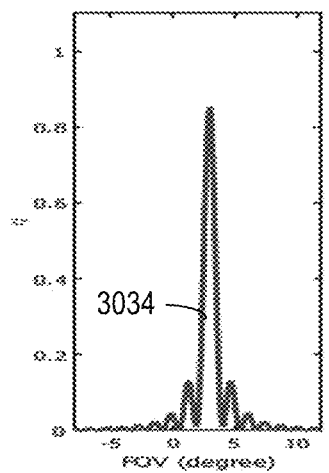
FIG. 30I illustrates diffraction efficiencies of the example of transmission VBG with the third refractive index modulation for red light from different fields of view.

FIGS. 30G-30I illustrate the diffraction efficiency of an example of a transmission VBG with a third refractive index modulation (e.g., 0.015). The transmission VBG may be different from the transmission VBGs associated with FIGS. 30A-30F in only the refractive index modulation. The transmission VBG may diffract light of different colors from different respective fields of view with different respective diffraction efficiencies. For example, a curve 3014 in FIG. 30G may illustrate the diffraction efficiency of the transmission VBG for blue light from about 14° field of view, where the peak diffraction efficiency may have further decreased from the value shown in FIG. 30D because the refractive index modulation is greater than the refractive index modulation associated with the first diffraction efficiency peak as shown in FIG. 30A. A curve 3024 in FIG. 30H may illustrate the diffraction efficiency of the same transmission VBG for green light from about 10° field of view, where the peak diffraction efficiency may also have decreased from its maximum value. A curve 3034 in FIG. 30I may illustrate the diffraction efficiency of the same transmission VBG for red light from about 3° field of view, where the peak diffraction efficiency may have further increased.

In contrast, for reflection VBGs, as shown in FIG. 27B and FIGS. 29A-29D, the diffraction efficiency may not decrease with the increase of the refractive index modulation. The FWHM angular range of the main lobe and the sidelobes of the diffraction efficiency curve may increase with the increase of the refractive index modulation.

Figure 31A:
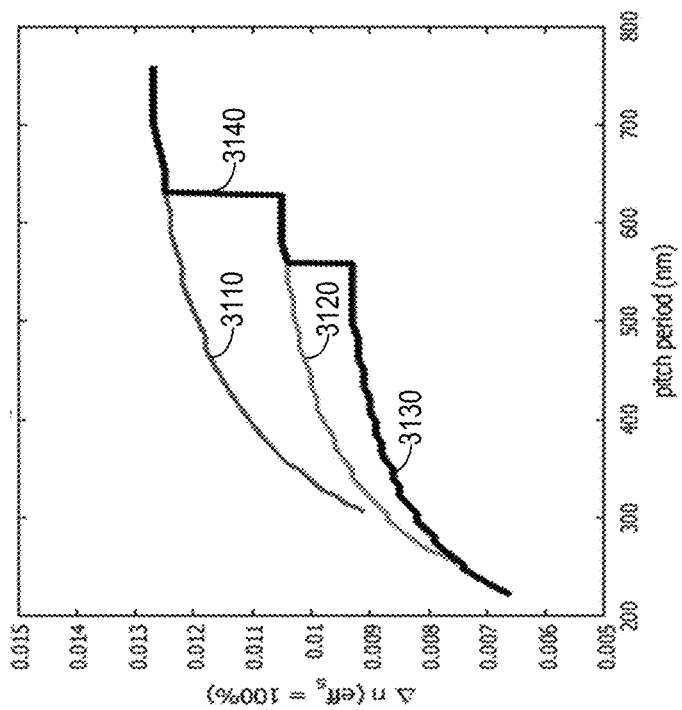
FIG. 31A illustrates the minimum refractive index modulations of transmission volume Bragg gratings with different grating periods in order to achieve diffraction saturation for light of different colors.

FIG. 31A illustrates the minimum refractive index modulations of transmission volume Bragg gratings with different grating periods in order to achieve diffraction saturation for different colors. A curve 3110 shows the minimum refractive index modulations of transmission VBGs to achieve the maximum diffraction efficiency for red light, a curve 3120 shows the minimum refractive index modulations of transmission VBGs to achieve the maximum diffraction efficiency for green light, while a curve 3130 shows the minimum refractive index modulations of transmission VBGs to achieve the maximum diffraction efficiency for blue light. As illustrated, for a grating with a given grating period and thickness, the minimum refractive index modulation to achieve the maximum diffraction efficiency may vary for different colors. For example, the minimum refractive index modulation for maximum diffraction efficiency for blue light may be lower than that for green light or red light. Thus, as also illustrated in FIGS. 30A-30I, for a grating that can diffract light in multiple colors, when the refractive index modulation is at a value that can achieve the highest diffraction efficiency for blue light, the diffraction efficiencies of the same grating for green light and red light may be lower; when the refractive index modulation is at a value that can achieve the highest diffraction efficiency for red light, the diffraction efficiencies of the same grating for blue light and green light may decrease from their peak values. Therefore, there may need to be some tradeoff between the diffraction efficiencies for different colors.

Figure 31B:
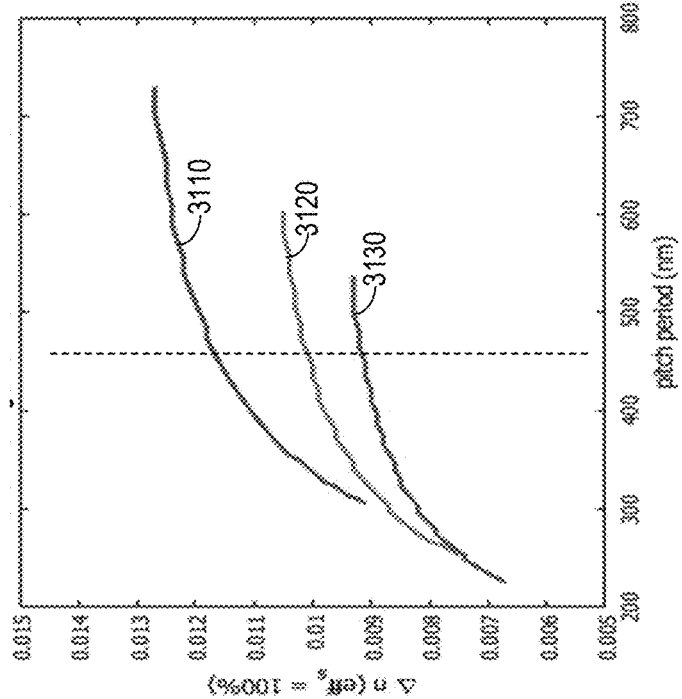
FIG. 31B shows the maximum refractive index modulations of transmission gratings having different grating periods in order to avoid refractive index modulation saturation for blue, green, and red light.

FIG. 31B illustrates a curve 3140 that shows the refractive index modulations of transmission gratings having different grating periods in order to avoid the refractive index modulation saturation for any color. For example, for gratings that may diffract blue light, the refractive index modulations may be determined based on the refractive index modulation saturation for blue light. For gratings that may only diffraction green and red light, the refractive index modulation may be determined based on the refractive index modulation saturation for green light. For gratings that may only diffract red light, the refractive index modulation may be determined based on the refractive index modulation saturation for red light.

As described above, in order to cover the full field of view for red, green, and blue light, a VBG may be a multiplexed grating that is exposed to different recording light patterns multiple times, where each exposure may record a grating that may diffract red, green, and blue light from different respective fields of view. The gratings in the multiplexed VBG may have different grating periods. The multiplexed VBG may be used to diffract light of all colors from the full field of view. In addition, the gratings in the multiplexed VBG may have different refractive index modulations in order to optimize the diffraction efficiencies for different colors.

Figure 31C:
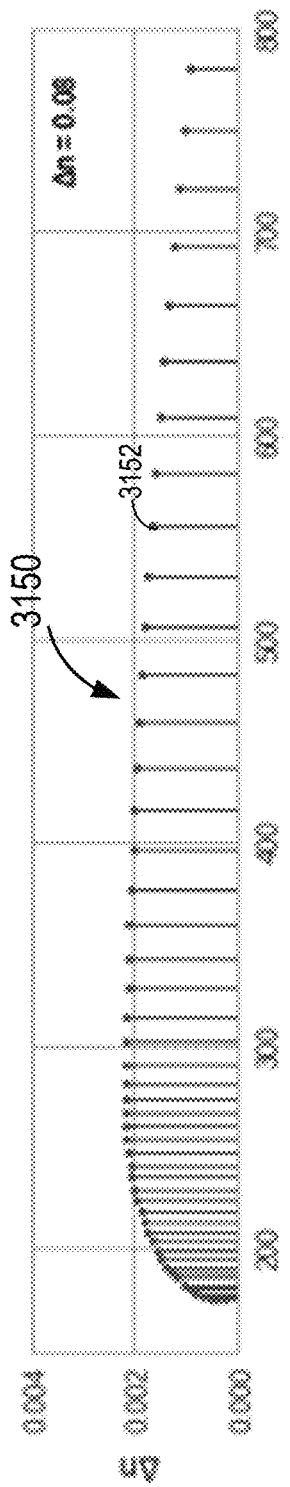
FIG. 31C illustrates an example of a grating layer including multiplexed VBGs of different pitches and refractive index modulations for optimized diffraction efficiency and uniformity according to certain embodiments.

FIG. 31C is a diagram 3150 illustrating an example of a grating layer including multiplexed VBGs of different pitches and different refractive index modulations for optimized the diffraction efficiency and diffraction efficiency uniformity according to certain embodiments. Each data point 3152 in diagram 3150 shows the period of a grating and the correspond refractive index modulation. In the illustrated example, the grating layer may include more than 40 gratings. The grating layer may have a maximum refractive index modulation about 0.08. Each grating may have a refractive index modulation about 0.002 or lower. The multiplexed gratings may, in combination, provide the full FOV for visible light.

It may generally be desirable to multiplex more gratings in a multiplexed VBG to increase the diffraction efficiency of light for a large field of view. However, crosstalk may occur between gratings when many gratings are multiplexed in a multiplexed VBG.

Figure 32A:
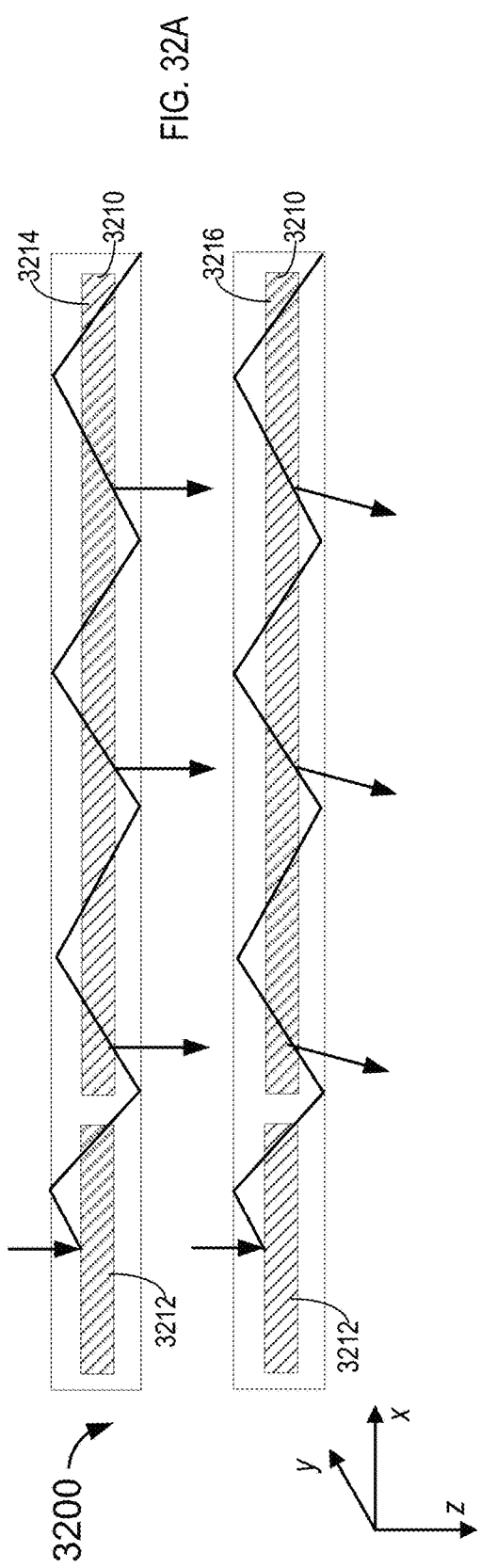
FIG. 32A illustrates FOV crosstalk caused by examples of multiplexed volume Bragg gratings.

FIG. 32A illustrates crosstalk caused by an example of a multiplexed volume Bragg grating in a waveguide display 3200. Waveguide display 3200 may include a multiplexed input grating that includes an input grating 3212. Waveguide display 3200 may also include a multiplexed output grating 3210 that includes two or more output gratings, such as a first output grating 3214 and a second output grating 3216, that may be recorded in a same grating layer or multiple grating layers. Display light in a first color and for a first field of view may be coupled into a waveguide by input grating 3212, and may be coupled by first output grating 3214 out of the waveguide at a desired angle, such as at an output angle equal to the input angle (e.g., about 90° in the illustrated example). Input grating 3212 and first output grating 3214 may have matching grating vectors (e.g., in at least the x-y plane) and thus may compensate the dispersion caused by each other and keep the output angle equal to the input angle.

The FOV associated with second output grating 3216 may at least partially overlap with the first FOV associated with first output grating 3214 due to the non-zero width of the diffraction efficiency curve for each grating as shown in, for example, FIGS. 28A-30I. Therefore, the display light from the first field of view and coupled into the waveguide by input grating 3212 may be at least partially coupled out of the waveguide at an undesired angle by second output grating 3216. Because of the grating vector mismatch between input grating 3212 and second output grating 3216, the input angle (e.g., about 90° in the example) and the output angle of the display light in the first FOV and coupled out the waveguide by second output grating 3216 may be different as shown in FIG. 32A. Thus, an undesired ghost image may be generated.

Figure 32B:
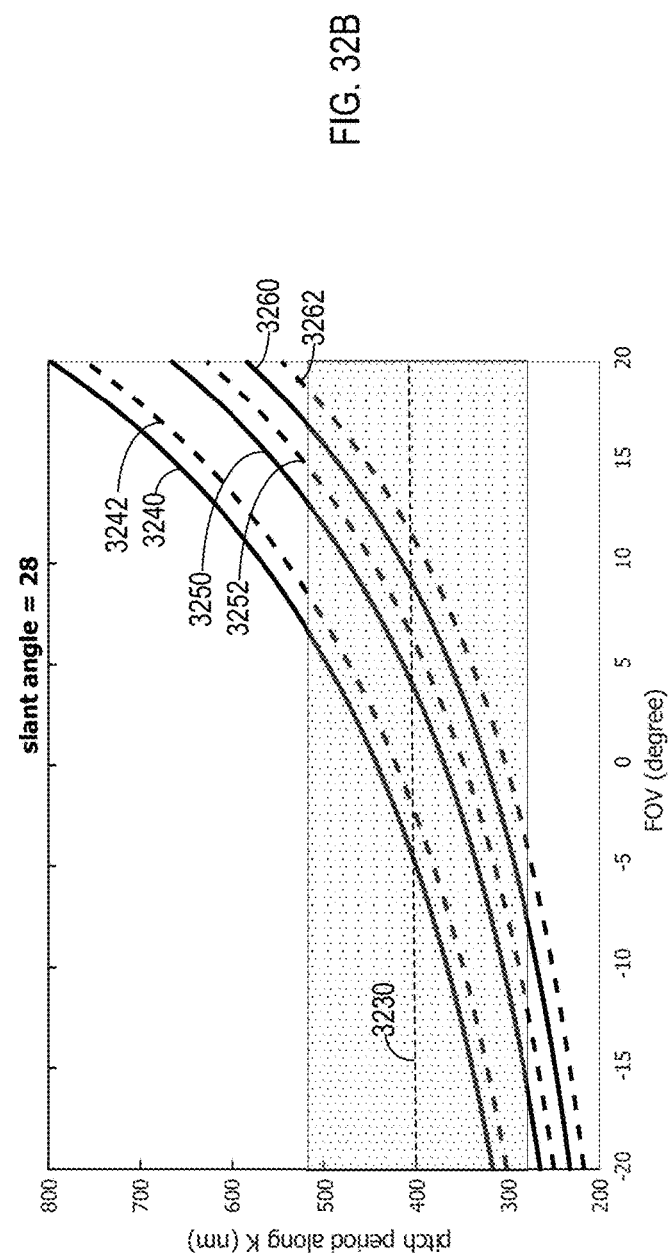
FIG. 32B illustrates the relationship between grating periods of volume Bragg gratings and the corresponding fields of view for incident light of different colors.

FIG. 32B illustrates the relationship between grating periods of volume Bragg gratings and the corresponding fields of view for incident light of different colors. As illustrated, a same VBG (e.g., a VBG represented by a line 3230) may diffract red light at a first wavelength from a negative field of view (as indicated by the intersection of line 3230 and a curve 3240). The same VBG may also diffract red light at a different (e.g., second) wavelength from a different negative field of view (as indicated by the intersection of line 3230 and a curve 3242). The red light at the first wavelength and the second wavelength may be emitted by a same light source (e.g., a red LED) that emits light in a narrow spectral range. Similarly, the same VBG may diffract green light at a third wavelength from a positive field of view (as indicated by the intersection of line 3230 and a curve 3250) and green light at a different (e.g., fourth) wavelength from a different positive field of view (as indicated by the intersection of line 3230 and a curve 3252). The green light at the third wavelength and the fourth wavelength may be emitted by a same light source (e.g., a green LED) that emits light in a narrow spectral range. The same VBG may further diffract blue light at a fifth wavelength from a positive field of view (as indicated by the intersection of line 3230 and a curve 3260) and blue light at a different (e.g., sixth) wavelength from a different positive field of view (as indicated by the intersection of line 3230 and a curve 3262). The blue light at the fifth wavelength and the sixth wavelength may be emitted by a same light source (e.g., a blue LED) that emits light in a narrow spectral range.

In some cases, ghost effects may be caused by undesired diffraction of display light for a first field of view by a grating for a different field of view. For example, ghost images may exist if the display light for the left half of the FOV is diffracted by the top grating for the right half of the FOV or if the display light for the right half of the FOV is diffracted by the top grating for the left half of the FOV. In some embodiments, to reduce the ghost effects, the two or more top gratings may be offset from each other and may not overlap. In some embodiments, the two or more top gratings may be designed such that the undesired diffraction of display light by a grating may not reach the eyebox and thus may not be observed by the user.

As described above, transmission grating and reflection grating may have different performance characteristics, such as diffraction efficiency, diffraction efficiency saturation, dispersion, FWHM angular range, and the like. For example, transmission grating may have broader Bragg peak linewidth than reflection grating. In addition, the Bragg peak linewidth for a transmission VBG or reflection VBG may vary with the corresponding field of view.

Figure 33A:
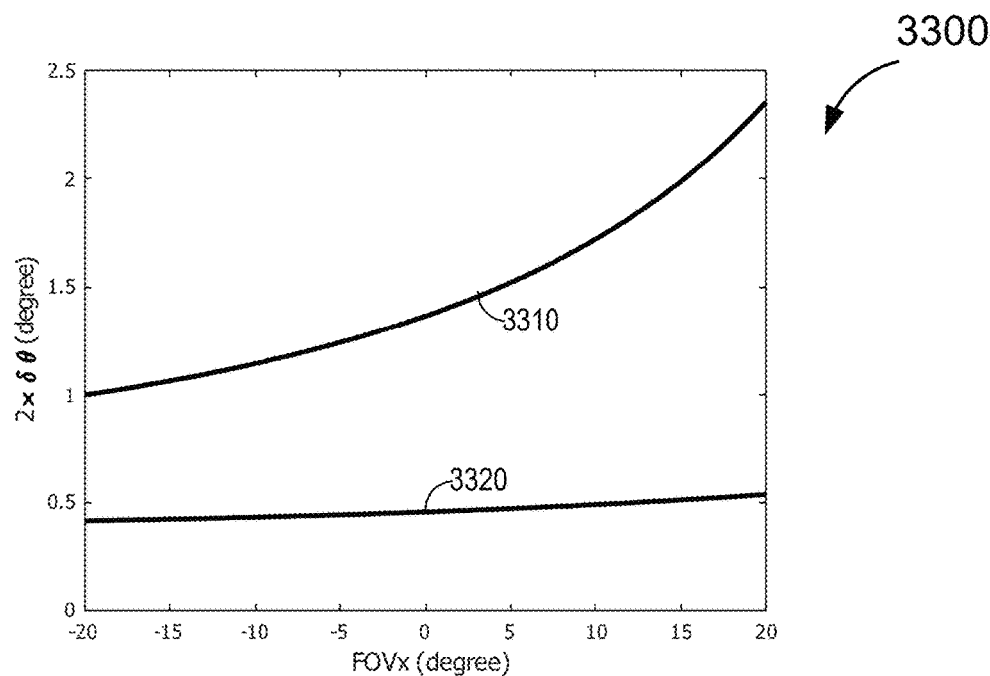
FIG. 33A illustrates linewidths of Bragg peaks of transmission volume Bragg gratings and reflection volume Bragg gratings for different fields of view.

FIG. 33A illustrates the linewidths of the Bragg peaks of transmission volume Bragg gratings and reflection volume Bragg gratings for different fields of view. A curve 3310 shows the linewidths of Bragg peaks of transmission VBGs for different fields of the view. Curve 3310 shows that the linewidth of the Bragg peak for a transmission VBG may increase significantly with the increase of the corresponding field of view. A curve 3320 illustrates the linewidths of the Bragg peaks of reflection VBGs for different fields of view. Curve 3320 shows that the linewidth of the Bragg peak for a reflection VBG may only increase slightly with the increase of the corresponding field of view.

Figure 33B:
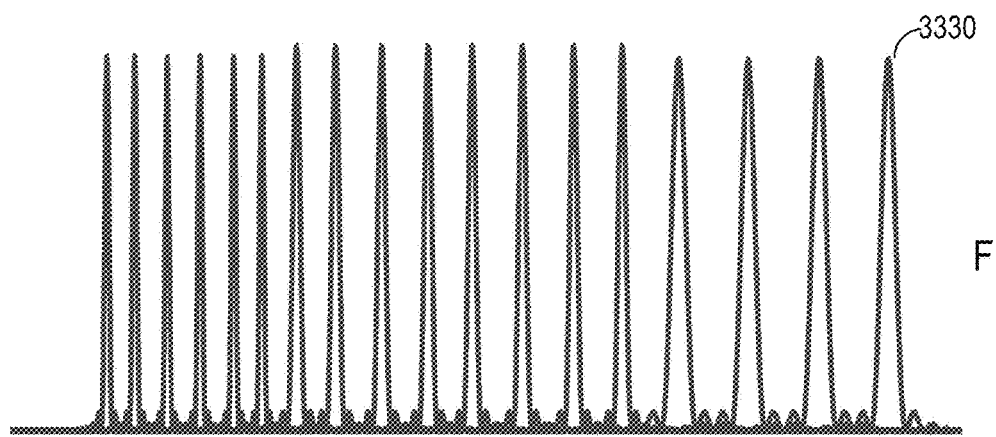
FIG. 33B illustrates examples of Bragg peaks of transmission volume Bragg gratings for different fields of view.

FIG. 33B illustrates examples of Bragg peaks 3330 of transmission volume Bragg gratings for different fields of view. As shown, the linewidth of a transmission VBG for a larger field of view may be much wider than the linewidth of a transmission VBG for a smaller field of view, and thus may cover a larger FOV range.

Figure 33C:
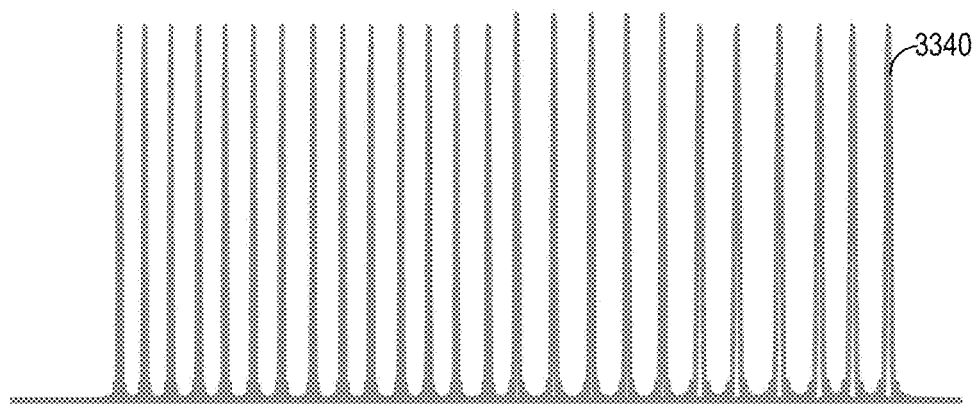
FIG. 33C illustrates examples of Bragg peaks of reflection volume Bragg gratings for different fields of view.

FIG. 33C illustrates examples of Bragg peaks 3340 of reflection volume Bragg gratings for different fields of view. As shown, the linewidth of a reflection VBG for a larger field of view may be approximately the same as the linewidth of a reflection VBG for a smaller field of view.

Figure 34A:
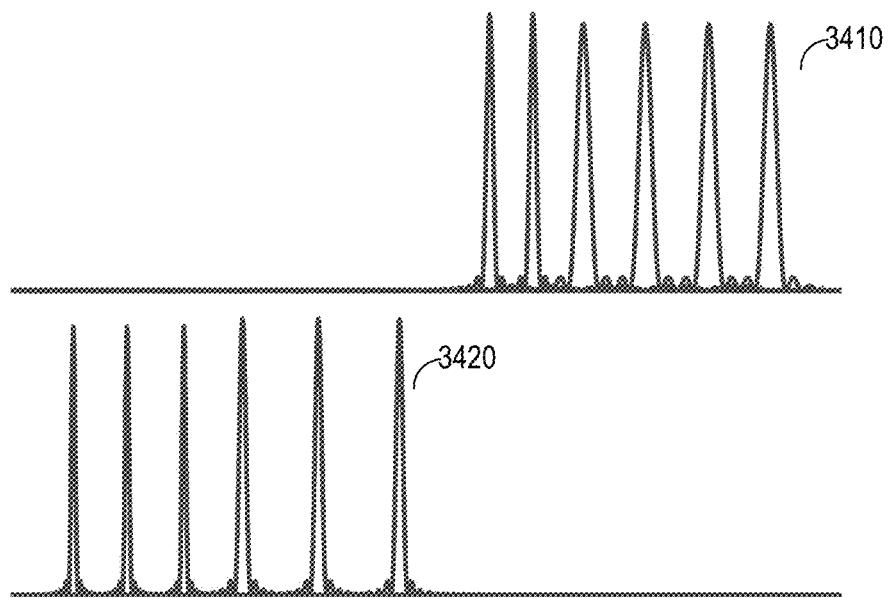
FIG. 34A illustrates trade-off between crosstalk and efficiency in an example of a multiplexed volume Bragg grating.

FIG. 34A illustrates trade-off between crosstalk and efficiency in an example of a multiplexed volume Bragg grating including multiple VBGs. In the example shown in FIG. 34A, the VBGs may be loosely multiplexed to avoid Bragg peak overlap and thus crosstalk between the VBGs for blue light from large positive fields of view as shown by a curve 3410. As described above, the VBGs may also diffract light of other colors from other fields of view. Thus, the gratings for diffracting blue light from positive fields of view may also diffract red light from negative fields of view. However, because the gratings are loosely multiplexed and the linewidths of Bragg peaks for transmission gratings are narrower at negative fields of view as described above with respect to FIGS. 33A-33B, red light from some negative fields of view may not be diffracted by the gratings as shown by gaps between peaks in a cure 3420, thus reducing the efficiency for red light at certain negative fields of view.

Figure 34B:
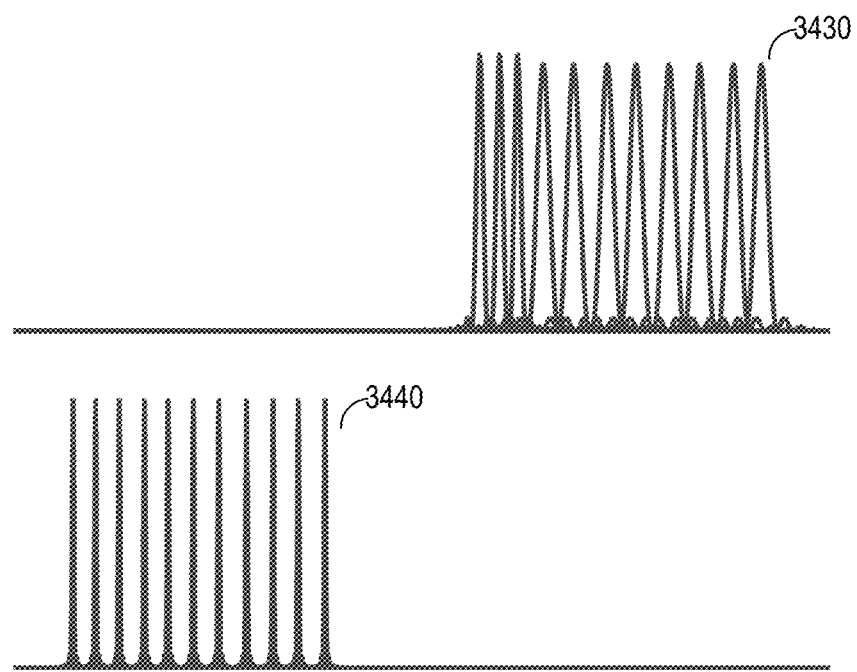
FIG. 34B illustrates trade-off between crosstalk and efficiency in an example of a multiplexed volume Bragg grating.

FIG. 34B illustrates trade-off between crosstalk and efficiency in an example of a multiplexed volume Bragg grating that includes multiple VBGs. In the illustrated example, the VBGs may be densely multiplexed to increase the coverage of the negative fields of view for red light as shown by a curve 3440. The densely multiplexed VBGs may also diffract blue light from positive fields of view. Because the VBGs are densely multiplexed and the linewidths of Bragg peaks for transmission gratings are broader at the positive fields of view, the Bragg peaks of blue light at positive fields of view may overlap and cause crosstalk between the VBGs for blue light from large positive fields of view as shown by a curve 3430.

Thus, in transmission gratings, it can be difficult to both minimize the crosstalk and maximize the efficiency. In many cases, the maximum achievable efficiency of transmission VBG-based waveguide display may be limited by the maximum allowable crosstalk.

Figure 35B:
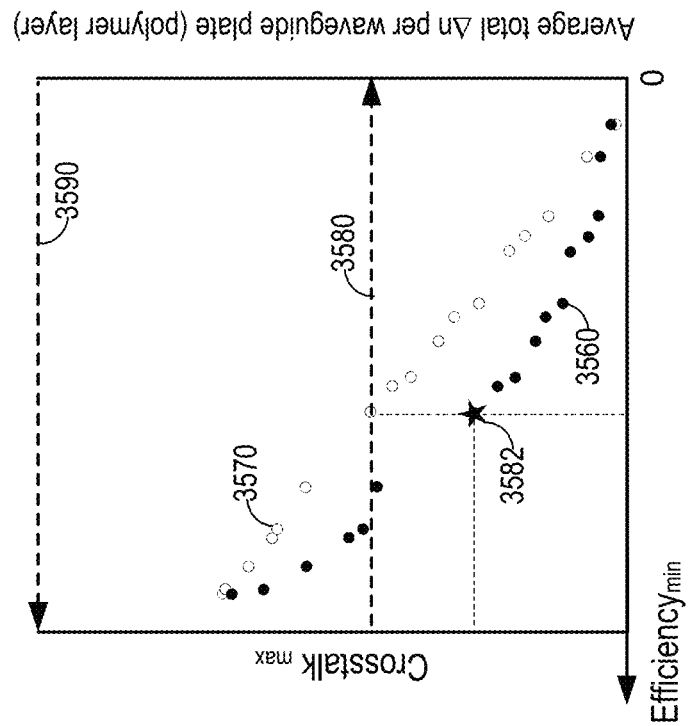
FIG. 35B illustrates the relationship between the minimum diffraction efficiency and the total refractive index modulation and the corresponding crosstalk in multiplexed reflection volume Bragg gratings.
Figure 35A:
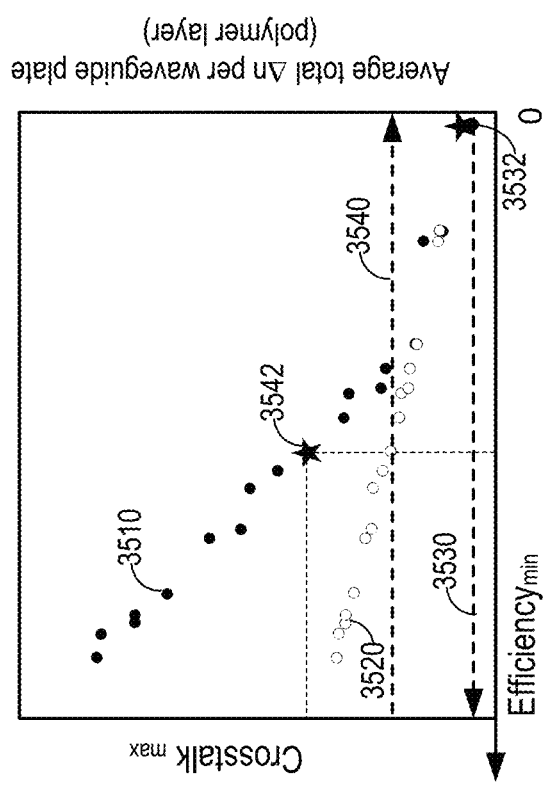
FIG. 35A illustrates the relationship between the minimum diffraction efficiency and the total refractive index modulation and the corresponding crosstalk in multiplexed transmission volume Bragg gratings.

FIG. 35A illustrates the relationship between the minimum diffraction efficiency and the total refractive index modulation and the corresponding crosstalk in multiplexed transmission volume Bragg gratings. The horizontal axis of FIG. 35A corresponds to the desired minimum efficiency. Data points 3520 show the minimum refractive index modulations in order to achieve the corresponding desired minimum diffraction efficiencies. Data points 3510 show the maximum crosstalk values associated with the corresponding minimum refractive index modulations in order to achieve the corresponding desired minimum efficiencies.

In the example shown in FIG. 35A, the desired crosstalk may be less than, for example, 0.06 (such that the checker board contrast can be about 30) as shown by a dashed line 3530. Each waveguide plate may have two polymer layers attached to it. The maximum refractive index modulation in each polymer layer may be, for example, about 0.05 such that the total refractive index modulation can be about 0.1 as indicated by the dashed line 3540. As shown by a data point 3542, when the total refractive index modulation of the two polymer layers is 0.1 to achieve a desired efficiency, the crosstalk may be much higher than the maximum allowable crosstalk indicated by dashed line 3530. As shown by a data point 3532, to achieve a crosstalk less than 0.06, the maximum refractive index modulation of the polymer layers may not be fully utilized, and the minimum efficiency may be relatively low. In the example shown by data point 3532 in FIG. 35A, only about 20% of the total refractive index modulation of the two polymer layers may be utilized in order to achieve the crosstalk performance. Thus, the efficiency of transmission VBG-based waveguide display may be limited by the maximum allowable crosstalk.

FIG. 35B illustrates the relationship between the minimum diffraction efficiency and the total refractive index modulation and the corresponding crosstalk in multiplexed reflection volume Bragg gratings. The horizontal axis corresponds to the desired minimum efficiency. Data points 3570 show the refractive index modulations in order to achieve the corresponding desired minimum efficiencies. Data points 3560 show the maximum crosstalk values associated with the corresponding refractive index modulations in order to achieve the corresponding desired minimum efficiencies.

In the example shown in FIG. 35B, each waveguide plate may have two polymer layers attached to it. The maximum refractive index modulation in each polymer layer may be, for example, about 0.05, such that the total refractive index modulation can be, for example, about 0.1 as indicated by the dashed line 3580. As shown by a point 3582 in FIG. 35B, when the maximum refractive index modulation of the polymer layers (e.g., 0.1) is fully utilized, the crosstalk of the grating is still much lower than the maximum allowable crosstalk indicated by line 3590 (e.g., about 0.06), and the efficiency may be relatively high. Thus, in a reflection VBG-based waveguide display, the diffraction efficiency may be limited by the maximum refractive index modulation of the polymer layer. In various embodiments, transmission gratings and reflection gratings may be selected based on the design considerations, such as the form factor, efficiency, image quality, and the like.

Based on the characteristics of the transmission VBGs and reflection VBGs, and the desired characteristics of a waveguide display, such as the efficiency, field of view, resolution, contrast, crosstalk, ghost image, rainbow effect, physical dimension, and the like, transmission VBGs or reflection VBGs may be selected to implement the waveguide display. For example, as described above with respect to FIG. 27B and FIGS. 29A-29D, for a reflection grating, the diffraction efficiency may saturate when the refractive index modulation is above a threshold value. The FWHM angular range or the FWHM wavelength range may be broadened as the refractive index modulation continues to increase. Such properties of reflection VBGs may be utilized in some waveguide systems.

For example, in an example of a waveguide display, the light sources in a project may emit light with a wavelength bandwidth about 10 nm to about 30 nm. For a unsaturated reflection VBG with a thickness about 50 μm, the FWHM wavelength range may be about 1 nm. Thus, multiple VBGs may be needed in order to diffract the emitted light in the wavelength bandwidth of the light source. The FWHM wavelength range of a saturated reflection VBG with a thickness about 50 μm may be much broader than 1 nm, and thus fewer reflection VBGs may be needed to diffract the emitted light in the wavelength bandwidth of the light source.

Figure 36:
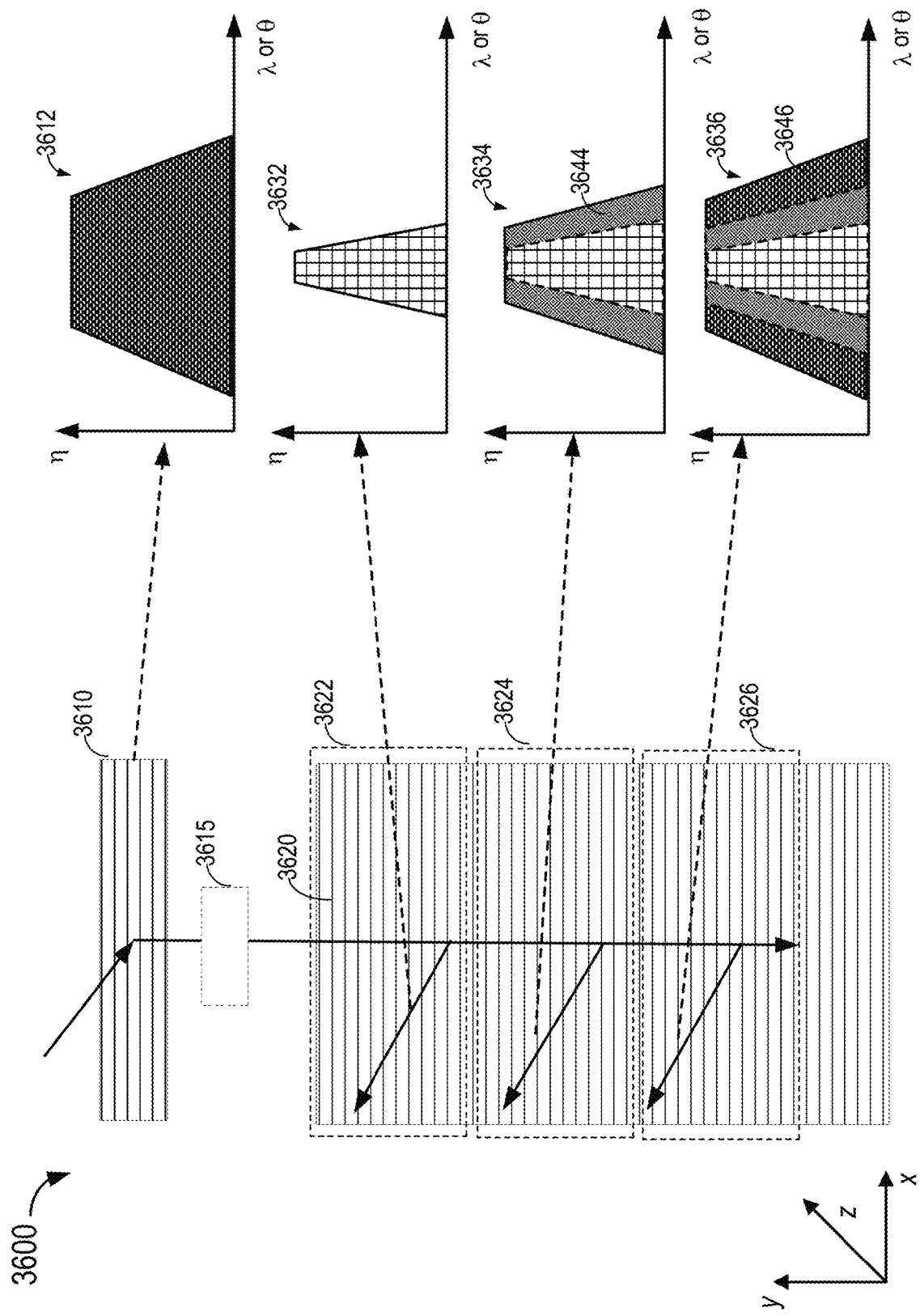
FIG. 36 illustrates an example of a waveguide display including spatially multiplexed reflection volume Bragg gratings having different refractive index modulations according to certain embodiments.

FIG. 36 illustrates an example of a waveguide display 3600 including spatially multiplexed reflection volume Bragg gratings having different refractive index modulations according to certain embodiments. The reflection VBGs shown in FIG. 36 may be used for one-dimensional pupil expansion and dispersion compensation. It is noted that the reflection VBGs shown in FIG. 36 are for illustration purposes only. In some embodiments, additional reflection or transmission VBG gratings 3615 may be used to expand the pupil in another dimension to achieve two dimensional pupil expansion as described above. For example, VBG gratings 3615 may include another set of reflection VBGs that may be used for pupil expansion and dispersion compensation in a second dimension substantially perpendicular to the first dimension as described above.

In the example shown in FIG. 36, waveguide display 3600 may include a first reflection grating 3610 and a second reflection grating 3620. First reflection grating 3610 and second reflection grating 3620 may have matching grating vectors, such as the same grating vector in the x-y plane and the same and/or opposite grating vectors in the z direction. For example, first reflection grating 3610 and second reflection grating 3620 may have some same grating parameters, such as the grating period, slant angle, and thickness, and the like. First reflection grating 3610 and second reflection grating 3620 may compensate the dispersion caused by each other as described above.

In some embodiments, first reflection grating 3610 may be an example of the input gratings described above, such as input gratings 1922, 2222, 2252, 2330, 2332, and the like. Second reflection grating 3620 may be an example of the output gratings or bottom gratings described above, such as second grating 1940, bottom grating 2240, bottom gratings 2350 and 2352, and the like. First reflection grating 3610 and second reflection grating 3620 may be used to couple display light into and out of a waveguide, respectively.

In some embodiments, first reflection grating 3610 may be an example of first portion 1932 of first grating 1930, first portion 2232 of first top grating 2230, first portion 2262 of second top grating 2260, first portion of top grating 2340, first portion of top grating 2342, and the like. Second reflection grating 3620 may be an example of other portions of first grating 1930, first top grating 2230, second top grating 2260, top grating 2340, top grating 2342, and the like.

In waveguide display 3600, first reflection grating 3610 and second reflection grating 3620 may have different refractive index modulations. For example, first reflection grating 3610 may be heavily saturated, and thus the diffraction efficiency of first reflection grating 3610 may be approximately shown by a diagram 3612, where the FWHM wavelength range (and/or the FWHM angular range) may be wide to cover a large wavelength range (and/or a large FOV range). Thus, first reflection grating 3610 may diffract display light in a large wavelength range (and/or a large FOV range).

Second reflection grating 3620 may include multiple sections 3622, 3624, 3626, and the like. Display light diffracted by first reflection grating 3610 (e.g., coupled into the waveguide or deflected to a different direction) may propagate with the waveguide through total internal reflection and may directly or indirectly (e.g., through gratings 3615) reach each of the multiple sections of second reflection grating 3620. The multiple sections of second reflection grating 3620 may each couple a portion of the display light, for example, out of the waveguide or towards an output (or bottom) gratings. Each of the multiple sections 3622, 3624, 3626, and the like may have a different respective refractive index modulation, and thus may be saturated at a different respective level and may have a different respective FWHM wavelength range (and/or FWHM angular range). For example, a first section 3622 may have a refractive index modulation that is below, at, or slightly above the saturation level, and thus may have a diffraction efficiency curve shown by a diagram 3632. A second section 3624 may have a higher refractive index modulation and thus may have a broader FWHM wavelength range (and/or FWHM angular range) as shown by a diagram 3634. A third section 3626 may have an even higher refractive index modulation and thus may have a much broader FWHM wavelength range (and/or FWHM angular range) as shown by a diagram 3636. In some embodiments, second reflection grating 3620 may include multiple (e.g., more than three) sections that may have different refractive index modulations and different FWHM wavelength ranges (and/or FWHM angular ranges).

In some embodiments, first section 3622 of second reflection grating 3620 may couple display light in a first wavelength (and/or FOV) range out of the waveguide at a high efficiency (e.g., close to 100% as shown in diagram 3632) to replicate a pupil for light in the first wavelength (and/or FOV) range. Second section 3624 of second reflection grating 3620 can couple display light in a second wavelength (and/or FOV) range out of the waveguide at a high efficiency as shown in diagram 3634. The second wavelength (and/or FOV) range may include the first wavelength (and/or FOV) range and may be wider than the first wavelength (and/or FOV) range. Because a majority or all of the light in the first wavelength (and/or FOV range) may have been diffracted by first section 3622, second section 3624 may only diffract light that is within the second wavelength (and/or FOV) range and has not been diffracted by first section 3622 as shown by areas 3644 in diagram 3634 to replicate another pupil. Similarly, third section 3626 of second reflection grating 3620 can couple display light in a third wavelength (and/or FOV) range out of the waveguide at a high efficiency as shown in diagram 3636. The third wavelength (and/or FOV) range may include the second wavelength (and/or FOV) range and may be wider than the second wavelength (and/or FOV) range. Because a majority or all of the light in the second wavelength (and/or FOV) range may have been diffracted by first section 3622 and second section 3624, third section 3626 may only diffract light that is within the third wavelength (and/or FOV) range and has not been diffracted by first section 3622 and second section 3624 as shown in diagram 3636 to replicate a third pupil.

In some embodiments, first reflection grating 3610 and second reflection grating 3620 may each be a grating in a respective multiplexed grating that includes multiple saturated reflection VBGs. Each saturated reflection VBG in the multiplexed grating may diffract red, green, and/or blue light from different respective wavelength and/or FOV ranges as described above with respect to, for example, FIGS. 26A, 26B, and 32B. The multiple saturated reflection VBGs may thus provide the full FOV for red, green, and blue light of the display image emitted by the light sources (e.g., red, green, and blue LEDs) as described above with respect to, for example, FIGS. 19B, 22B, 23B, 25, and 33C.

In some embodiments, because the diffraction efficiency of a transmission grating may be polarization sensitive and the incoming display light may be unpolarized, some components of the display light may not be diffracted by the grating and thus the efficiency of the waveguide display may be reduced. To improve the efficiency for unpolarized light or light in a certain polarization state, a polarization convertor and two spatially multiplexed gratings may be used to couple the display light into or out of the waveguide.

Figure 37:
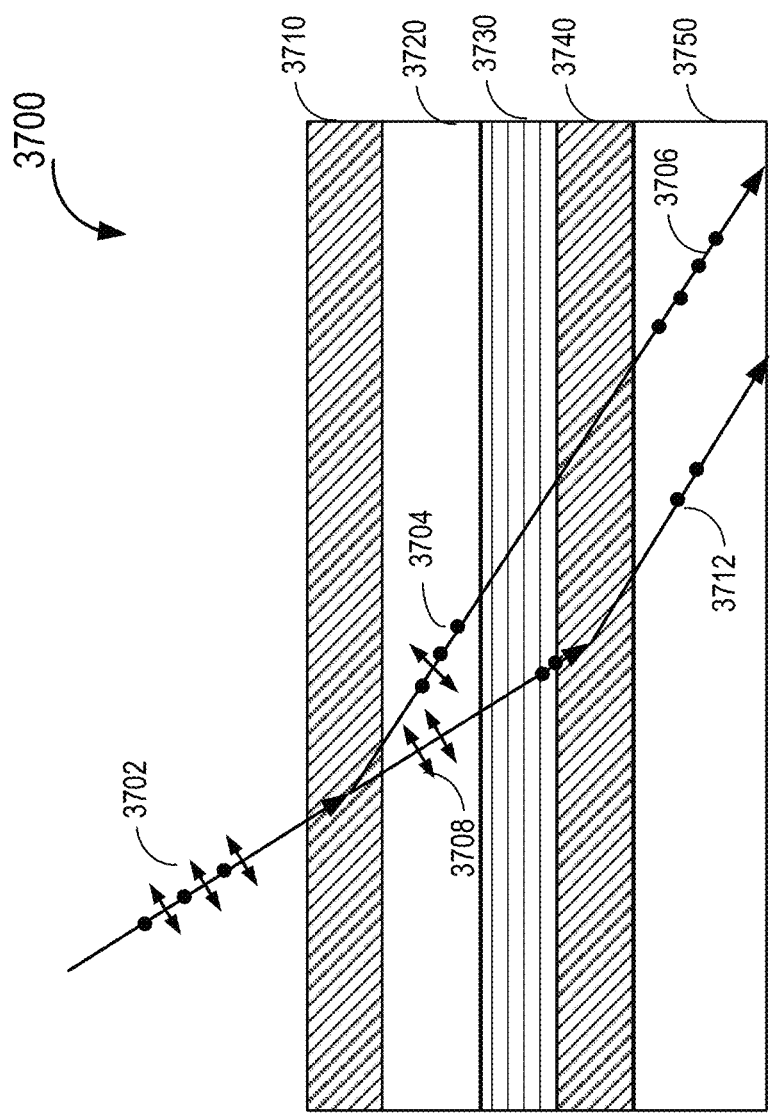
FIG. 37 illustrates an example of a waveguide display including two multiplexed volume Bragg gratings and a polarization convertor between the two multiplexed volume Bragg gratings according to certain embodiments.

FIG. 37 illustrates an example of a waveguide display 3700 including two multiplexed volume Bragg gratings 3710 and 3740 and a polarization convertor 3730 between the two multiplexed volume Bragg gratings 3710 and 3740 according to certain embodiments. In some embodiments, because the diffraction efficiency of a transmission grating may be polarization sensitive and the incoming display light may be unpolarized, some components of the display light may not be diffracted by the grating and thus the efficiency of the waveguide display may be reduced. To improve the efficiency for unpolarized light or light in a certain polarization state, a polarization convertor and two spatially multiplexed gratings may be used to couple the display light into or out of the waveguide. A first VBG 3710 may be formed on a substrate 3720 or on a surface of polarization convertor 3730. A second VBG 3740 may be formed on a substrate 3750 or on another surface of polarization convertor 3730.

Unpolarized light 3702 may include s-polarized light and p-polarized light. First VBG 3710 may diffract a majority of the s-polarized light and a portion of the p-polarized light as shown by diffracted light 3704. Diffracted light 3704 may be partially converted by polarization convertor 3730 and pass through second VBG 3740 without being diffracted by second VBG 3740 as shown by transmitted light 3706 because the Bragg condition is not satisfied. The portion 3708 of the p-polarized light that is not diffracted by first VBG 3710 may pass through polarization convertor 3730 and may be converted into s-polarized light and may be diffracted by second VBG 3740, where the diffracted light 3712 may have the same propagation direction as transmitted light 3706. In this way, unpolarized light 3702 may be more efficiently diffracted by waveguide display 3700.

External light (e.g., from an external light source, such as a lamp or the sun) may be reflected at a surface of a grating coupler and back to the grating coupler, where the reflected light may be diffracted by the grating coupler to generate rainbow images. In some waveguide display, ambient light with a large incident angle outside of the see-through field of view of the waveguide display may also be diffracted by the grating couplers to generate rainbow images. According to some embodiments, additional structures, such as a reflective coating layer (e.g., for light from a large see-through FOV) and/or an antireflective coating layer (e.g., for light from a small see-through FOV), may be used in the waveguide display to reduce optical artifacts, such as rainbow effects. For example, an angular-selective transmissive layer may be placed in front of (or behind) the waveguide and the grating coupler of a waveguide display to reduce the artifacts caused by external light source. The angular-selective transmissive layer may be configured to reflect, diffract, or absorb ambient light with an incident angle greater than one half of the see-through field of view of the waveguide display, while allowing ambient light within the see-through field of view of the near-eye display to pass through and reach user's eyes with little or no loss. The angular-selective transmissive layer may include, for example, coating that may include one or more dielectric layers, diffractive elements such as gratings (e.g., meta-gratings), nanostructures (e.g., nanowires, nano-pillars, nano-prisms, nano-pyramids), and the like.

Figure 38:
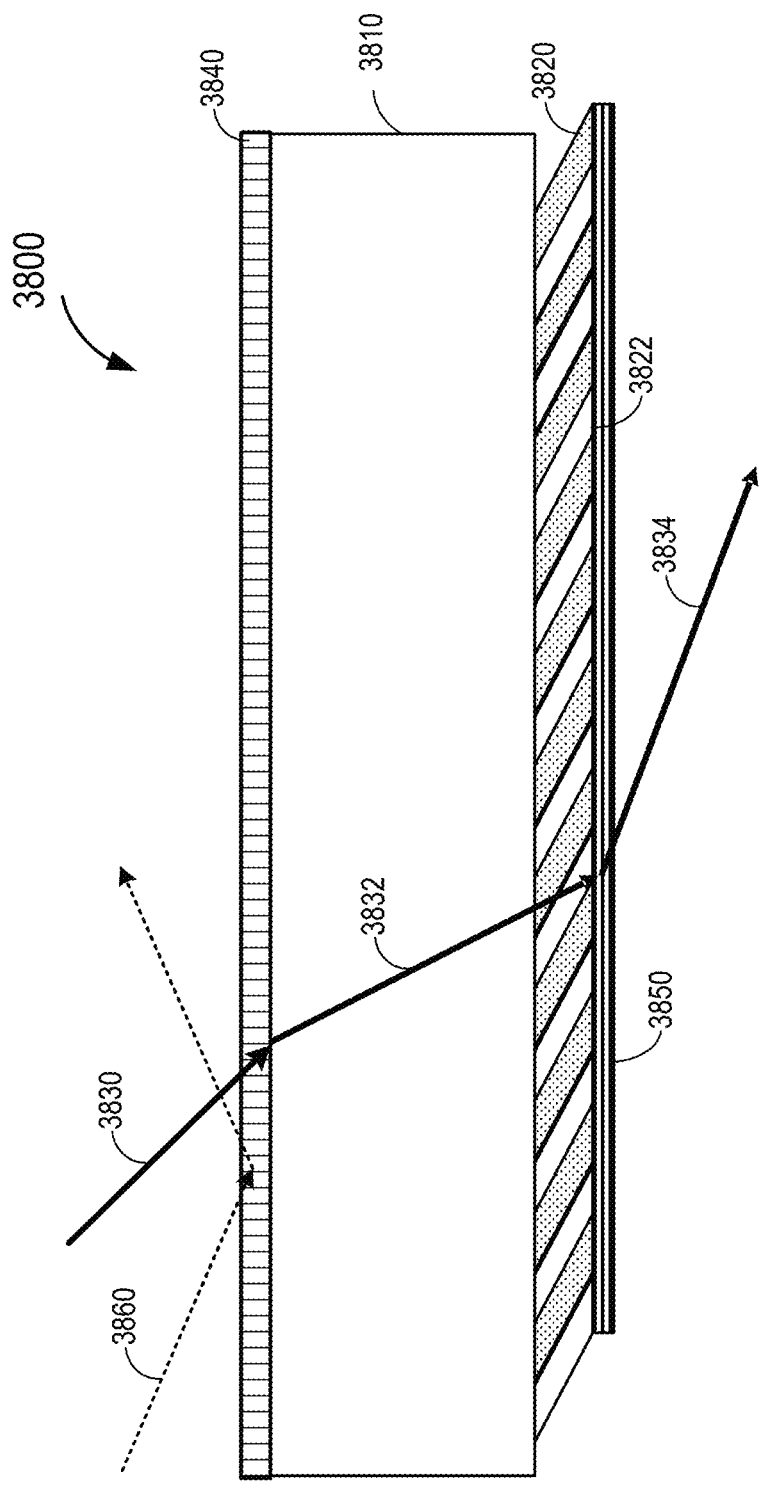
FIG. 38 illustrates an example of a waveguide display including an anti-reflection layer and an angular-selective transmissive layer according to certain embodiments.

FIG. 38 illustrates an example of a waveguide display 3800 including an anti-reflection layer 3850 and an angular-selective transmissive layer 3840 according to certain embodiments. Waveguide display 3800 may include a waveguide 3810 and a grating coupler 3820 at the bottom surface of waveguide 3810. Grating coupler 3820 may be similar to the grating couplers described above. External light 3830 incident on waveguide 3810 may be refracted into waveguide 3810 as external light 3832 and may then be diffracted by grating coupler 3820. The diffracted light may include a $0^{th}$ order diffraction 3834 (e.g., refractive diffraction) and a −1st order diffraction (not shown). The height, period, and/or slant angle of grating coupler 3820 may be configured such that the −1st order diffraction may be reduced or minimized for the external light.

Waveguide display 3800 may include anti-reflection layer 3850 on bottom surface 3822 of grating coupler 3820. Anti-reflection layer 3850 may include, for example, one or more dielectric thin film layers or other anti-reflection layers coated on bottom surface 3822, and may be used to reduce the reflection of the external light at bottom surface 3822. Thus, little or no external light may be reflected at bottom surface 3822 of grating coupler 3820 back to grating coupler 3820, and therefore the rainbow ghost that might otherwise be formed due to the diffraction of external light reflected at bottom surface 3822 by grating coupler 3820 may be reduced or minimized. Some portions of the display light may be diffracted by grating coupler 3820 and may be coupled out of waveguide 3810 towards user's eyes (e.g., due to $-1^{st}$ order diffraction). Anti-reflection layer 3850 may also help to reduce the reflection of the portions of the display light that are coupled out of waveguide 3810 by grating coupler 3820.

Angular-selective transmissive layer 3840 may be coated on the top surface of waveguide 3810 or grating coupler 3820. Angular-selective transmissive layer 3840 may have a high reflectivity, high diffraction efficiency, or high absorption for incident light with an incident angle greater than a certain threshold value, and may have a low loss for incident light with an incident angle lower than the threshold value. The threshold value may be determined based on the see-through field of view of waveguide display 3800. For example, incident light 3860 with an incident angle greater than the see-through field of view may be mostly reflected, diffracted, or absorbed by angular-selective transmissive layer 3840, and thus may not reach waveguide 3810. External light 3830 with an incident angle within the see-through field of view may mostly pass through angular-selective transmissive layer and waveguide 3810, and may be refracted or diffracted by grating coupler 3820.

The angular-selective transmissive layer 3840 described above may be implemented in various ways. In some embodiments, the angular-selective transmissive layer may include one or more dielectric layers (or air gap). Each dielectric layer may have a respective refractive index, and adjacent dielectric layers may have different refractive indexes. In some embodiments, the angular-selective transmissive layer may include, for example, micro mirrors or prisms, grating, meta-gratings, nanowires, nano-pillars, or other micro- or nano-structures. In some examples, the angular-selective transmissive layer may include gratings (e.g., surface-relief gratings or holographic gratings) with small grating periods formed on a substrate. The gratings may only diffract light with large incidence angles (e.g., about 75° to about 90°) and the diffracted light may propagate in directions such that the diffracted light may not reach the eyebox. The grating period may be, for example, less than 280 nm (e.g., about 200 nm) such that the angular-selective transmissive layer may not affect light within the see-through field of view. In some examples, the angular-selective transmissive layer may include micro-scale or nano-scale anisotropic structures that may reflect, diffract, or absorb incident light with large incident angles. The anisotropic structures may include, for example, large-aspect-ratio nanoparticles aligned and immersed in transparent media, nanowire arrays, certain liquid crystal materials, and the like.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 39:
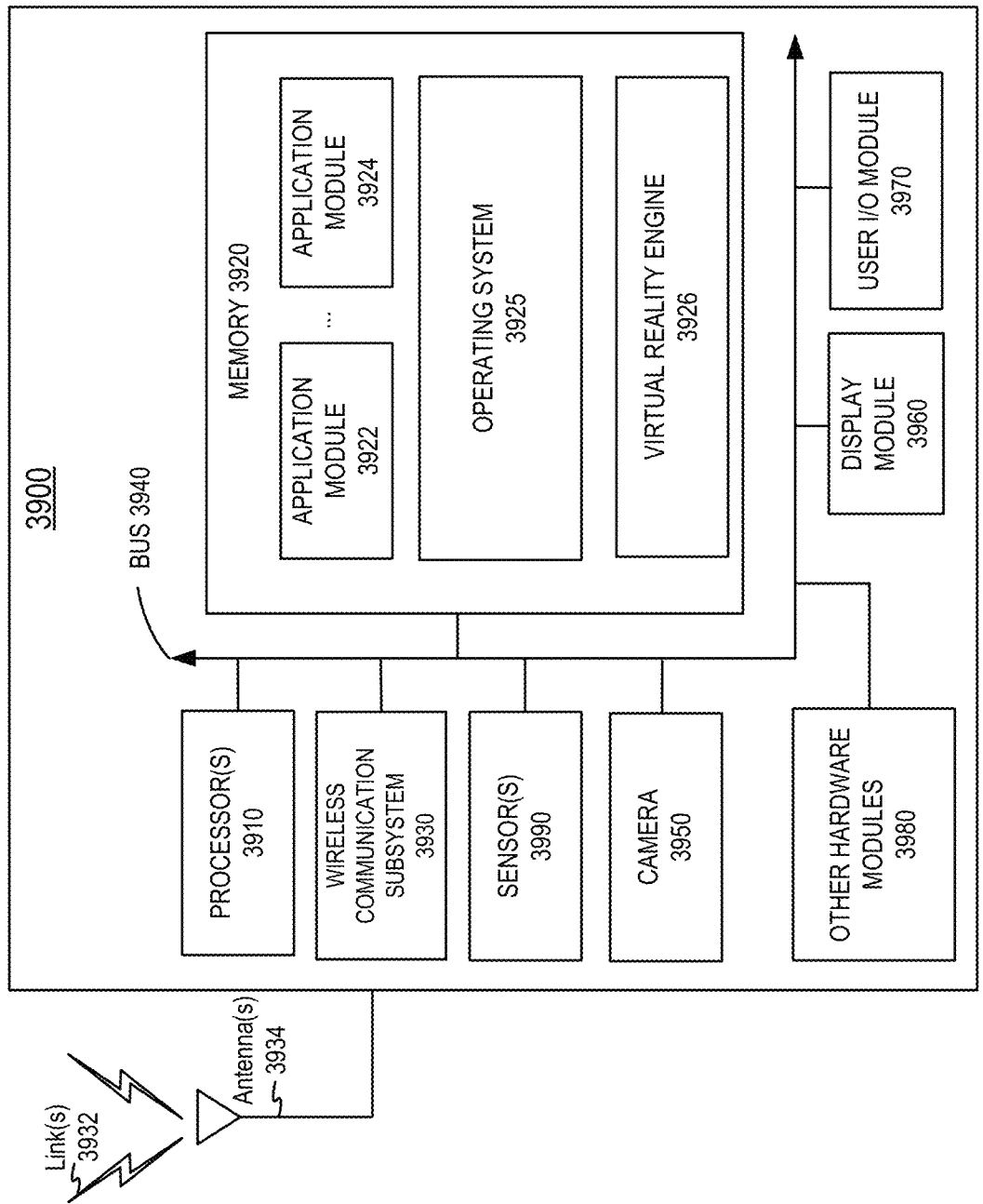
FIG. 39 is a simplified block diagram of an example of an electronic system in an example of a near-eye display according to certain embodiments.

FIG. 39 is a simplified block diagram of an example electronic system 3900 of an example near-eye display (e.g., HMD device) for implementing some of the examples disclosed herein. Electronic system 3900 may be used as the electronic system of an HMD device or other near-eye displays described above. In this example, electronic system 3900 may include one or more processor(s) 3910 and a memory 3920. Processor(s) 3910 may be configured to execute instructions for performing operations at a number of components, and can be, for example, a general-purpose processor or microprocessor suitable for implementation within a portable electronic device. Processor(s) 3910 may be communicatively coupled with a plurality of components within electronic system 3900. To realize this communicative coupling, processor(s) 3910 may communicate with the other illustrated components across a bus 3940. Bus 3940 may be any subsystem adapted to transfer data within electronic system 3900. Bus 3940 may include a plurality of computer buses and additional circuitry to transfer data.

Memory 3920 may be coupled to processor(s) 3910. In some embodiments, memory 3920 may offer both short-term and long-term storage and may be divided into several units. Memory 3920 may be volatile, such as static random access memory (SRAM) and/or dynamic random access memory (DRAM) and/or non-volatile, such as read-only memory (ROM), flash memory, and the like. Furthermore, memory 3920 may include removable storage devices, such as secure digital (SD) cards. Memory 3920 may provide storage of computer-readable instructions, data structures, program modules, and other data for electronic system 3900. In some embodiments, memory 3920 may be distributed into different hardware modules. A set of instructions and/or code might be stored on memory 3920. The instructions might take the form of executable code that may be executable by electronic system 3900, and/or might take the form of source and/or installable code, which, upon compilation and/or installation on electronic system 3900 (e.g., using any of a variety of generally available compilers, installation programs, compression/decompression utilities, etc.), may take the form of executable code.

In some embodiments, memory 3920 may store a plurality of application modules 3922 through 3924, which may include any number of applications. Examples of applications may include gaming applications, conferencing applications, video playback applications, or other suitable applications. The applications may include a depth sensing function or eye tracking function. Application modules 3922-3924 may include particular instructions to be executed by processor(s) 3910. In some embodiments, certain applications or parts of application modules 3922-3924 may be executable by other hardware modules 3980. In certain embodiments, memory 3920 may additionally include secure memory, which may include additional security controls to prevent copying or other unauthorized access to secure information.

In some embodiments, memory 3920 may include an operating system 3925 loaded therein. Operating system 3925 may be operable to initiate the execution of the instructions provided by application modules 3922-3924 and/or manage other hardware modules 3980 as well as interfaces with a wireless communication subsystem 3930 which may include one or more wireless transceivers. Operating system 3925 may be adapted to perform other operations across the components of electronic system 3900 including threading, resource management, data storage control and other similar functionality.

Wireless communication subsystem 3930 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 3900 may include one or more antennas 3934 for wireless communication as part of wireless communication subsystem 3930 or as a separate component coupled to any portion of the system. Depending on desired functionality, wireless communication subsystem 3930 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 3930 may permit data to be exchanged with a network, other computer systems, and/or any other devices described herein. Wireless communication subsystem 3930 may include a means for transmitting or receiving data, such as identifiers of HMD devices, position data, a geographic map, a heat map, photos, or videos, using antenna(s) 3934 and wireless link(s) 3932. Wireless communication subsystem 3930, processor(s) 3910, and memory 3920 may together comprise at least a part of one or more of a means for performing some functions disclosed herein.

Embodiments of electronic system 3900 may also include one or more sensors 3990. Sensor(s) 3990 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 3990 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 3900 may include a display module 3960. Display module 3960 may be a near-eye display, and may graphically present information, such as images, videos, and various instructions, from electronic system 3900 to a user. Such information may be derived from one or more application modules 3922-3924, virtual reality engine 3926, one or more other hardware modules 3980, a combination thereof, or any other suitable means for resolving graphical content for the user (e.g., by operating system 3925). Display module 3960 may use liquid crystal display (LCD) technology, light-emitting diode (LED) technology (including, for example, OLED, ILED, μLED, AMOLED, TOLED, etc.), light emitting polymer display (LPD) technology, or some other display technology.

Electronic system 3900 may include a user input/output module 3970. User input/output module 3970 may allow a user to send action requests to electronic system 3900. An action request may be a request to perform a particular action. For example, an action request may be to start or end an application or to perform a particular action within the application. User input/output module 3970 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 3900. In some embodiments, user input/output module 3970 may provide haptic feedback to the user in accordance with instructions received from electronic system 3900. For example, the haptic feedback may be provided when an action request is received or has been performed.

Electronic system 3900 may include a camera 3950 that may be used to take photos or videos of a user, for example, for tracking the user's eye position. Camera 3950 may also be used to take photos or videos of the environment, for example, for VR, AR, or MR applications. Camera 3950 may include, for example, a complementary metal-oxide-semiconductor (CMOS) image sensor with a few millions or tens of millions of pixels. In some implementations, camera 3950 may include two or more cameras that may be used to capture 3-D images.

In some embodiments, electronic system 3900 may include a plurality of other hardware modules 3980. Each of other hardware modules 3980 may be a physical module within electronic system 3900. While each of other hardware modules 3980 may be permanently configured as a structure, some of other hardware modules 3980 may be temporarily configured to perform specific functions or temporarily activated. Examples of other hardware modules 3980 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 3980 may be implemented in software.

In some embodiments, memory 3920 of electronic system 3900 may also store a virtual reality engine 3926. Virtual reality engine 3926 may execute applications within electronic system 3900 and receive position information, acceleration information, velocity information, predicted future positions, or some combination thereof of the HMD device from the various sensors. In some embodiments, the information received by virtual reality engine 3926 may be used for producing a signal (e.g., display instructions) to display module 3960. For example, if the received information indicates that the user has looked to the left, virtual reality engine 3926 may generate content for the HMD device that mirrors the user's movement in a virtual environment. Additionally, virtual reality engine 3926 may perform an action within an application in response to an action request received from user input/output module 3970 and provide feedback to the user. The provided feedback may be visual, audible, or haptic feedback. In some implementations, processor(s) 3910 may include one or more GPUs that may execute virtual reality engine 3926.

In various implementations, the above-described hardware and modules may be implemented on a single device or on multiple devices that can communicate with one another using wired or wireless connections. For example, in some implementations, some components or modules, such as GPUs, virtual reality engine 3926, and applications (e.g., tracking application), may be implemented on a console separate from the head-mounted display device. In some implementations, one console may be connected to or support more than one HMD.

In alternative configurations, different and/or additional components may be included in electronic system 3900. Similarly, functionality of one or more of the components can be distributed among the components in a manner different from the manner described above. For example, in some embodiments, electronic system 3900 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:
1. A waveguide display comprising:
   a substrate;
   a first reflection volume Bragg grating (VBG) on the substrate and characterized by a first refractive index modulation; and
   a second reflection VBG on the substrate and including a first region and a second region,
   wherein the first reflection VBG is configured to diffract display light in a first wavelength range such that the display light in the first wavelength range propagates in the substrate through total internal reflection to the first region and the second region of the second reflection VBG;

wherein the first region of the second reflection VBG is characterized by a second refractive index modulation lower than the first refractive index modulation and is configured to diffract display light in a second wavelength range that is within the first wavelength range; and wherein the second region of the second reflection VBG is characterized by a third refractive index modulation greater than the second refractive index modulation and is configured to diffract display light in a third wavelength range that includes and is larger than the second wavelength range.

2. The waveguide display of claim 1, wherein the first region and the second region of the second reflection VBG are arranged such that the display light in the first wavelength range reaches the first region before reaching the second region.

3. The waveguide display of claim 1, wherein:
the third refractive index modulation is equal to or less than the first refractive index modulation; and
the first wavelength range is the same as or includes the third wavelength range.

4. The waveguide display of claim 1, wherein the first reflection VBG and the second reflection VBG have a same grating vector in a plane perpendicular to a surface normal direction of the substrate.

5. The waveguide display of claim 1, wherein the second reflection VBG further includes a third region between the first region and the second region, the third region characterized by a fourth refractive index modulation greater than the second refractive index modulation but lower than the third refractive index modulation and configured to diffract display light in a fourth wavelength range that includes the second wavelength range and is within the third wavelength range.

6. The waveguide display of claim 1, further comprising:
a third reflection VBG multiplexed with the first reflection VBG and characterized by a fourth refractive index modulation; and
a fourth reflection VBG multiplexed with the second reflection VBG in the first region and second region,
wherein the third reflection VBG is configured to diffract display light in a fourth wavelength range such that the display light in the fourth wavelength range propagates in the substrate through total internal reflection to the first region and the second region of the fourth reflection VBG;
wherein the first region of the fourth reflection VBG is characterized by a fifth refractive index modulation lower than the fourth refractive index modulation and is configured to diffract display light in a fifth wavelength range that is within the fourth wavelength range; and wherein the second region of the fourth reflection VBG is characterized by a sixth refractive index modulation greater than the fifth refractive index modulation and is configured to diffract display light in a sixth wavelength range that includes and is larger than the fifth wavelength range.

7. The waveguide display of claim 1, wherein the first reflection VBG is configured to:
diffract display light in the first wavelength range and a first field of view (FOV) range; and
diffract display light in a fourth wavelength range and a second FOV range different from the first FOV range.

8. The waveguide display of claim 1, wherein:
the substrate is transparent to visible light; and
the second reflection VBG is transparent to visible light from an ambient environment.

9. The waveguide display of claim 1, wherein:
the first reflection VBG is configured to couple the display light in the first wavelength range into the substrate; and
the second reflection VBG is configured to couple the display light in the first wavelength range out of the substrate.

10. The waveguide display of claim 9, further comprising a third grating and a fourth grating, wherein:
the third grating is configured to diffract the display light in the first wavelength range from the first reflection VBG to the fourth grating; and
the fourth grating is configured to diffract the display light in the first wavelength range at two or more regions of the fourth grating to the second reflection VBG.

11. The waveguide display of claim 10, wherein the third grating and the fourth grating have a same grating vector in a plane perpendicular to a surface normal direction of the substrate.

12. The waveguide display of claim 1, further comprising:
an input coupler configured to couple the display light in the first wavelength range into the substrate; and
an output coupler configured to couple the display light diffracted by the second reflection VBG out of the substrate.

13. The waveguide display of claim 12, wherein the input coupler and the output coupler include multiplexed VBGs.

14. The waveguide display of claim 1, further comprising:
a light source configured to generate the display light; and
projector optics configured to collimate the display light and direct the display light to the first reflection VBG.

* * * * *